United States Patent
Newman

(10) Patent No.: US 8,990,079 B1
(45) Date of Patent: Mar. 24, 2015

(54) AUTOMATIC CALIBRATION OF COMMAND-DETECTION THRESHOLDS

(71) Applicant: Zanavox, Temecula, CA (US)

(72) Inventor: David Edward Newman, Temecula, CA (US)

(73) Assignee: Zanavox, Temecula, CA (US)

( * ) Notice: Subject to any disclaimer, the term of this patent is extended or adjusted under 35 U.S.C. 154(b) by 0 days.

(21) Appl. No.: 14/489,463

(22) Filed: Sep. 17, 2014

Related U.S. Application Data

(60) Provisional application No. 61/916,258, filed on Dec. 15, 2013.

(51) Int. Cl.
*G10L 15/00* (2013.01)
*G10L 21/00* (2013.01)
*G10L 25/93* (2013.01)

(52) U.S. Cl.
CPC .............. *G10L 21/00* (2013.01); *G10L 25/93* (2013.01)
USPC ............................ 704/233; 704/214; 704/231

(58) Field of Classification Search
CPC ........................................................ G10L 15/20
USPC .................................. 704/208, 214, 233, 270
See application file for complete search history.

(56) References Cited

U.S. PATENT DOCUMENTS

| | | | | |
|---|---|---|---|---|
| 4,989,253 A * | 1/1991 | Liang et al. | | 381/110 |
| 5,459,814 A * | 10/1995 | Gupta et al. | | 704/233 |
| 5,585,756 A * | 12/1996 | Wang | | 327/341 |
| 5,991,718 A * | 11/1999 | Malah | | 704/233 |
| 6,088,670 A * | 7/2000 | Takada | | 704/233 |
| 6,584,439 B1 * | 6/2003 | Geilhufe et al. | | 704/270 |
| 7,881,927 B1 * | 2/2011 | Reuss | | 704/226 |
| 2003/0101052 A1 * | 5/2003 | Chen et al. | | 704/223 |
| 2003/0120487 A1 * | 6/2003 | Wang | | 704/233 |
| 2007/0288236 A1 * | 12/2007 | Kim | | 704/231 |
| 2010/0088094 A1 * | 4/2010 | Wang | | 704/233 |
| 2011/0264449 A1 * | 10/2011 | Sehlstedt | | 704/226 |
| 2012/0232896 A1 * | 9/2012 | Taleb et al. | | 704/233 |
| 2012/0303362 A1 * | 11/2012 | Duni et al. | | 704/219 |
| 2013/0262099 A1 | 10/2013 | Ding | | |
| 2013/0304464 A1 | 11/2013 | Wang | | |
| 2014/0012573 A1 | 1/2014 | Hung | | |
| 2014/0278435 A1 * | 9/2014 | Ganong et al. | | 704/275 |

* cited by examiner

*Primary Examiner* — Shaun Roberts

(57) ABSTRACT

When a voice-activated device or application is first started, the signal levels corresponding to spoken commands are initially unknown, making it difficult to set detection thresholds. The inventive method provides an initial command-detection threshold based on the noise level alone. The first command is detected using this initial threshold. Then the threshold is revised according to the first command sound, and a second command is detected using the revised threshold. After detecting each command, the detection threshold is further refined according to the current noise and command sounds. Methods are also disclosed for optimizing the thresholds, adjusting parameters according to sound, and detecting voiced and unvoiced sounds separately. These capabilities enable many emerging voice-activated products and applications.

20 Claims, 24 Drawing Sheets

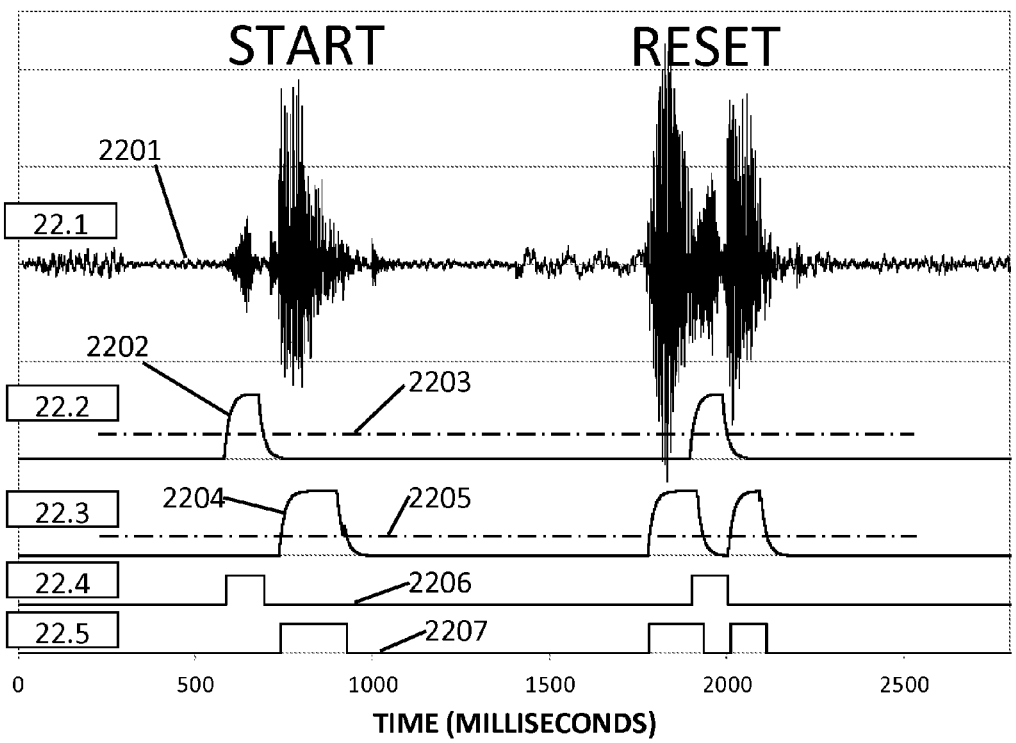

FIG. 24

Equation listing:

(1) $Av' = S*F + Av * (1-F)$ (2) $TavNoise = MIN(Telapsed, TavMax)$ (3) $ThN = <noise> * Fnoise$ (4) $ThC = <command> * Fcommand$ (5) $DetTh\ (average) = (ThN + ThC)/2$ (6) $DetTh\ (weighted) = ThN*WtN + ThC*WtC$ (7) $DetTh\ (maximum) = MAX(ThN, ThC)$ (8) $DetTh\ (minimum) = MIN(ThN, ThC)$ (9) $DetTh\ (average, nonzero) = MAX(ThreshMin, (ThN + ThC)/2)$

(10) $ACNR = <command> / <noise>$

(11) $DetTh(weighted) = Fnoise * <noise> * WtN + Fcommand * <command> * WtC$

(12) $DD = w(i)/2 - w(i+1) + w(i+2)/2$

AUTOMATIC CALIBRATION OF COMMAND-DETECTION THRESHOLDS

RELATED APPLICATIONS

This application claims the benefit of U.S. Provisional Application No. 61/916,258 titled "Automatic Calibration of Voice Command Thresholds" filed 2013 Dec. 15, the entirety of which is hereby incorporated by reference.

BACKGROUND OF THE INVENTION

The invention is related to the detection of spoken commands, and particularly to means for setting a detection threshold based on the observed noise and command sound levels.

Smart phones, tablet computers, smart watches, and a host of other emerging products are essentially mobile reprogrammable voice-activated devices that accept user-installed software modules ("apps"), from a wide range of developers who are generally unrelated to the device maker. The ability to merge a voice-activation app from one vendor, with a sound-detecting device from another vendor, has created a novel problem: how to set a command-detection threshold before the first command is spoken? When a new voice-activated application is started on a new device for the first time, nothing is known about the signal levels associated with command sounds in that device. It is impossible to set an empirical threshold based on command signals that have not yet been detected. Prior voice-activated devices did not have this problem because their detection settings were pre-calibrated by design and pre-installed during manufacture of the device. But the situation has changed, now that voice-activated apps run on thousands of different types of devices with widely varying electronic properties. In every case, the signal level of a spoken command is unknown to the software developer. And yet the software must set a command-detection threshold quickly, because users demand that the application detect the first command with high reliability. As application developers well know, users are notoriously intolerant of spoken-command failures. Users may try the command a second time, but if the application misses the first two commands due to threshold uncertainty, most users will trash the app. Therefore it is essential that the application establish an effective command-detection threshold quickly when the application begins.

This problem of setting the initial command-detection threshold, is expected to increase in the coming years due to the expanding availability of embedded and wearable devices, as well as the expected proliferation of implanted bio-devices in the near future, all of which are independently programmable at the user's will. It is safe to assume that, before this patent expires, voice-activated devices will penetrate all personal, home-automation, industrial-robotic, medical, and security applications. In each of these applications, and wherever a user can mix software and hardware from different sources, setting the initial threshold for spoken command detection will be problematic.

Prior art VAD (voice-activity detection) offers little help in this problem, because prior VAD methods assume that the command signal levels are already known. The current problem is just the opposite, to detect the first command when the electronic and acoustical properties are unknown. Therefore there is a growing need for means to set thresholds for detecting spoken commands when an installed software module starts up for the first time, and the signal levels of spoken commands are unknown.

BRIEF SUMMARY OF THE INVENTION

The invention is a method for detecting spoken commands in the presence of background noise, and particularly for establishing an initial threshold for detecting command sounds when the signal level corresponding to a command is unknown. The method also provides a steadily improving threshold as further command information becomes available.

The inventive method is usually embodied by a software application, which is executed by an electronic device. In a typical embodiment, sound is converted to a sound signal comprising sequential digital values representing the sound. The application starts at a time Tstart when the first digitized value is generated, and then after a first delay the first spoken command is uttered at time Tfirst, and then after a second delay the second spoken command is uttered at time Tsecond. The sound signal values that occur prior to the first spoken command are due to ambient noise. According to the inventive method, an initial command detection threshold is derived from the sound signal values that occur prior to the first spoken command. The first command is then detected by comparing further sound signal values to the initial detection threshold. After the first command has been detected, the detection threshold is revised according to the sound signal values that occur during the first command. Thus the revised detection threshold is a function of two inputs: a noise-sound input from the sound signal values that occurred prior to the first spoken command, and a command-sound input from the sound signal values that occur during the first spoken command. Then, the second command is detected by comparing further sound signal values to the revised detection threshold.

The inventive method also enables a third spoken command to be detected, at time Tthird, with further improvements. The detection threshold may be adjusted according to sound signal values occurring between the first and second spoken commands, thereby enabling an improved measure of the noise. The detection threshold may be further adjusted according to sound signal values that occur during the second spoken command, thereby enabling an improved threshold based on the command sounds. Then, the third spoken command is detected by comparing further sound signal values to the adjusted detection threshold. Continuing in this manner, the detection threshold may be adjusted according to the ongoing noise and command sounds detected, thereby providing a continually improving threshold.

According to the inventive method, a command is detected by comparing the sound signal to the detection threshold. For example, the command may be detected as soon as the sound signal exceeds the detection threshold, thereby providing a quick and responsive detection. Alternatively, the method may include a time interval Tmin, and the command may be detected when the sound signal exceeds the detection threshold continuously for a time interval at least equal to Tmin. Requiring the sound signal to exceed the detection threshold continuously for Tmin would reject pulsatile noise and enhance reliability. Real spoken commands are at least 50 milliseconds in duration, and so Tmin is preferably in the range of 20 to 50 milliseconds. Other criteria may also be applied for determining when and how the command is detected. Although a sound may be detected above a certain threshold, the sound does not comprise a command until all the command detection criteria have been met. For example, when the sound amplitude first exceeds the detection threshold, the application may indicate that a sound is detected but the sound is not yet accepted as a command. Then, when the sound amplitude remains above the detection threshold continuously for the sound-duration requirement of Tmin, and any other requirements have been met, the command is then detected as valid.

The inventive method includes adjusting the detection threshold according to the sound signal values that occur during the command, and separately adjusting the detection threshold according to sound signal values that occur between commands as noise. Therefore the application must determine which sound signal values occur during the command, and which sound signal values occur between commands. Typically this is resolved according to the command detection criteria. If the detection criterion is simply that a command is detected as soon as the sound signal exceeds the detection threshold, then the sound signal values that exceed the detection threshold are part of the command, and subsequent sound signal values falling below the detection threshold are not part of the command. If the Tmin sound-duration requirement is applied, then the command would include the sound signal values that exceed the detection threshold after Tmin. In some implementations the sound signal values that occur in the Tmin interval are also included when the command is finally detected. If other detection criteria are applied, the command interval may be adjusted accordingly. In addition, the command interval may be artificially extended for a period after the sound signal has dropped below the detection threshold, so as to prevent any lingering post-command sounds from being mistakenly counted as a second command.

The inventive method includes deriving separate threshold estimates from noise and from command sounds, and then functionally combining the separate threshold estimates to derive a composite command-detection threshold. For example, a noise-based threshold may be derived from the sound signal values that occur before the first command, and a command-based threshold may be derived from the sound signal values that occur during a command. The noise-based threshold is intended to be the best estimate of a threshold for detecting commands, based solely on noise data. The command-based threshold is intended to be the best estimate of a threshold for detecting commands, based solely on command sounds. Then the detection threshold is derived by combining the noise-based and command-based thresholds together according to a function. Subsequent command sounds are then detected by comparing the sound signal to the detection threshold so derived.

The inventive method further includes updating (or revising or adjusting) the noise-based threshold when further noise information becomes available, and updating the command-based threshold when further information on command sounds becomes available, and updating the detection threshold whenever the noise-based or command-based threshold is changed. For example, the noise-based threshold is initially derived from the sound signal values occurring before the first command, and then is updated according to the sound signal values occurring between the first and second commands, and then is further updated according to subsequent noise periods between commands. The method thus provides a rapid initial setting of the noise-based threshold, followed by continual improvement thereafter, while adapting to any changes in the noise environment. The command-based threshold is initially established according to the sound signal values occurring during the first command, and then is updated according to the sound signal from the second command, and then is updated further according to subsequent command sounds, thereby adjusting to the user's changing speech characteristics. The detection threshold is initially set equal to the noise-based threshold before the first command is detected. Then, after the first command has been detected, the detection threshold is derived by combining the noise-based and command-based thresholds. The inventive method thus provides a rapid initial setting of the detection threshold, followed by continual improvement in the detection threshold with each subsequent command.

The inventive method includes processing sound to derive signals for command detection. Usually the sound is converted to an electrical signal using a transducer such as a microphone, then amplified and optionally filtered to avoid aliasing, and optionally limited within a voltage range to avoid saturation, the result being termed the analog signal. Then the analog signal is digitized using a digitizer such as an ADC (analog-to-digital converter), the output of which may be termed the digitizer output signal. Then a baseline offset signal may be derived by averaging the digitizer output signal, thereby measuring any DC or pseudo-DC or slowly-varying voltage level. Then the baseline offset signal may be subtracted from the digitizer output signal, and the result may be termed the waveform signal. Thus the waveform signal is a bipolar signal with zero offset bias, accurately representing the sound waves (but within any voltage limitations or frequency limitations imposed by the filtering or limiting steps).

The averaging of the waveform signal, or any other signal, may be calculated in a series of fixed time divisions (or "frames"), or as a sliding window (a "boxcar"), or as a continuously updated average in which each new value contributes proportionately to the average (a "running average"), or as another weighted average function, of which many exist in the prior art. In each case, the range of values that substantially contribute to the average may be termed the averaging span. For a rectangular average such as a framed or sliding window average, the averaging span is the temporal width of the frame or window. For a weighted exponential or an incremental average, the span is the exponential time constant. Other weighting functions have a corresponding span related to the range of signal values that substantially contribute to each average value. The span may refer to the number of signal values that contribute to each value of the average, or to the time range of those signal values, depending on context.

The baseline offset is measured by averaging the waveform using an averaging span that is preferably longer than the lowest frequency sound waves passed by the amplifier and filter, but not so long that a varying offset voltage would be missed. Typically the baseline averaging span is in the range of 0.1 to 10 seconds. However, a shorter span may be used when the application first begins, so that the baseline can be quickly evaluated, and a longer span may be used thereafter to minimize computing overhead.

The waveform signal is a bipolar signal representing the sound waves. For command detection, it is convenient to derive a monopolar (that is, positive only) sound amplitude signal that corresponds to the sound intensity, and preferably with short-duration intensity variations removed. Typically, the waveform signal is rectified (that is, the magnitude of each value is taken, usually by dropping the sign), and smoothed (by averaging values of the rectified waveform), and the output is termed the sound amplitude signal. Preferably the smoothing span Tsmooth is long enough to exclude brief noise variations, but not so long that command sounds are suppressed. Typically Tsmooth is in the range of 2 to 50 milliseconds, and more preferably in the range of 5 to 10 milliseconds. Thus the sound amplitude is a positive-only representation of the sound intensity, with any variations shorter than Tsmooth suppressed by the smoothing.

As an alternative, the sound amplitude may be derived as a function of the waveform values, rather than simply their magnitude. The sound amplitude may be the RMS (root-mean-squared) of the waveform, or alternatively the square of the waveform divided by an average sound amplitude (to maintain a consistent scale with the other signals), or another power or function of the waveform may be used, and then smoothed by averaging with a 5-10 millisecond span. Processing to emphasize the higher noise values may be useful to ensure the detection threshold is high enough in an environment with pulsatile noise.

Then, an average noise amplitude is derived by averaging the sound amplitude values that occur before the first command is detected. The noise averaging is preferably a running average of the sound amplitude values, using a noise averaging span which may be termed TavNoise. The noise averaging span TavNoise may be varied with time, starting initially with a short span, and then graduating to a longer span thereafter. A short initial TavNoise averaging span enables rapid convergence to the average noise amplitude, and the longer TavNoise then provides a more stable measure of the background noise. Also, during commands or other loud sounds, TavNoise may be temporarily raised (or, "stretched") to a much longer averaging span, to prevent the loud sound from significantly affecting the average noise amplitude.

Then, the noise-based threshold is derived by multiplying the average noise amplitude times a factor Fnoise. As mentioned, the noise-based threshold is a best estimate of a command detection threshold value, but derived from the noise alone. Therefore Fnoise should be large enough that minor noise fluctuations will not exceed the noise-based threshold, causing a mistaken command detection (or, a "false alarm"). But, Fnoise should not be so large that a command is missed. Typically Fnoise is in the range of 2 to 6, with 3.5 to 4 being preferred. Thus the noise-based threshold is initially set equal to Fnoise times the average noise amplitude before the first command, and then the first command is detected when the sound amplitude exceeds the noise-based threshold.

The inventive method includes deriving a command-based threshold from the sound amplitude values occurring during the first command. Typically, a command amplitude is first derived from the sound amplitude values during the command, and then the command-based threshold is derived from the command amplitude. The command amplitude is typically the maximum sound amplitude value during the command, in which case Fcommand is preferably in the range of 0.2 to 0.5. Alternatively, the command amplitude could be the average sound amplitude during the command, in which case Fcommand should be in the range of 0.5 to 1. If some other function of the sound amplitude is used to derive the command amplitude, Fcommand should be adjusted accordingly. Preferably Fcommand is low enough that subsequent commands can be detected even if less loud than the first command, but not so low that false alarms are generated from noise.

Then, the detection threshold is derived by functionally combining the noise-based and command-based thresholds. The detection threshold may be the average or weighted average of the other two thresholds, or it may be the maximum or minimum of the other two thresholds, or another function. In addition, each threshold may be limited according to a predetermined value, such as requiring the threshold to be greater than zero or less than a maximum limit.

The inventive method includes an option of inhibiting all command detection, for a period that begins at Tstart and continues while the device electronics stabilize or "settle", and any other noise sources associated with the application booting-up. Many devices exhibit wild variations in gain, baseline, and noise when a sound-processing application is started. The inhibition may be for a fixed time Tsettle which is typically 200 to 1000 milliseconds. Or the inhibition may continue until the average noise amplitude remains substantially unchanged (for example, remains within ±10% of an initial value) for a time which is preferably in the range of 100 to 500 milliseconds.

The inventive method includes detecting commands using a tally counter, which provides many operational advantages. A tally counter is a counter, such as a register or memory element, that can be incremented and decremented. The tally counter is incremented when each value of the sound amplitude signal exceeds a sound threshold, and is decremented periodically (but never below zero). A command is detected when the tally counter exceeds a predetermined tally threshold.

The tally counter is incremented when the sound amplitude exceeds the sound threshold, as mentioned. The sound threshold is initially set equal to the noise-based threshold before the first command is detected, and then is set equal to a function of the noise-based and command-based thresholds after the first command. Thus the sound threshold is similar to the detection threshold, but is given a different name herein to avoid confusion. In the tally method, the sound threshold governs only the incrementation, while the command is detected when the tally counter exceeds the tally threshold. The tally method enables added flexibility by providing two thresholds: the sound threshold which determines when the tally is incremented, and the tally threshold which determines when a command is detected.

The tally method enables a remarkably clean and reliable command detection across a wide range of conditions. The tally method can also achieve extremely high sensitivity to faint sounds, by accumulating small signals throughout the weak sound interval. The tally method also allows all of the thresholds to be safely set very low without mistaking noise variations for command sounds. A major advantage of the tally method is that it discounts the overall amplitude of the command sound, thereby ensuring that all spoken commands are detected the same way regardless of how loudly or softly they are spoken (so long as the sound amplitude exceeds the sound threshold). The tally method automatically rejects brief noise excursions. Additional flexibility is provided since the tally method includes different thresholds for incrementation and command detection, as well as numerous optional parameters.

The inventive method includes detecting voiced and unvoiced sounds separately. Voiced sounds are produced by vocal cord resonance, whereas unvoiced sounds are produced by an obstruction in the air passage but without vocal cord involvement. All speech sounds comprise voiced and unvoiced sounds, along with intervening silent periods. Many applications must discriminate between voiced and unvoiced sounds, to recognize predetermined commands based on the order of the sound types for example, or to accelerate speech recognition, or for improved sound compression, among other uses. Prior art includes numerous means for discriminating voiced and unvoiced sounds such as frequency banding, zero-cross test, autocorrelation, and even analog electronic filters. Most preferably, voiced and unvoiced sounds can be detected quickly in the time domain by integrating and differentiating the waveform signal. When parameters are properly adjusted, the integration selects the voiced sounds, and the differentiation selects the unvoiced sounds, with very high computational efficiency.

The inventive method includes guiding the user to provide speech and silent intervals for calibration. Most embodiments of the inventive method set thresholds and detect commands with no such guiding and no assistance from the user whatsoever. The method automatically sets the initial detection threshold, automatically detects the first command, automatically adjusts the threshold according to the first command sound, and automatically detects all subsequent commands, even among substantial noise. The user does not know, or probably care, how the app does it. However, in some applications, it may be preferable to guide the user to assist in the threshold calibration. For example, messages could be displayed in a sequence, directing the user to speak particular command sounds or to remain silent at certain times, during which times the noise-based or command-based thresholds would confidently be set. Such a guided calibration would broaden the range of background levels and command levels that could be reliably discriminated, such as a noisy factory environment, for example, or a crowded sporting event.

The inventive method also includes presenting messages termed alert messages, which are triggered by sounds that exceed the detection threshold by a small amount, and by sounds that fall short of the detection threshold by a small amount. If the command sound exceeds the detection threshold by 10% of the detection threshold, for example, then an alert message may be displayed warning the user that the last command was weak. Or if a sound reaches only 90% of the detection threshold for example, then another alert message may be displayed indicating that a sound event was observed but was not accepted as a command. The alert messages will help the user catch false alarms and missed commands.

The inventive method provides an enabling start-up capability for next-generation applications in which software from one vendor needs to run on a device from another vendor. Since the signal levels of command sounds vary tremendously among different devices and users and operational conditions, the software must be able to quickly establish an effective threshold for command detection as soon as the application starts, and must then revise the threshold for improved detection as further data becomes available. The inventive method accomplishes exactly that. The inventive method provides means for detecting the first command empirically, and also provides continual refinement as further command and non-command signals arrive, and also enables continual tracking of the changing speech and background conditions as they occur. Thus the inventive method solves one of the major impediments to expanding markets in voice-activated applications worldwide.

BRIEF DESCRIPTION OF THE FIGURES

FIG. 22 shows a re-analysis of the commands of FIGS. 20 and 21, using the tally method to obtain superior voiced-unvoiced discrimination.

FIG. 24 is a list of equations, duplicating the equations in the specification text. These equations are provided as a figure, for clarity and ease of use.

DETAILED DESCRIPTION OF INVENTION

Glossary of Terms

Figure 1:
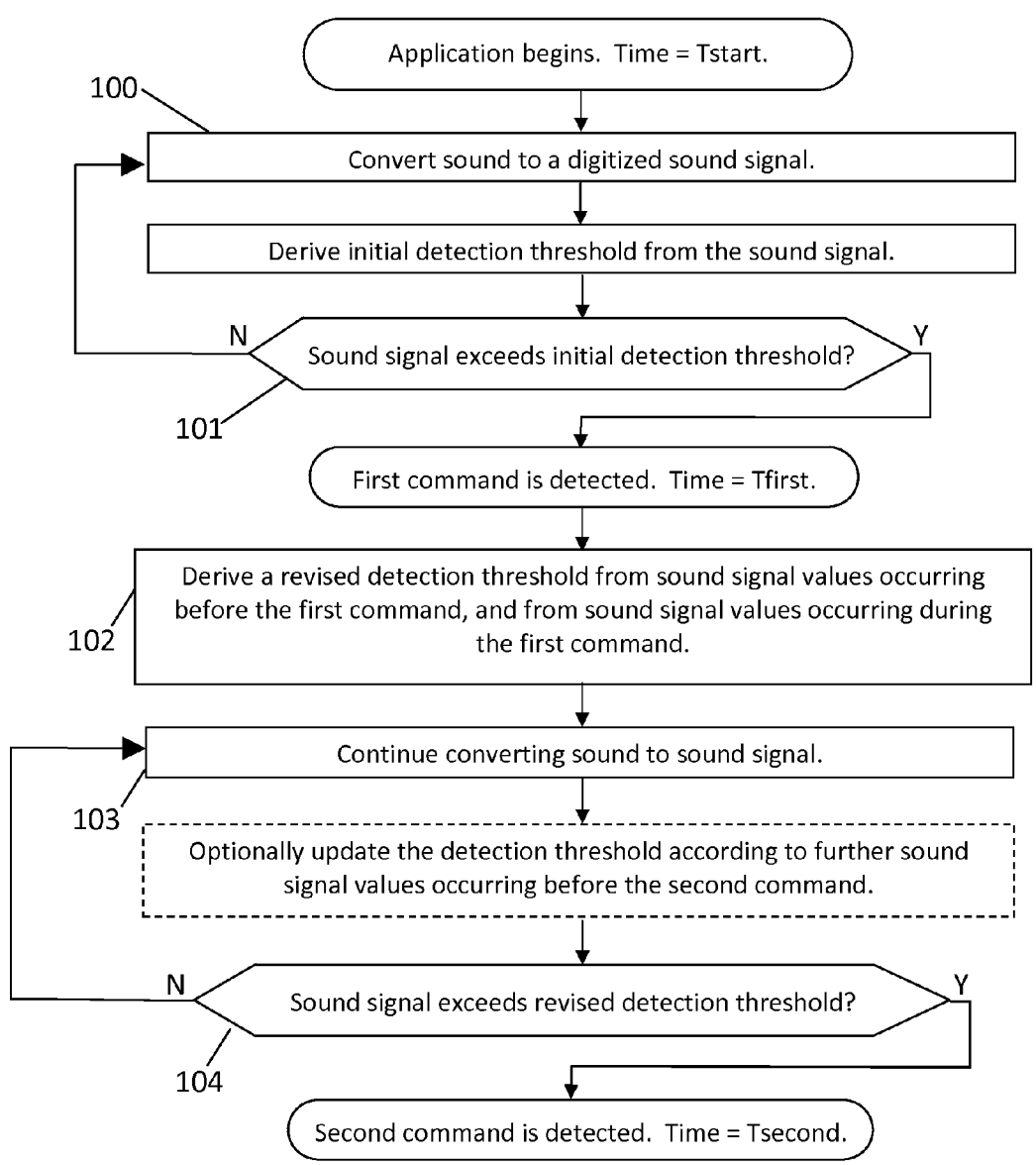
FIG. 1 is a flowchart showing how the inventive method enables detection of a first command based on noise alone, and then detects a second command using a detection threshold that includes both noise and command data.

Terms used herein are defined in the following glossary. In case of any disagreement between the definitions in this glossary and definitions appearing elsewhere in the specification, the glossary version shall prevail.

A "command" is any utterance spoken by any user, for the purpose of controlling a system.

A command is "detected" by comparing a threshold to a signal representing the sound of the command. Typically the command is detected as soon as the signal exceeds the threshold, or after the signal remains above the threshold for a certain time, or upon other detection conditions which may be applied.

A "false alarm" is a noise fluctuation that is incorrectly counted as a command.

The "probability of detection", or Pd, is the probability that a command will be detected. Typically, Pd is measured by speaking multiple commands, and Pd is the ratio of the number of commands detected divided by the number of commands spoken.

The "probability of a false alarm", or Pfa, is the probability that a noise fluctuation will be mistakenly detected as a command in a certain time interval. Typically, Pfa is measured by providing a number of intervals containing only noise, and Pfa is the ratio of the number of mistaken command detections divided by the total number of intervals provided.

A "waveform" is a bipolar signal representing sound, comprising sequential digital values with substantially zero offset bias.

To "rectify" a signal or digital value is to derive the magnitude of the signal or value.

To "smooth" a signal is to average sequential values of the signal. Typically the signal is rectified before averaging.

A "sound amplitude" is a unipolar digital value or signal, representing the sound. Typically the sound amplitude represents the intensity of the sound, and is typically derived by rectifying and smoothing a waveform signal.

"Noise" is any sound or signal other than the user's command speech. Any sound or signal occurring between commands is noise. Typically noise includes non-command speech such as side conversations, non-speech sounds such as music, and non-sound sources such as electronic pickup.

The "noise amplitude" is the sound amplitude occurring while no command is detected.

The "average noise amplitude" is a value or signal derived by averaging successive values of the noise amplitude.

The "command amplitude" is a value derived from the sound amplitude occurring while a command is detected. Typically the command amplitude is the maximum or the average of the sound amplitude during the command.

The "average command amplitude" is a value derived by averaging multiple command amplitudes from multiple commands.

The "ACNR" or average command-to-noise ratio, is equal to the average command amplitude divided by the average noise amplitude.

A "noise-based threshold" is an estimate of a threshold for detecting commands, derived from noise measurements.

A "command-based threshold" is an estimate of a threshold for detecting commands, derived from prior command sounds.

A "detection threshold" is a value that is compared to a signal representing sound, for the purpose of detecting commands. Typically the signal is the sound amplitude, and a command is detected when the sound amplitude exceeds the detection threshold. Typically the detection threshold is derived by functionally combining the noise-based threshold and command-based thresholds.

A "tally counter" is a register or memory element that can be incremented and decremented. Typically the tally counter is incremented while the sound amplitude exceeds a sound threshold, and is decremented periodically.

A "tally threshold" is a value that is compared to a tally counter for detecting commands. Typically a command is detected when the tally counter exceeds the tally threshold.

A "voiced" sound is any spoken sound produced by vocal cord resonance.

An "unvoiced" sound is any spoken sound produced by an air restriction and without vocal cord involvement.

To "integrate" a signal is to average successive values of the signal. Typically the averaging includes signal values that occur within a particular averaging span.

To "differentiate" a signal is to alternately add and subtract values of the signal. Typically the differentiation follows a formula such as a discrete differential formula, which includes values that occur within a particular differential span.

A signal is "substantially unchanged" if the signal remains within a predetermined range of a particular value. For example, a signal remains substantially unchanged if it remains within ±10% of the initial signal value.

Preferred Embodiments

The inventive method is a means for setting an initial threshold for detecting a first command before the signal level of the command is known, and a means for continuing to adjust the threshold based on detected command sounds. The threshold is initially derived from noise, and the first command is detected by comparing the sound amplitude to the threshold. After the first command is detected, the threshold is then updated to include the sound amplitude values occurring during the first command. Then a second command is detected using the updated threshold. The threshold is further updated according to the ongoing noise and command sounds, thereby improving the detection of subsequent commands.

The inventive method is based on two assumptions: (a) that each spoken command is preceded by an interval without command speech, during which time the ambient noise can be evaluated; and (b) that the sound of each command, comprising speech and noise together, has a higher amplitude than the noise alone. If these conditions are met, and the threshold is properly set, then the first command can be detected. In real situations, the two assumptions are almost always met. Assumption (a) is almost always met because users instinctively wait for an application to load and launch before speaking the first command, thereby giving the application time to quantify the noise before speaking the first command. Assumption (b) is almost always met since the sound of command speech plus concurrent noise is higher than the noise alone.

In rare situations, such as a high or changing noise background, the first command may be missed. In that case the user will generally pause momentarily and then say the command a second time; indeed it is human nature to do so. During that pause of relative silence, the noise-based threshold is automatically adjusted according to the actual noise level, thereby ensuring that the second spoken command will be detected. It is also human nature to say the second command somewhat louder, which also helps detection of the second command. If, however, both the first and second commands are missed, then there is simply too much noise for any voice-activated application to work reliably under the circumstances. A big advantage of the inventive method is that a brief non-command period is sufficient to calibrate the noise-dependent analysis parameters, and a brief command sound is sufficient to calibrate the command-dependent analysis parameters. The inventive method maximizes the ability of the application to automatically self-calibrate in the first moments of operation, thereby enabling the detection of all commands thereafter.

The starting time Tstart of the application is the time when the ADC generates the first digitized value from sound. All other times are relative to Tstart.

The inventive method may employ an incremental averaging procedure, which is an extremely efficient way to calculate an exponentially weighted running average of a signal. The following formula shows how to calculate an incremental average of a signal:

$$Av'=S*F+Av*(1-F) \qquad (1)$$

where Av' is the updated value of the average, S is the most recent value of the signal, F is a parameter, and Av is the previous value of the average. Typically the incremental averaging formula is applied upon each successive value of the signal, thereby updating the average and tracking any changes in the signal. The parameter F determines the averaging span. F is between 0.5 and 1.0, and usually is in the range of 0.8 to 0.999. The averaging span, expressed as a number of values included in each average, is equal to $1/(1-F)$. Expressed as a time interval, the averaging span is equal to $dt/(1-F)$, where dt is the time between signal values. For example, if F=0.99, the averaging span comprises 100 sequential values of the signal; and if the signal period dt is 0.1 milliseconds, the averaging time is 10 milliseconds.

The average noise amplitude is usually derived as a running average of the sound amplitude values between commands, using an averaging span termed TavNoise. Thus TavNoise is the averaging span for deriving the average noise amplitude. Preferably TavNoise is varied with time, being initially set to a short time for rapid convergence, and then to a longer time for a stable long-term measure of the average noise amplitude. For example, TavNoise may be set to a series of increasing span values at particular times after Tstart, thereby causing TavNoise to increase in a stepwise fashion. Alternatively, TavNoise may be set equal to Telapsed, the time elapsed since Tstart, thereby providing a gradually increasing TavNoise value. TavNoise could alternatively also be set proportional to Telapsed rather than equal to Telapsed. In all cases, however, it is preferable not to allow TavNoise to increase without limit, since this would prevent the application from adapting to a changing noise environment. Therefore TavNoise is preferably limited to a maximum value TavMax, which is preferably short enough that the application can follow any changes in the noise level, but long enough to provide a stable measure of the noise. Typically TavMax is in the range of 0.5 to 20 seconds, with 1 to 5 seconds being preferred for good responsiveness. With this limit, and with continuous varying of TavNoise over time, and with MIN representing the minimum of two arguments, the noise averaging span may be summarized as:

$$Tav\text{Noise}=\text{MIN}(Telapsed,Tav\text{Max}) \qquad (2)$$

The inventive method includes deriving an average noise amplitude by averaging the sound amplitude values that occur before the first command, as well as values occurring between the commands. However, the noise averaging may include a portion of the command sounds as well, since background sounds generally continue during the user's speech. A potential problem is that command sounds are louder than noise alone, and thus could artificially raise or "skew" the noise average. To prevent such skewing, the noise averaging could be totally inhibited whenever a command is detected, but this would make the application susceptible to a "lock-up" condition. In lock-up, the application freezes when the noise suddenly increases, driving the noise amplitude above the detection threshold, which prevents the detection threshold from ever being updated. A preferable approach is to continue averaging the sound amplitude as noise, but at a much reduced rate whenever a command is detected. The reduced rate of signal averaging during command sounds ensures that any skewing is minimized, but still allows the application to automatically recover from any potential lock-up condition.

For example, to prevent skewing of the average noise amplitude by loud command sounds, TavNoise may be temporarily set to a long value TavCmd while a command is in progress. Preferably TavCmd is long enough to prevent the loud command sounds from influencing the average noise amplitude, but not so long that the application is prevented from escaping a lock-up condition when the background noise suddenly changes. Typically TavCmd is in the range of 1 to 100 seconds, with 10 to 30 seconds being preferred.

The average noise amplitude may be a simple running average of the sound amplitude values. Alternatively, the average noise amplitude may include a function of the sound amplitude that emphasizes the higher values. For example, the square of the sound amplitude values, or other power, may be averaged, thereby emphasizing the higher values of noise. Or, the RMS (root-mean-square) of the sound amplitude values may be calculated as the average noise amplitude. Or a fast-rise-slow-fall protocol or other peak-decay algorithm may be used for that purpose. All of the functions that emphasize the higher sound amplitude values lead to a higher value than a simple average, and so Fnoise should be set somewhat lower in compensation. Developers take note: most peak-emphasizing protocols increase the risk that a command will be missed if the command sound rises too slowly. For example, if an averaging protocol emphasizes the peak noise, it could force the noise-based threshold to rise faster than the command sound rises, in which case the sound amplitude may never exceed the rising threshold. In that case the command will be missed. This condition would also leave the average noise amplitude artificially raised, as a result of the missed command being treated as noise, which would make it even more difficult to detect the next command. One way to prevent missing a command when the noise-based threshold rises more rapidly than the command sound, is by storing the noise data in a memory, such as a circular buffer, and applying any changes in the noise-based threshold only after a delay. For example a delay of 100 to 500 milliseconds would be sufficient to allow even a slowly-rising command sound to exceed the threshold before such increases are applied, thereby ensuring that the command would be detected. Artisans can test a custom noise averaging protocol and adjust Fnoise accordingly, by analyzing repeated command sounds and repeated silent intervals, then selecting Fnoise (and any threshold-updating delay) so that the noise-based threshold detects most or all of the commands with few or zero false alarms.

The following equations summarize the derivation of the noise-based threshold (ThN) and the command-based threshold (ThC), wherein angle-brackets denoting an average, <noise> is the average noise amplitude, and <command> is the average command amplitude, and other terms are as previously defined:

$$ThN=<\text{noise}>*F\text{noise} \qquad (3)$$

$$ThC=<\text{command}>*F\text{command} \qquad (4)$$

The inventive method includes deriving the detection threshold as a function of the noise-based and command-based thresholds. Typically the detection threshold is a simple average of the other two thresholds, which ensures that both noise and command sounds contribute to the detection threshold. Alternatively a weighted average may be used. For example, in an extremely low-noise environment, the weighting factor of the noise-based threshold may be reduced since the noise carries little useful information. In a high-noise environment, the command-based threshold may be weighted higher to avoid missing commands.

In some cases the detection threshold may be set to the maximum of the noise-based and command-based thresholds, for example in an application where it is critical to avoid false alarms. Or the detection threshold could be set to the minimum of the noise-based and command-based thresholds, for example when it is critical to avoid missing a command. The inventive method also includes changing how the detection threshold is calculated, in response to the noise and command amplitudes observed. For example the function for deriving the detection threshold could be changed from a simple average to a maximum value, or the analysis parameters such as Fnoise and Fcommand could be changed, or the weighting factors could be changed, responsive to high or low noise environments or other factors in real time. Subsequent commands would then be detected by comparing the sound amplitude to the detection threshold, after recalculating the detection threshold to include those changes.

In a low noise environment, it is possible for the noise-based threshold to become zero (or rounded to zero) before the first command is detected. This would likely cause numerous false alarms since even the slightest signal would be counted as a command. Therefore, the noise-based threshold is typically limited to at least a minimum value ThreshMin, and never to zero. Typically ThreshMin is 1 or some other positive number depending on the application.

The following equations show how the detection threshold may be derived from the noise-based and command-based thresholds. The detection threshold as a simple average, DetTh (average), is given by:

$$\text{Det}Th(\text{average}) = (ThN + ThC)/2 \quad (5)$$

The weighted average detection threshold, DetTh (weighted), is determined by the relative weighting factors WtN and WtC of the noise-based and command-based thresholds respectively, and where WtC=1-WtN. With this constraint, DetTh(weighted) is given by:

$$\text{Det}Th(\text{weighted}) = ThN \cdot WtN + ThC \cdot WtC \quad (6)$$

The maximum-based detection threshold DetTh(maximum) is given by:

$$\text{Det}Th(\text{maximum}) = \text{MAX}(ThN, ThC) \quad (7)$$

The minimum-based detection threshold DetTh(minimum) is given by:

$$\text{Det}Th(\text{minimum}) = \text{MIN}(ThN, ThC) \quad (8)$$

The detection threshold may also be required to remain above a minimum value ThreshMin, which can be included in each formula. For the average-based threshold the formula with the ThreshMin limit is as follows:

$$\text{Det}Th(\text{average,nonzero}) = \text{MAX}(\text{ThreshMin}, (ThN + ThC)/2) \quad (9)$$

As a further option, the method for calculating the detection threshold may be varied according to the relative amplitudes of noise and command sounds. Typically the ratio ACNR or average command-to-noise ratio, is calculated as the average command amplitude divided by the average noise amplitude as follows:

$$\text{ACNR} = \langle\text{command}\rangle / \langle\text{noise}\rangle \quad (10)$$

The ACNR is related to the SNR (signal-to-noise ratio). However the ACNR includes the background noise component during commands, whereas the SNR does not. Consequently the range of ACNR is greater than or equal to 1, whereas the range of SNR is greater than or equal to zero. For example, in a very quiet environment the noise is much lower than the command sounds, and so ACNR is large, ranging up to 150 typically for normal commands in a quiet room. In a noisy environment, or with very faint command sounds, ACNR is much lower, typically in the range of 4 to 12 for an industrial noise environment. If ACNR falls below about 2 or 3, applications will have trouble separating commands from noise.

The ACNR can be used to improve the detection threshold by revealing unusual sound environments. For example, if the detection threshold is derived as a weighted average of the noise-based and command-based threshold, then the relative weighting could be adjusted according to ACNR. If ACNR is high, the command-based threshold could be given most of the weight. But if there is a lot of noise or if the speech is faint, thus causing ACNR to be low, the noise-based threshold could be given greater weight.

As a further option, Fnoise or Fcommand may be varied according to ACNR. For example in a high-noise environment (with low ACNR), commands may be missed since the noise-based threshold would be set too high. This may be resolved by setting Fnoise lower when ACNR is low. Any such reduction in the detection factors must be done carefully since a low value of Fnoise could result in false alarms. In embodiments where the detection threshold is a simple average of the noise-based and command-based thresholds, it is usually not necessary to vary anything according to ACNR, because the detection threshold automatically adapts to changing sound conditions.

The noise-based and command-based thresholds are convenient intermediaries in deriving the detection threshold. As an alternative, the detection threshold could be calculated directly from the average noise amplitude and the average command amplitude, without ever calculating the noise-based and speech-based thresholds at all. The following equation shows how the detection threshold can be calculated as a weighted average, DetTh(weighted), but without using the noise-based and command-based thresholds. All terms have meanings as previously defined:

$$\text{Det}Th(\text{weighted}) = F\text{noise} \cdot \langle\text{noise}\rangle \cdot WtN + F\text{command} \cdot \langle\text{command}\rangle \cdot WtC \quad (11)$$

The detection threshold obtained using a weighted average of the noise-based and command-based thresholds (Eq. 6) is the same as that obtained using the average values directly (Eq. 11), and the two methods are mathematically equivalent. The inventive method includes all mathematically equivalent calculational methods for deriving the detection threshold, as well as all mathematically equivalent methods for all the other calculations disclosed herein. It is not possible to display all possible variations and equivalent calculational options in the following examples, and so only a representative subset of those calculation options will be shown. However, artisans will know how to adapt these examples to particular applications of the inventive method.

Discussion of the Figures

Turning now to FIG. 1, a flowchart shows the steps of the inventive method for detecting a first command and a second command. The process starts at time Tstart, which is when the digitizer initially begins digitizing the sound signal.

In box 100, sound is converted to a sound signal comprising sequential digital values representing the sound. The sound includes mechanical background noises, non-command speech, music, and any other source of sound energy. The sound signal also includes any electronic noise such as thermal noise, amplifier noise, switching pick-up and the like, since they can contribute to the sound signal (notwithstanding that they are not actually sound).

Then an initial detection threshold is derived from the sound signal values occurring before the first command. Usually the initial detection threshold is set substantially above the observed sound signal to avoid false alarms.

Then in the interrogator 101, the sound signal is compared to the initial detection threshold. If the sound amplitude is below the initial detection threshold, the process returns to box 100 to convert more sound. If the sound signal exceeds the initial detection threshold, then the first command is thereby detected.

Then in box 102, the sound signal values that occur during the first command are analyzed. A revised detection threshold is then calculated, using as input the sound signal values occurring before the first command (representing noise), in combination with the sound signal values that occur during the first command (representing command sounds).

Then, in box 103, more sound is converted to the sound signal. Optionally, as shown in dash, the revised detection threshold may be further updated according to the ongoing sound signal prior to the second command, which represents more noise. It is preferable to continue updating the threshold between commands so that any changes in the background noise may be tracked.

Then, in interrogator 104, the sound signal is compared to the revised detection threshold. If the sound signal fails to exceed the revised detection threshold, the process returns to convert more sound at box 103. If the sound signal exceeds the revised detection threshold, the second command is thereby detected, which is at time Tsecond.

After the second command is detected, the inventive method may provide further means (not shown) for adjusting the detection threshold on the basis of the second command sound, and then detecting a third command by comparing further sound signal values to the adjusted detection threshold. Thus the example of FIG. 1 demonstrates that the inventive method enables detection of a first command even when nothing is initially known about the commands or their signal levels, and then enables improved detection of a second command based on the noise and first-command sounds together.

Figure 2:
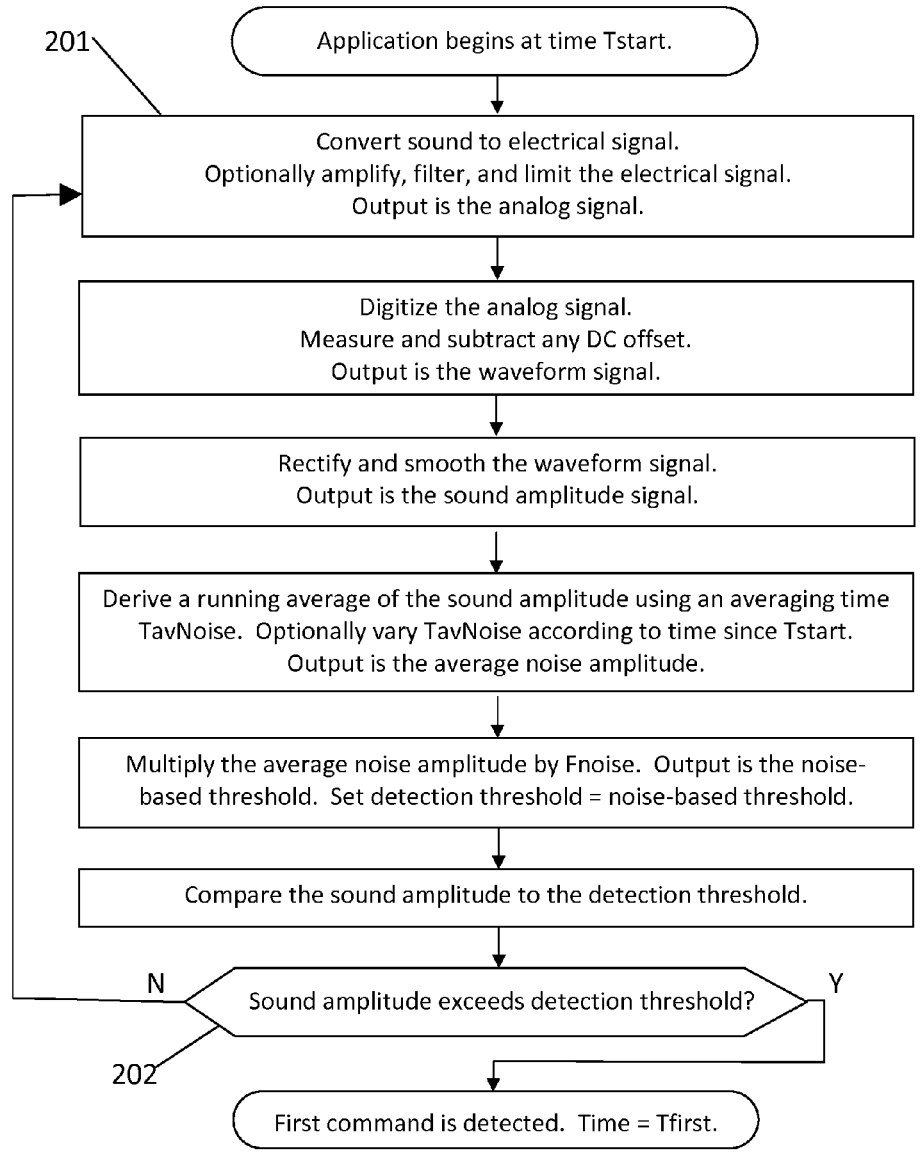
FIG. 2 is a flowchart showing in more detail how sound may be processed and the first command may be detected according to the inventive method.
Figure 3:
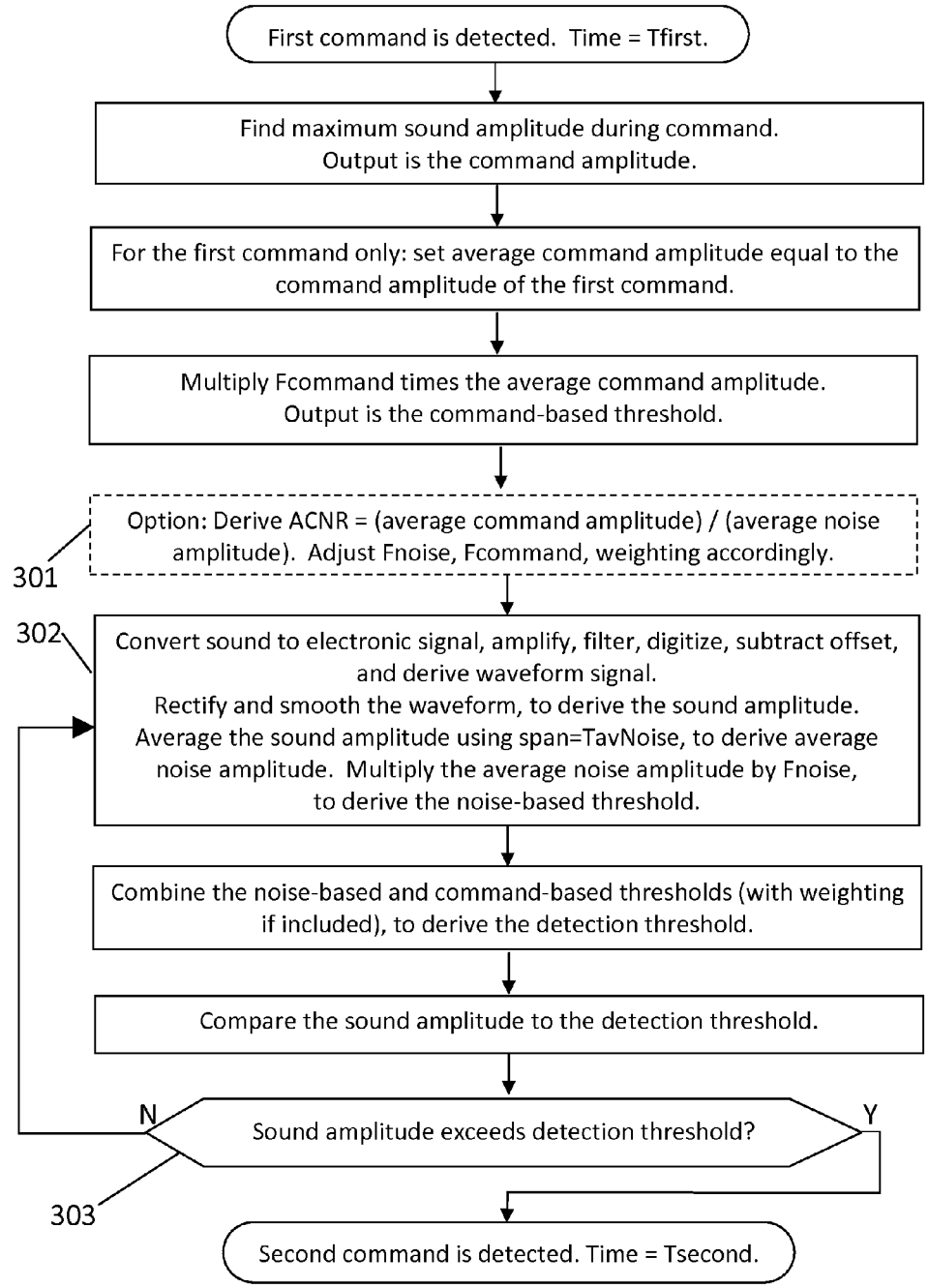
FIG. 3 is a continuation of FIG. 2, showing how a second command may be detected, with improvements accounting for both command sounds and noise.
Figure 4:
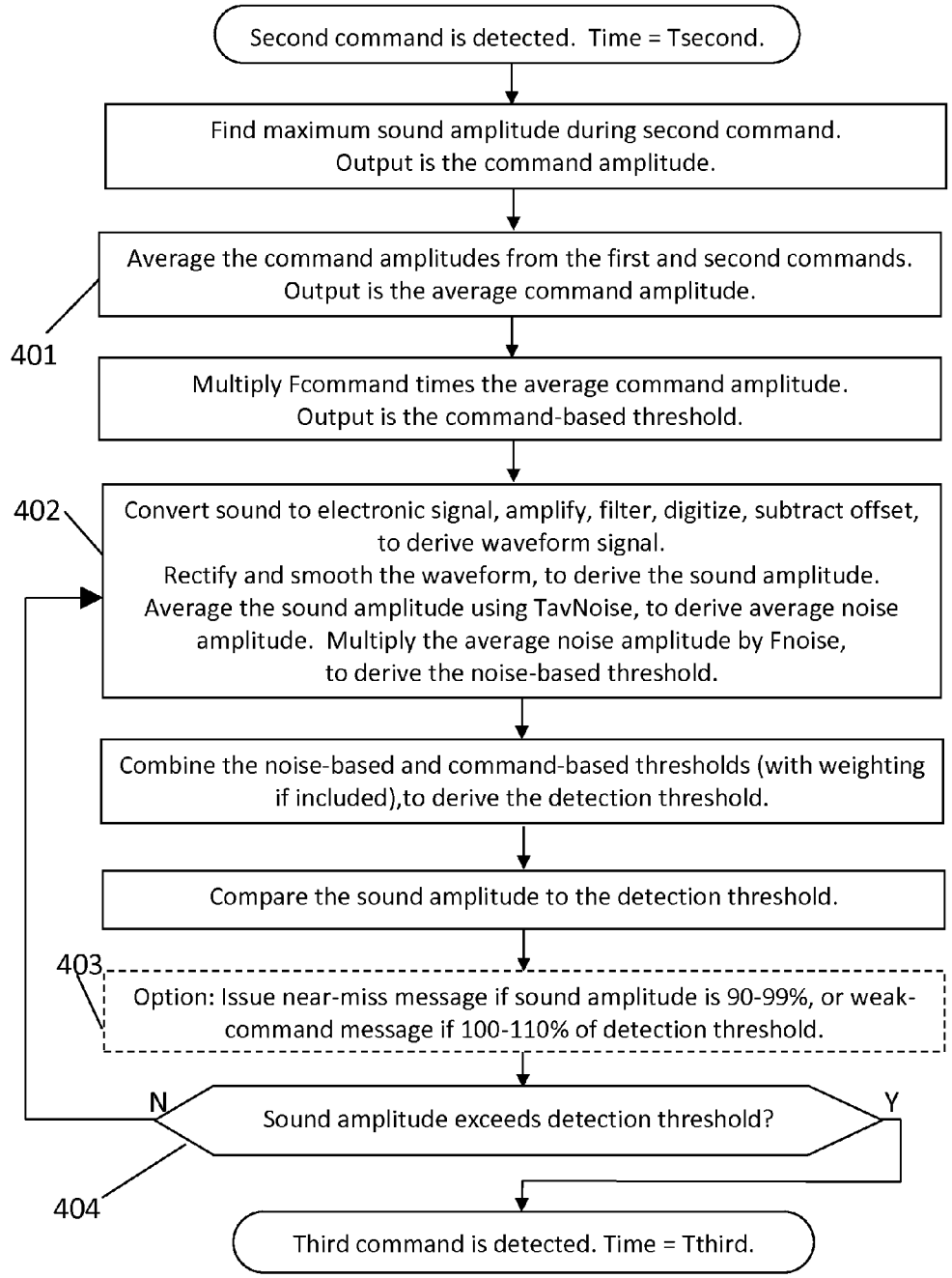
FIG. 4 is a continuation of FIG. 3, showing how a third command may be detected, with further improvements accounting for the noise and command sounds associated with the second command.

FIGS. 2, 3, and 4 are sequential flowcharts showing in more detail how the inventive method enables detection of the first command using the noise-based threshold, and then detection of the second command using the noise-based and command-based thresholds in combination, and then detection of a third command using updated values of the thresholds.

The flowchart of FIG. 2 shows the inventive steps beginning at time Tstart when an application implementing the inventive method is started. In box 201, sound is converted to an electrical signal using a transducer such as a microphone. The electrical signal is then typically amplified and filtered, preferably to admit only sound in the vocal range (typically 100 to 20,000 Hz), although other range limits may be applied to prevent aliasing and the like. The analog signal may also be amplitude-limited to minimize the saturation effect of any full-scale noise signals for example. The output is an analog electrical signal representing the sound.

Then the analog signal is digitized using, for example, an ADC or the like, thereby generating a digitizer output signal comprising sequential digital values that represent the sound. Preferably the digitizer output is then processed to remove any offset bias, for example by performing a long-term average of the digitizer output values and subtracting that average from the digitizer output. The output is the waveform signal, which is a bipolar signal representing the sound waves, with zero offset bias. (Although most mobile phones already arrange for zero offset bias, many embedded sensors are not so careful about voltages. Some ADC's code the digital midrange output to zero volts, thereby generating a huge offset bias numerically. Also some tablets output a temporary variation in the baseline when the application starts. Therefore it is a good idea to always calculate and subtract the offset bias.)

Then, the sound amplitude is derived from the waveform. Typically the waveform signal is rectified (by taking the magnitude of the waveform values) and smoothed (by averaging sequential rectified values) to obtain the sound amplitude signal. Preferably the smoothing average is a running average which spans a time Tsmooth which is in the range of 5 to 10 milliseconds. Such smoothing reduces many brief noise features while retaining speech sounds. As an alternative, the sound amplitude may be derived by squaring the waveform values, dividing by the average sound amplitude, and then smoothing. This also produces a unipolar signal representing the sound, but with more emphasis on the higher values of the noise. Or, the RMS (root-mean-square) of the sound amplitude may be calculated and smoothed. While each of these variations produces a unipolar signal corresponding to the intensity of the sound, the rectification procedure is the preferred method because it is quick and has been proven effective in many experiments.

Then, the average noise amplitude is derived. Typically the average noise amplitude is a running average of the sound amplitude representing noise, which includes the sound amplitude values that occur before the first command and between commands. The noise averaging preferably includes an averaging span TavNoise, which is set initially at a short value for rapid convergence, and then later is set to a longer value for increased stability. For example, TavNoise may be set to a short averaging time (such as a span in the range of 1 to 100 milliseconds) immediately after Tstart, and then set to successively longer values thereafter, thus increasing TavNoise in a stepwise fashion. Alternatively, for a gradual variation of the averaging span, TavNoise may be set equal to Telapsed, the amount of time elapsed since the application started. This would provide a rapid initial convergence, followed by stable averaging at later times. Alternatively, TavNoise could be proportional to Telapsed, thereby obtaining faster or slower progression depending on the proportionality used. Preferably TavNoise is limited to a value no greater than TavMax, which is typically in the range of 1 to 5 seconds, thereby ensuring that the application will respond quickly to any changes in the background level. As a further option, TavNoise may be increased or "stretched" to a much larger value TavCmd during command sounds. Preferably TavCmd is in the range of 10 to 30 seconds, to prevent skewing of the average noise amplitude by the command sounds while avoiding lock-up in case the noise suddenly changes.

Then the noise-based threshold is calculated from the average noise amplitude. Typically the noise-based threshold is set equal to the average noise amplitude times the factor Fnoise. Preferably Fnoise is high enough to avoid false alarms, but certainly not so high that the user needs to shout. Typically Fnoise is in the range of 2 to 6, with about 3.5 to 4.0 being most effective for a wide range of applications and systems. Also, for the first command, the detection threshold is set equal to the noise-based threshold alone, since the command sounds are still unknown at that time.

Then, in interrogator 202, the sound amplitude is compared to the detection threshold. If the sound amplitude fails to exceed the detection threshold, then the sound amplitude represents noise, and the process returns to box 201 to convert more sound. If the sound amplitude exceeds the detection threshold, the first command is thereby detected, at time Tfirst.

Optionally (not shown), the range of the detection threshold may be limited. For example the detection threshold may be required to be greater than zero. Or it may be required to be greater than a minimum value, ThreshMin. In that case the detection threshold would be set equal to the noise-based threshold if the noise-based threshold is greater than ThreshMin, and would be set equal to ThreshMin otherwise. This will prevent erratic behavior in certain low-noise environments before detecting the first command.

FIG. 3 is a continuation of FIG. 2 beginning at time Tfirst. The first command is still in progress. The sound amplitude during the first command is analyzed to derive the command amplitude, which in this example is the maximum value of the sound amplitude during the command. Thus the command amplitude is the maximum value of the sound amplitude values that exceed the detection threshold.

Then the average command amplitude is set equal to the command amplitude of the first command, since that is the only command detected so far. Then the command-based threshold is derived by multiplying the average command amplitude by a factor Fcommand, which is typically in the range of 0.1 to 1 and more preferably in the range of 0.2 to 0.5.

As an alternative, the dashed box 301 shows the values of Fnoise and Fcommand being adjusted according to the ratio ACNR, the average command-to-noise ratio. When noise is minimal and ACNR is large, Fcommand may be adjusted downward to improve detection of weak command sounds. Or in a noisy environment, where ACNR is low, Fnoise may be reduced to keep from missing commands. Alternatively, if the detection threshold is calculated as a weighted average of the noise-based and command-based thresholds, the relative weighting could be adjusted according to the ACNR. For example, the weighting of the noise-based threshold could be increased in a high noise environment. The inventive method thus provides the ability to adapt to changing command and noise conditions by varying Fnoise or Fcommand or the weighting factors according to the observed conditions.

Then, at box 302, further sound is detected, converted to an analog signal, digitized, offset-subtracted, rectified, and smoothed, thereby deriving the sound amplitude signal. Then the sound amplitude is averaged, using averaging time TavNoise, thereby updating the average noise amplitude, which is then multiplied by Fnoise to derive the updated noise-based threshold.

Then, the detection threshold is derived from the command-based threshold and the updated noise-based threshold. Typically the detection threshold is the average or the weighted average of the other two thresholds, or the maximum or the minimum of the other two thresholds.

Then, in interrogator 303, the sound amplitude is compared to the detection threshold. The second command may be detected as soon as the sound amplitude exceeds the detection threshold, as with FIG. 2. Alternatively, the second command may be detected only when the sound amplitude exceeds the detection threshold for at least a time Tmin. The Tmin requirement may be applied for detecting the first command but not the subsequent commands, or vice-versa. Also, Tmin may be varied according to the observed sounds, a different value being used for the first and second commands and subsequent commands. For example, Tmin may be altered according to the duration of the first command, or according to ACNR. For example, if ACNR is low, Tmin may be increased, to ensure that only valid command sounds are detected. But if ACNR is high, the Tmin requirement may be discarded as unnecessary in a low-noise environment. If the sound amplitude exceeds the detection threshold, and satisfies any other requirements such as the Tmin requirement, then the second command is thereby detected, which is at time Tsecond. If not, the process returns to box 302 to convert more sound.

FIG. 4 is a continuation of the example of FIGS. 2 and 3, showing how a third command can be detected according to the inventive method. The flowchart of FIG. 4 begins at Tsecond when the second command is detected. The second command amplitude is derived from the sound amplitude while the second command is in progress, in this case being the maximum value of the sound amplitude during the command.

Then in box 401 the average command amplitude is calculated as an average of the command amplitudes of the first and second commands. For subsequent detections, the command average is preferably recalculated as a running average of the command amplitudes of the prior commands. At the time of box 401, however, there are only two prior commands, so the average command amplitude is a simple average in this case.

Then the command-based threshold is updated my multiplying Fcommand times the average command amplitude.

Then, in box 402, further sound is converted to an analog signal, and then to a sound amplitude. The updated average noise amplitude is calculated as discussed for FIGS. 2 and 3. Then the noise-based threshold is updated by multiplying the average noise amplitude by Fnoise, as discussed.

The updated detection threshold is then calculated by combining the updated command-based threshold with the updated noise-based threshold. Then the updated detection threshold is compared to the sound amplitude to detect the third command.

Optionally, in box 403, a alert messages may be generated if the command is marginal. A near-miss message may be generated if the sound amplitude comes close to the detection threshold but does not exceed it, such as reaching between 90% and 99% of the detection threshold. The near-miss may be due to a noise fluctuation, or to the user speaking a command too weakly, in which case the user can correct the situation. Or, if the sound amplitude falls in a range of 100% to 110% of the detection threshold, a weak-command warning could be issued, indicating that the command was accepted despite being weak. Although the flowchart shows such messages being generated on each data cycle, in practice it would be preferable not to display the messages during the command. Instead, all alert messages should be withheld until the command or sound event has passed, to avoid displaying incorrect messages prematurely, which users would find quite annoying.

Then, in the interrogator 404, if the sound amplitude stays below the detection threshold, the process returns to box 403 to convert more sound. If the sound amplitude exceeds the detection threshold, a third command is detected, at time Tthird.

Although not shown in FIG. 4, the inventive method includes further updating the average command amplitude according to the command amplitude of the third command, and then updating the command-based threshold by multiplying with Fcommand. Then the detection threshold is updated according to the command-based threshold and any ongoing noise levels. Subsequent commands are then detected using the most recent value of the detection threshold.

After multiple commands have been detected, the command-based threshold is updated by calculating a running average of prior command amplitude values. For example, the running average may be a rectangular or box-car average of the prior Ncomd values, where Ncomd is some integer, or it could be an exponentially weighted average of the command amplitude with an exponential width of Ncomd values. Typically Ncomd, the number of previous command amplitude values averaged, is in the range of 3 to 10. If Ncomd is in this range, a single loud or soft command is able to change the command-based threshold only marginally, and yet the detection threshold will adapt to any changes in the user's speech after a few commands.

Figure 5:
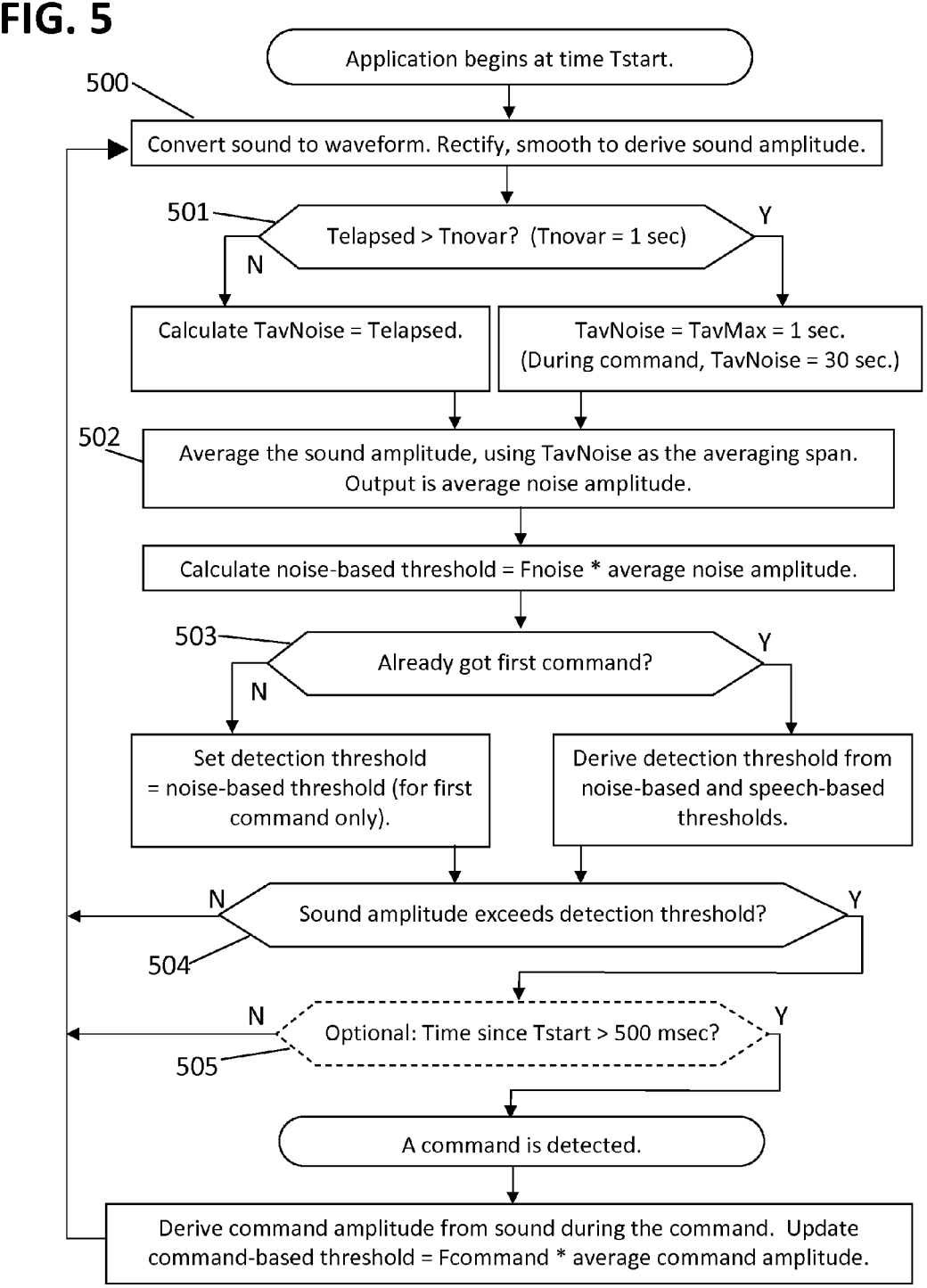
FIG. 5 is a flowchart showing how the inventive noise averaging time TavNoise may be varied according to the time elapsed since the application was started, for fast convergence initially and improved stability thereafter.

FIG. 5 is a flowchart showing how the noise-averaging time TavNoise may be varied to provide a fast initial convergence to the average noise amplitude by using a short TavNoise, and then to provide a stable average value by using a longer TavNoise thereafter.

The application starts at Tstart. In box 500, sounds are converted to a bipolar digital waveform signal, which is then rectified and smoothed to derive the sound amplitude, as discussed in the previous examples and figures.

Then, in the interrogator 501, the elapsed time since the start of the application, Telapsed, is checked. If Telapsed is less than a predetermined limit Tnovar (the N branch), the averaging span TavNoise is set equal to Telapsed. But if Telapsed is greater than Tnovar (the Y branch), then TavNoise is set to TavMax. TavNoise remains equal to TavMax thereafter. Both Tnovar and TavMax are equal to 1 second in this case. Thus the averaging span is varied smoothly for times less than Tnovar, and is constant after Tnovar.

Alternatively, the value of TavNoise could be checked, instead of Tnovar. In that case TavNoise would be increased until it reaches TavMax, and held constant thereafter. In either case, TavNoise starts out being equal to the elapsed time, but after 1 second TavNoise is set equal to TavMax and is held constant thereafter. More succinctly, TavNoise equals the minimum of Telapsed and TavMax.

Also on the Y branch, TavNoise is lengthened by setting TavNoise to TavCmd whenever a command is detected, with TavCmd=30 seconds in this case. After the command is finished, TavNoise immediately returns to its pre-command value. Due to the TavNoise stretching, command sounds will cause only a small increase in the noise-based threshold. It may seem odd that the stretched value of TavNoise can greatly exceed Telapsed, for example TavNoise being set to 30 seconds during the first command, even though the first command occurs just 1.5 seconds after the application begins. However this is not a problem operationally, since TavNoise merely regulates how much the average noise amplitude is altered by each subsequent value of the sound amplitude.

Continuing with FIG. 5 at box 502, the average noise amplitude is then calculated as a running average of the noise amplitude, using the current setting for TavNoise as the averaging span. Then the noise-based threshold is obtained by multiplying the average noise amplitude by Fnoise.

Then, the interrogator 503 checks whether the application is waiting for the first command or a later command. This is important because the command sound level is unknown prior to the first command. As shown with interrogator 503, the detection threshold is set equal to the noise-based threshold if the first command has not yet been detected, and the detection threshold is calculated from the command-based and noise-based thresholds together if the first command has already been detected.

After the detection threshold has been set, interrogator 504 checks whether the sound amplitude exceeds the detection threshold. If the sound amplitude fails to exceed the detection threshold, then the process returns to box 500 to convert more sound. If the detection threshold is breached, then the process flows to interrogator 505 which is optional and thus shown in dash. Here commands are suppressed for the a time period Tsettle beginning when the application starts. Many devices exhibit wildly unpredictable variations of the waveform signal when an app is launched, so it makes sense to inhibit command detection while the electronics settle down. Such a Tsettle time also provides sufficient time for the average noise amplitude to be accurately measured. Tsettle is 500 milliseconds in the case of FIG. 5, which is a sufficient delay for all of the devices tested to date. However, developers should be aware of this issue as new devices are introduced, and increase Tsettle if needed.

If the Tsettle time is not yet finished at interrogator 505, the process returns to box 500 to convert more sound. But if Tsettle is up, and if the sound amplitude exceeds the detection threshold in interrogator 504, then a command is detected.

Then, in the last box of the flowchart, the command amplitude is derived from the sound amplitude values occurring while the command is in progress. Then the average command amplitude is updated, and the command-based threshold is updated by multiplying the average command amplitude times Fcommand. Then the detection threshold is updated (not shown) according to the updated command-based threshold and the updated noise-based threshold. Thereafter, any subsequent commands (not shown) are detected using the updated detection threshold.

Figure 6A:
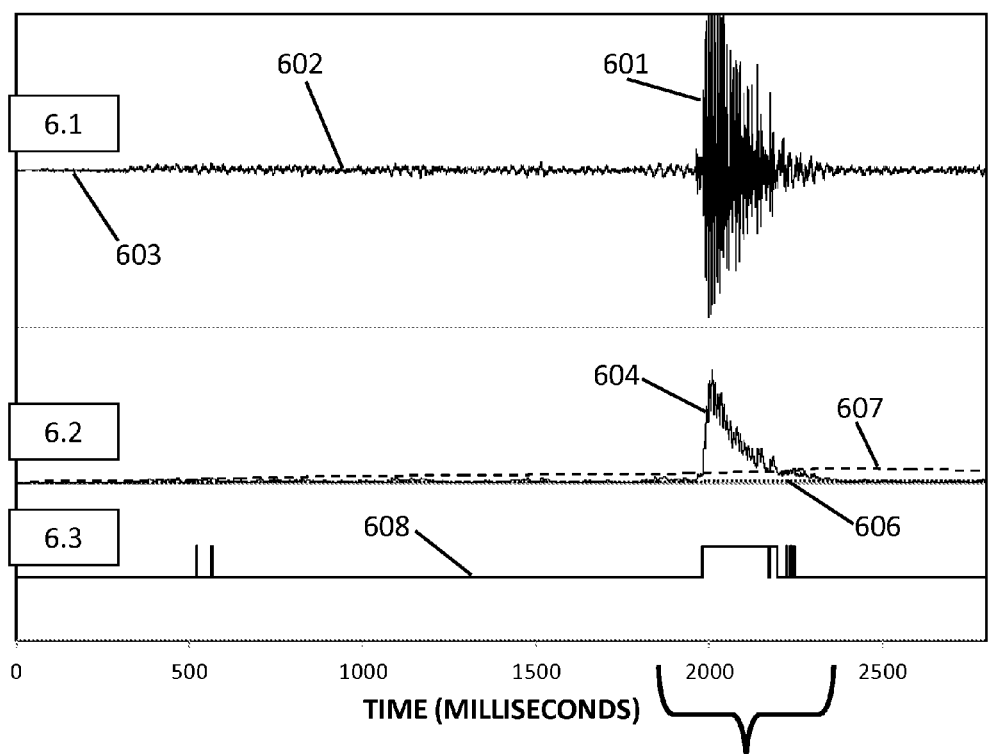
FIG. 6A shows traces, similar to oscilloscope traces, displaying the sound of a command and the derivation of the inventive noise-based threshold.

The inventive method was tested experimentally. A variety of mobile phones and tablets were programmed to process sound, self-calibrate with noise, detect the first spoken command, recalibrate using the command sounds, and then detect a second command. Following are the results of those tests FIG. 6A is a set of graphs with traces, similar to oscilloscope traces, showing various signals related to the inventive noise-based threshold before and during a spoken command "GO". The command was spoken in a normal way by a male speaker, in a relatively quiet laboratory. The sound was detected by an LG Optimus G, digitizing at 22 kHz and recording raw data to a file which was later transferred to a computer for analysis.

Trace 6.1 shows the waveform signal as a voltage versus time. The application starting time, Tstart, is at zero on the horizontal axis. The big waves 601 correspond to the command sounds, while the much lower variations 602 correspond to the background noise. Also an initial period 603 of low gain is apparent.

Trace 6.2 shows the sound amplitude signal 604 which was derived by rectifying and smoothing the waveform 601 and 602, using a smoothing time of 5 milliseconds. The sound amplitude 604 includes a clear positive signal during the command. The average noise amplitude 606 is shown as a line of small dots, which is hard to see because it is very low in the quiet environment of the test. The average noise amplitude 606 was calculated by incrementally averaging the sound amplitude 604, using a variable span TavNoise. Specifically, TavNoise=Telapsed for times less than 1 second, and for later times TavNoise=1 second. Also TavNoise was stretched to 100 seconds during the command. Also shown is the noise-based threshold 607 as a dashed line. The noise-based threshold 607 was obtained by multiplying the average noise amplitude 606 by Fnoise which was 5 in this case. The sound amplitude 604 remained below the noise-based threshold 607 until a time of about 2000 milliseconds (on the horizontal axis), at which time the command sound began. The noise-based threshold 607 remained nearly flat during the command due to the stretched TavNoise while command sounds were present.

Trace 6.3 shows a graph, similar to the display of a logic analyzer, of a sound detection flag 608 which indicates when the command sounds occurred. The command sounds were detected whenever the sound amplitude 605 exceeded the detection threshold, which was set equal to the noise-based threshold 607 for this first command. (The detection threshold is not shown because it would obscure the noise-based threshold line.) In addition, a couple of brief pulses are seen at about 550 milliseconds due to noise fluctuations, however these fluctuations were too brief to be counted as command sound. The command sound duration requirement Tmin was 50 milliseconds.

Figure 6B:
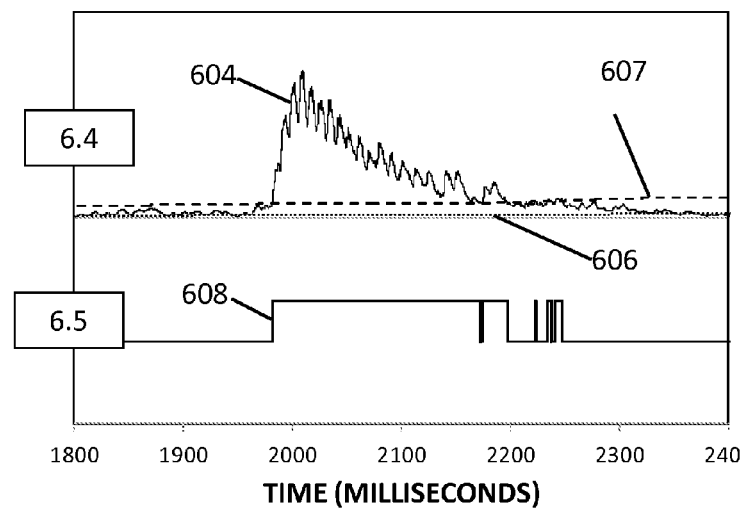
FIG. 6B is an expanded view of a portion of FIG. 6A.

FIG. 6B shows an expanded portion of FIG. 6A during the command sound. Features are labeled the same way as in FIG. 6A. In Trace 6.4, which is an expanded view of Trace 6.2, the sound amplitude 604 exhibits the command sound. The noise amplitude 606 is shown as a small-dotted line, which is very low since the background noise was low for this test. The noise-based threshold 607 is more easily seen, since it is 5 times larger (since Fnoise=5). Again, the detection threshold is not shown separately since it equals the noise-based threshold 607 for detecting the first command.

Trace 6.5 again shows the sound detection flag 608, which shows the command interval along with various post-pulses due to fluctuations in the tapering sound amplitude 604 after the command. The results of this test demonstrate that the first command can be detected by comparing the sound amplitude 604 to a detection threshold comprising a noise-based threshold 607, which equals Fnoise times the average noise amplitude 606.

Figure 7A:
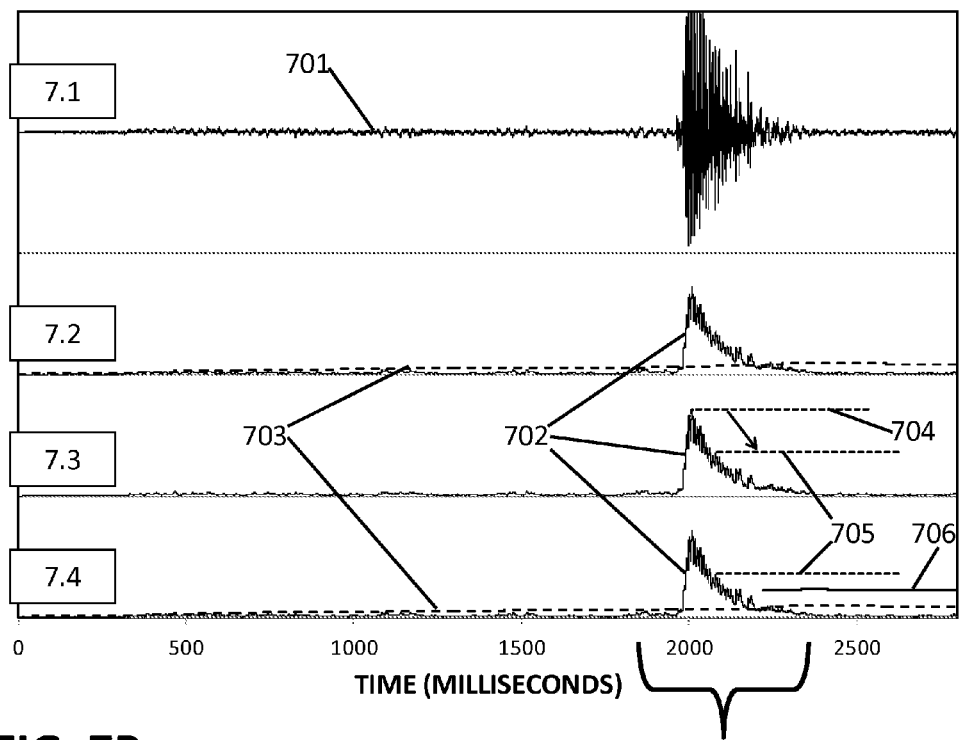
FIG. 7A shows the same waveform as FIG. 6A but with analysis parameters associated with the inventive command-based threshold.

FIG. 7A is a continuation of FIG. 6A but now regarding the command-based threshold and with updating of the detection threshold. Trace 7.1 shows the waveform signal 701 for the command, same as Trace 6.1.

Traces 7.2, 7.3, and 7.4 all show the same sound amplitude 703, which is a copy of Trace 6.2. The sound amplitude 703 was derived from the waveform signal 701 as described with FIG. 6A. Trace 7.2 and 7.4 also show the noise-based threshold 703 as a dashed line, which was obtained as described with FIG. 6A. The same curves are plotted repeatedly in this figure so that each analysis step can be displayed in sequence.

In Trace 7.3, the command sound was analyzed to obtain a command amplitude 704, which was the maximum sound amplitude occurring during the command. The command amplitude 704 is shown as a short-dash line. Then the command-based threshold 705 was obtained by multiplying the command amplitude 704 by Fcommand which is 0.5 in this case. The command-based threshold 705 is shown as a second short-dash line. A straight arrow symbolically indicates the derivation of the command-based threshold 705 from the command amplitude 704.

Trace 7.4 shows the derivation of the detection threshold 706, which is shown as a solid line. In the example of FIG. 7A, the detection threshold 706 was an unweighted average of the noise-based threshold 703 and the command-based threshold 705. Accordingly, the detection threshold 706 is plotted halfway between the other two thresholds 703 and 705.

Figure 7B:
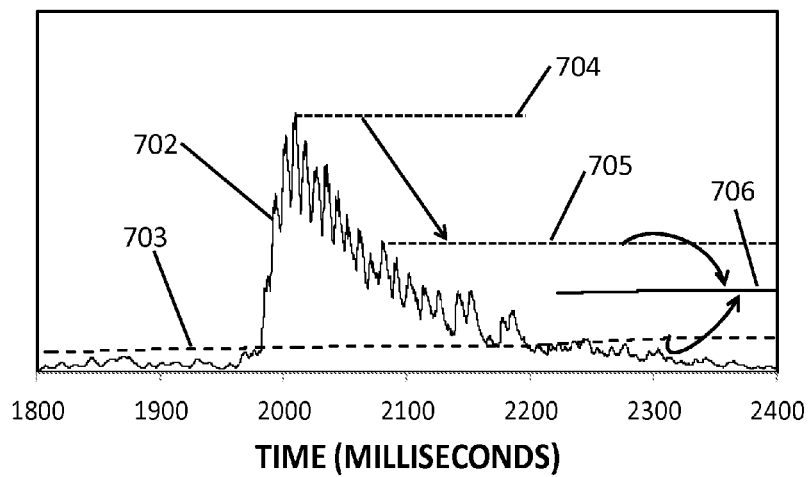
FIG. 7B is an expanded view of a portion of FIG. 7A.

FIG. 7B shows a magnified view of the sound amplitude 702 during the command. The noise-based threshold 703 again appears as a long-dash line, and the command amplitude 704 as a short-dash line, and the command-based threshold 705 is also shown as a short-dash line. Finally the detection threshold 706 was derived from the noise-based and command-based thresholds 703 and 705 by averaging them, as implied by two curved arrows.

In the example of FIG. 7A, Fcommand was set at 0.5. This setting enables the detection of subsequent commands having only one-half the peak sound of the first command. In other embodiments, Fcommand may be set lower, to enable detection of subsequent commands spoken more softly, or higher, to minimize the possibility that a noise fluctuation could be counted as a command.

Figure 8:
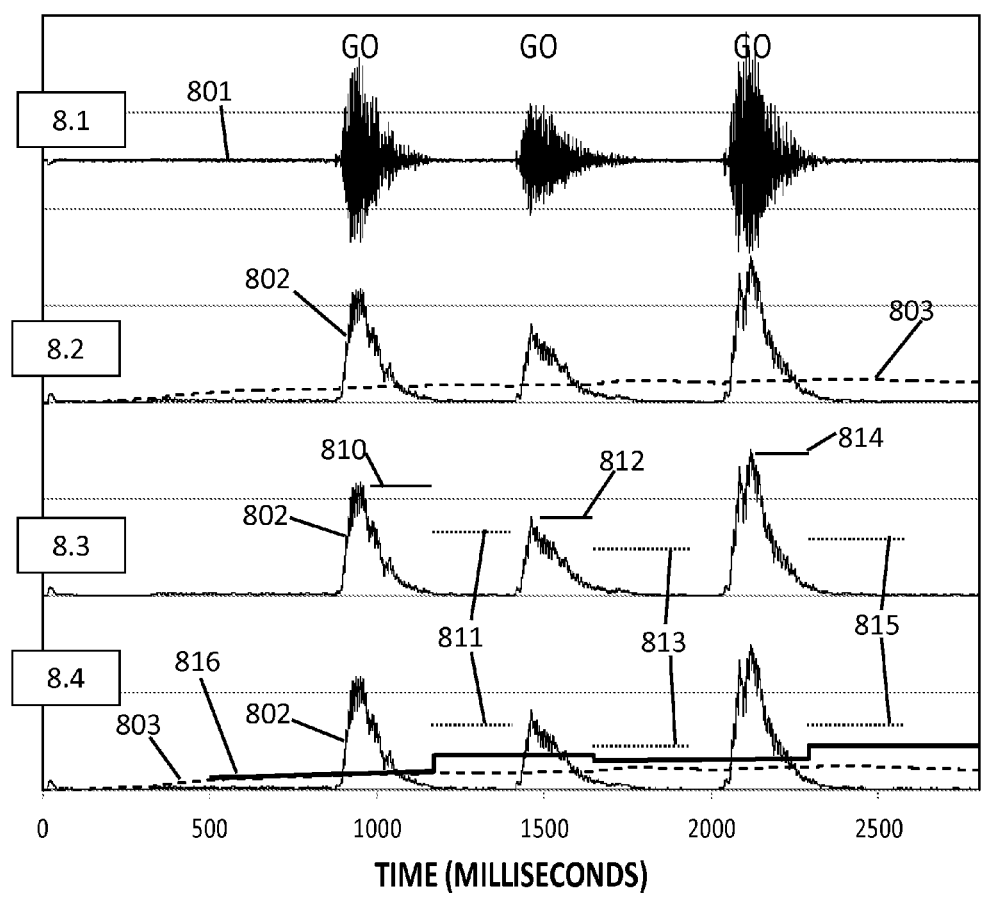
FIG. 8 shows how a series of three commands of different intensity may be detected using an adaptable threshold.

FIG. 8 shows an experiment to detect three "GO" commands in a row. The traces show how the various thresholds are adjusted after each command. The noise level was very low for this test. The noise-based threshold was obtained as a running average of the sound amplitude, using an averaging time TavNoise which was increased stepwise as time proceeded. The command amplitude of each command was the maximum sound amplitude during the command. The command-based threshold was calculated differently for each of the three commands, adapting to the available information after each command. Also, the detection threshold was initially set equal to the noise-based threshold, and then was recalculated as the average of the noise-based and the command-based thresholds after each command.

Trace 8.1 shows the waveform signal 801, including the sounds from the first, second, and third "GO" commands. The command words are also written across the top, roughly aligned with the other traces. The first command was of normal loudness, the second was relatively quieter, and third was the loudest.

Trace 8.2 shows the sound amplitude 802 which was derived by rectifying and smoothing the sound waveform 801. Also shown is the noise-based threshold 803 as a long-dash line, which was obtained by performing a running average of the sound amplitude 802, and then multiplying the result by Fnoise which in this example equals 4.5. The noise averaging time TavNoise was initially set to 500 milliseconds when the application started. After the first command, TavNoise was increased to 1000 milliseconds. Also TavNoise was stretched to 10 seconds during each command sound. The resulting noise-based threshold 803 gradually increased shortly after the application began, and then reached a steady value before the first command occurred at about 900 milliseconds. The noise-based threshold 803 then remained relatively flat while the first command was in progress, due to the stretched TavNoise during command sounds. After each command, the noise-based threshold 803 continued adapting slowly to varying background levels throughout the run.

Trace 8.3 shows how the command-based threshold was derived and updated with each successive command. Trace 8.3 again shows the sound amplitude 802, same as in Trace 8.2. Also shown are the first, second, and third command amplitudes 810, 812, and 814 respectively, and the first, second, and third values of the command-based threshold 811, 813, and 815 respectively. While the first command was in progress, the first command amplitude 810 was derived as the maximum of the sound amplitude 802 during the first command. Then the command-based threshold 811 was obtained by multiplying the first command amplitude 810 by Fcommand=0.55.

The second command amplitude 812 was then obtained as the maximum sound amplitude during the second command. The second command amplitude 812 was lower than the first command amplitude 810, since the second command was less loud. The second command-based threshold 813 was then calculated, but differently from the first command-based threshold 811. The second command-based threshold 813 was derived by averaging the command amplitudes of the first and second commands, 810 and 812 respectively, and then multiplying the result by Fcommand. The lower sound level in the second command thus caused the second command-based threshold 813 to be somewhat lower than the first command-based threshold 811, thereby demonstrating that the command-based threshold 811 adapted to the changing command properties.

The third command was then processed. The third command amplitude 814 was the maximum of the sound amplitude 802 during the third command. However, the third command-based threshold 815 was calculated differently from the other two commands. For the third command, the command-based threshold 815 was derived by performing a running average of all three of the command amplitudes (810, 812, and 814), and then multiplying by Fcommand. The resulting command-based threshold 815 was higher than the prior value 813, since the third command was louder, but was only slightly higher, since all three commands were averaged to derive the third command-based threshold 815.

To summarize, the first command-based threshold 811 was derived from the first command amplitude 810 alone, the second command-based threshold 813 was derived from an average of the first and second command amplitudes 810 and 812, and the third command-based threshold 815 was derived from all three command amplitudes 810, 812, and 814. Subsequent commands (not shown) would then be processed by averaging the three most recent command amplitudes. Thus the command-based threshold is initially set according to the command sounds that occur first, and then includes subsequent multiple commands as they occur, thereby adapting to changing speech levels over time.

In Trace 8.4, the sound amplitude 802 is again shown, same as the other traces. The noise-based threshold 803 is shown as a long-dash line, reproduced from Trace 8.2, and the command-based threshold values (811, 813, and 815) are also shown as dotted lines following each command, reproduced from Trace 8.3. The detection threshold 816 is shown as a heavy solid line, starting at 500 milliseconds, the end of Tsettle. The detection threshold 816 was initially set equal to the noise-based threshold 803 before the first command, and therefore the detection threshold 816 overlaps the noise-based threshold 803 before and during the first command.

The first command was detected at about 900 milliseconds when the sound amplitude 802 exceeded the detection threshold 816. After the first command was received and processed, and after the command-based threshold 811 was derived from the first command sounds, the detection threshold 816 was then set equal to the average of the noise-based threshold 803 and the command-based threshold 811, at a time of about 1200 milliseconds. As a result, the detection threshold 816 increased substantially at that time, since the command-based threshold 811 was substantially higher than the noise-based threshold 803. Such a threshold increase occurs after the first command whenever the environment is relatively quiet, because the first command is much louder than the noise level. Accordingly, when the detection threshold 816 was recalculated to include the command-based threshold 811, the command sound caused the detection threshold 816 to be raised sharply.

Then the second command was detected at about 1400 milliseconds when the sound amplitude 803 again exceeded the detection threshold 816. After the second command was analyzed and the second command-based threshold 813 was calculated, the detection threshold 816 was again updated by averaging the second noise-based threshold 803 and the second command-based threshold 813. This resulted in a slight downward correction to the detection threshold 816 at about 1600 milliseconds, due to the second command being quieter than the first.

Then the third command was detected at 2100 milliseconds. After the third command, the detection threshold 816 was again corrected upward, since the third command was loud, but the correction was relatively minor because it included all three commands. Subsequent commands (not shown) would then be detected in the same way, by averaging the prior three command amplitudes, and then multiplying by Fcommand to obtain an updated command-based threshold, and then averaging with the current noise-based threshold to obtain an updated detection threshold.

Other embodiments may use a different formula to calculate the average command amplitude. In the example of FIG. 8 the final command-based threshold 815 was obtained as a simple average of the command amplitudes of the three prior commands, times Fcommand. Alternatively, the command-based threshold could be derived by calculating an incremental average of prior command amplitudes, thereby obtaining an exponentially-weighted average of the prior command amplitudes, with the most recent values being emphasized more than those long past. Such a running average would enable faster responses to a changing command loudness, for example a change due to the user moving farther from the microphone.

The example of FIG. 8 demonstrates that three commands can be detected, with the first command being detected on the basis of noise alone, the second on the basis of noise and the first command's sound level, and the third on the basis of the noise and an average of the first two command sound levels. The example also demonstrates that the detection threshold may be updated based on a running average of prior command averages, thereby allowing the application to adapt to changing speech levels.

Figure 9:
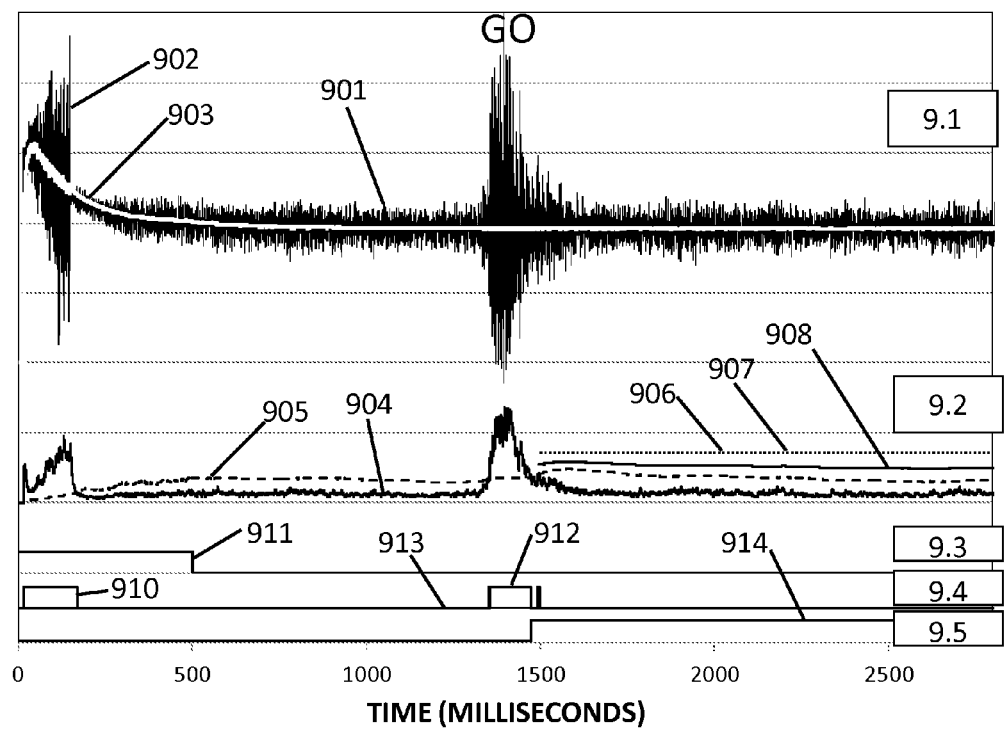
FIG. 9 shows command analysis and detection using the inventive method, despite increased noise and other interference.

FIG. 9 shows how a "GO" command can be detected in the presence of multiple noise sources. For this test, the noise level was about 65 dBA (deciBel with A-weighted spectral response that approximates human hearing). 65 dBA is moderately noisy, corresponding for example to a bustling retail environment, but with no loud or nearby conversations. Major noise and baseline variations were observed at application startup. Nevertheless, the method successfully derived a sound amplitude, rejected false triggers, and derived a detection threshold based on the noise amplitude and command amplitude. The analysis was slightly different from the previous examples. The process started with the digitizer output rather than the waveform so that the offset bias could be illustrated. Also, the command amplitude was derived from an average of the sound amplitude during the command, rather than the maximum sound amplitude. Accordingly the factor Fcommand was set to 1, a higher value to compensate for the command amplitude being an average instead of a maximum value. Since Fcommand was unity, the command-based threshold was equal to the average command amplitude.

In Trace 9.1, the digitizer output signal 901 is shown including a high background noise level along with the sound of a "GO" command at about 1500 milliseconds. The digitizer output signal 901 also included a strong early noise feature 902 that suddenly ended at about 100 milliseconds. Such an early noise feature 902 could be due to digital electronic switching taking place in the device while the application finished booting up. The digitizer output signal 901 also had a baseline offset that varied substantially in the first 200 milliseconds or so, and then became constant. According to the inventive method, the baseline offset 903 (shown as a white line embedded in the digitizer output signal 901) was calculated by incremental averaging of the digitizer output signal 901, but with a variable averaging time Tbaseline. For the example of FIG. 9, Tbaseline was initially set to 1 millisecond, and then was raised to 100 milliseconds and then to 1000 milliseconds, and remained constant thereafter. The short initial averaging span allowed the application to closely track the changing baseline offset 903, while the longer averaging span at later times provided a more stable measure of the offset.

Trace 9.2 shows the sound amplitude 904, obtained by subtracting the baseline offset 903 from the digitizer output signal 901, rectifying the result, and incrementally averaging that result with a smoothing time of 5 milliseconds. The noise-based threshold 905 was obtained by further averaging the sound amplitude 904 using a variable noise averaging time TavNoise, and then multiplying by Fnoise=4. TavNoise initially was set equal to 20 milliseconds during the settling time so as to obtain a fast initial convergence to the ambient noise level. Then at the end of Tsettle, TavNoise was changed to 200 milliseconds. Also, TavNoise was stretched by a factor of 100 whenever the sound amplitude 904 exceeded the noise-based threshold 905, which occurred during the noise event 910 and the command 912.

Also shown are the command amplitude 906, obtained by averaging all the sound amplitude 904 values during the command, and the command-based threshold 907, obtained by multiplying the command amplitude 906 by Fcommand. Both the command-based threshold 907 and the command amplitude 906 appear as the same dotted line because, as mentioned, Fcommand=1. Also shown is the detection threshold 908 as a solid line, equal to the average of the noise-based and command-based thresholds 905 and 907.

Trace 9.3 shows the settling-time flag 911 as a logic-type signal that indicates when the 500 millisecond Tsettle period occurred. Trace 9.4 shows the sound detection flag 913 that indicates when the sound amplitude 904 exceeded the noise-based threshold 905, particularly indicating the command interval 912. The early noise feature was also detected as interval 910, but was ascribed to noise since it occurred during Tsettle. Trace 9.5 shows a post-command flag 914 that shows when the command was finished.

As can be seen from the figure, the early noise 902 caused the sound amplitude 904 to rise above the noise-based threshold 905 for about 100 milliseconds, thus registering as a sound event 910. The noise-based threshold 905 increased during that time, but the increase was relatively slow because TavNoise was stretched during the noise event 902. Then, after the noise event 902 was over, the noise-based threshold 905 continued to track changes in the background, and then became more stable at the end of Tsettle when the noise averaging time TavNoise switched to the longer value.

Then, during the command, the sound amplitude 904 again exceeded the noise-based threshold 905 during interval 910. However, the noise-based threshold 905 hardly changed at all during the command, despite the louder command sounds, since TavNoise was stretched to 20 seconds during the command sound 912. Then, during the post-command time 914, the noise-based threshold 905 continued to track the noise level including a slight rise due to lingering command sounds. However, the TavNoise stretching ended when the sound amplitude 904 dropped below the noise-based threshold 905, at which time TavNoise reverted to its earlier value of 200 milliseconds, which allowed the noise-based threshold 905 to quickly return to the pre-command level The command amplitude 906 was obtained as the average of the sound amplitude values 904 during the command. This is in contrast to the previous example wherein the command amplitude was the maximum sound amplitude. In compensation, the multiplier Fcommand was set to a higher value than the previous example.

The detection threshold 908 was then calculated as the simple average of the noise-based threshold 905 and the command-based threshold 907. The background noise caused the noise-based threshold 905 to be higher than it would have been in a quiet environment, and this caused the final value of the detection threshold 908 to be slightly higher than it would have been if the room were quiet. The early noise event 902 and the variable baseline offset had no effect on the detection threshold 908.

The example of FIG. 9 demonstrates that the inventive method can provide a reliable first-command detection even in the presence of complex noise, and then can establish an improved detection threshold based on the command sound.

Figure 10A:
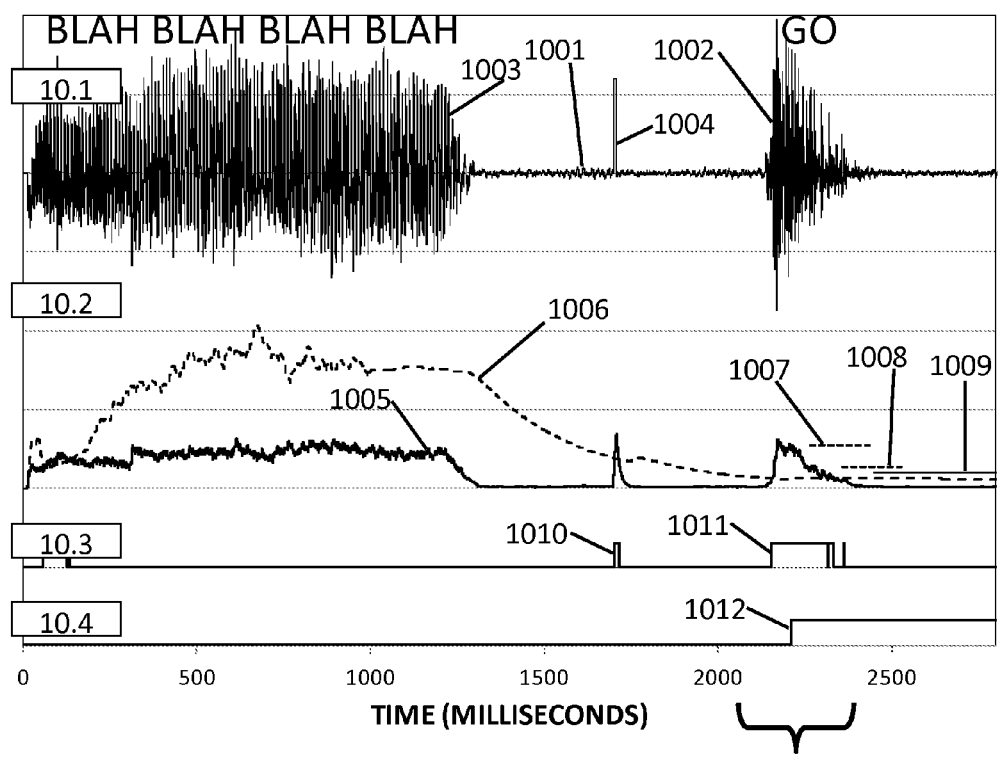
FIG. 10A shows successful command detection even with higher prolonged noise.
Figure 10B:
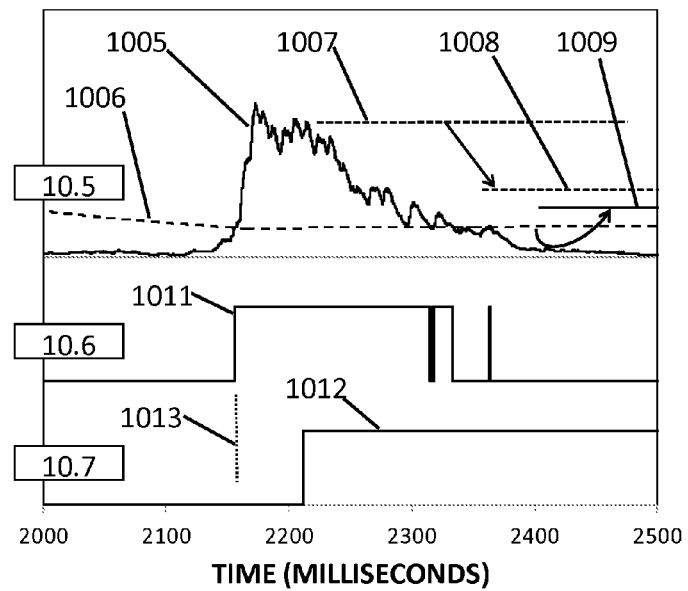
FIG. 10B is an expanded view of a portion of FIG. 10A.

FIG. 10A shows an even more challenging test. FIG. 10B is a magnified view of a portion of FIG. 10A. This example differs in several ways from the previous examples. The noise-based threshold was derived from the rectified waveform directly, not by averaging the sound amplitude. Also the noise-based threshold was derived using a peak-emphasizing function of the rectified waveform, rather than the magnitude value, so as to track the maximum noise peaks better.

Also, a delay time of Tdelay=50 milliseconds was introduced in the noise-based threshold calculation. The noise level was included in the noise-based threshold calculation only after this delay. The purpose of Tdelay was to minimize skewing of the noise-based threshold caused by the rising pre-detection command sounds. Often a spoken command includes a brief period of rising sound just before the command is detected, and this rising sound causes the noise-based threshold to increase. TavNoise stretching prevents skewing after the command is detected, but cannot prevent skewing from the pre-detection sound. The added delay solved this problem by including the pre-command sound into the stretched TavNoise interval, thereby minimizing the skewing from pre-detection rising sound.

Also, the TavNoise stretching was modified so that the stretching was applied if a command sound was detected at any time during the Tdelay interval, rather than just at the beginning of the interval. This change prevented the lingering post-command sounds from skewing the noise-based threshold after the end of the detected interval.

Also, the minimum detection time requirement Tmin=50 milliseconds was applied, so that the first command was detected only when the sound amplitude exceeded the detection threshold for a time Tmin. The post-command flag was raised as soon as the command was detected after Tmin, rather than at the end of the command interval. Each of these features and changes influenced the noise rejection and the command detection in different ways, as will be detailed below.

Trace 10.1 shows the waveform signal 1001, which includes the sound 1002 of a command "GO", and a prolonged background sound 1003, and a glitch or brief pulse 1004 at about 1700 milliseconds. The user, very uncooperatively, was talking while the application started up, and continued talking for about 1.2 seconds into the run, resulting in the prolonged background sound 1003. The challenge for the inventive method was to ignore the prolonged background sound 1003 and the glitch 1004, and then detect the command sound 1002.

Trace 10.2 shows the sound amplitude 1005, obtained by rectifying the waveform signal 1001 and incrementally averaging with a 10 millisecond smoothing time as usual. Also shown is the noise-based threshold 1006, obtained with a peak-decay function and a time delay. First, the waveform 1001 was rectified, thereby producing a rectified waveform signal (not shown). Then, a signal termed the peaked-sound signal (not shown) was derived from the maximum values of the rectified waveform. Specifically, the peaked-sound signal was set equal to the rectified waveform whenever the rectified waveform was greater than the peaked-sound signal. Then the peaked-sound signal was reduced with a 1 millisecond decay time, until the next peak of the rectified waveform. Thus the peaked-sound signal tracked the maximum values of the rectified waveform with a fast-rise-slow-fall function. Then the peaked-sound signal was averaged (not shown) using a span TavNoise. TavNoise was increased to 10, 100, and 1000 milliseconds in a stepwise fashion, and was stretched to 20 seconds during command sounds. Then the noise-based threshold 1006 was obtained by adding a delay time of Tdelay=50 milliseconds to the averaged peaked-sound signal, and then multiplying by Fnoise=1.5, the result being the noise-based threshold 1006. The noise-based threshold 1006 thus exhibits the maxima of the waveform 1001, but with a 50 millisecond time offset which can be seen in the chart. For example, the glitch 1004 caused a slight rise in the noise-based threshold 1006 at about 1800 milliseconds, which was 50 milliseconds after the glitch. This illustrates how the time delay shifted the entire noise-based threshold 1006 curve to the right by Tdelay.

Trace 10.2 also shows the command amplitude 1007 as a short-dash line, which was the maximum of the sound amplitude 1005 occurring during the post-command interval 1012. Unlike the previous example, the post-command interval 1012 began as soon as the required detection interval Tmin was met. The command-based threshold 1008 is a barely visible short-dash line, obtained by multiplying the command amplitude 1007 by Fcommand=0.5. The detection threshold 1009 is a solid line, and was derived by averaging the noise-based threshold 1006 and the command-based threshold 1008. (These lines are easier to see in the magnified view.)

Trace 10.3 shows a sound-detection flag which indicates when the sound amplitude 1005 exceeded the noise-based threshold 1006, including the glitch event 1010, and the sound interval 1011

Trace 10.4 shows the post-command interval 1012, which began as soon as the sound amplitude 1005 had exceeded the noise-based threshold 1006 for the required time Tmin. Therefore the post-command interval 1012 began at a time 50 milliseconds after the command sound began. The glitch event 1010 was ignored because the duration of the glitch event 1010 was only about 10 milliseconds, which was less than the Tmin command duration requirement The magnified view, FIG. 10B, shows the same signals but magnified. Trace 10.5 again shows the sound amplitude 1005, and the noise-based threshold 1006 as a long-dash line, along with the command amplitude 1007 as a short-dash line. The command-based threshold 1008, also a short-dash line, was obtained by multiplying the command amplitude 1007 by Fcommand, as symbolized by a straight arrow. Then the detection threshold 1009, shown as a solid line, was obtained by averaging the noise-based threshold 1006 and the command-based threshold 1008, as symbolized by a curved arrow.

As can be seen in Trace 10.5, the noise-based threshold 1006 was high after the early noise 1003, and then began declining steady until the command. There was no detectable increase in the noise-based threshold 1006 at the beginning of the command despite the gradually rising sound at about 2150 milliseconds. This is because the noise-based threshold 1006 was updated only after a delay (Tdelay=50 milliseconds), which shifted the pre-detection speech sounds into the sound interval 1011, where TavNoise was stretched, thereby suppressing any effect of the pre-detection speech sound. Without such a delay, the gradually rising sound prior to about 2150 milliseconds would drive the noise-based threshold 1006 higher, as was seen in the previous examples. Thus the delayed averaging of the sound amplitude 1005 ensured that the noise-based threshold 1006 would not be skewed by the pre-detection sounds.

Trace 10.6 shows the sound interval 1011, which began when the sound amplitude 1005 exceeded the noise-based threshold 1006. Trace 10.7 shows the post-command interval 1012 and a dotted line showing the sound starting time 1013 at which the sound amplitude 1005 first exceeded the noise-based threshold 1006. The post-command interval 1012 began at a time of 2210 milliseconds, when the Tmin requirement was met. Hence the time between the command sound time mark 1013 and the start of the post-command interval 1012 was Tmin.

To test the effectiveness of the Tdelay in preventing pre-command skewing, the same sound data were re-analyzed off-line but without the delay in the noise-based threshold calculation, (actually, by setting Tdelay=0). In that run (not shown), the resulting noise-based threshold did indeed rise substantially in the milliseconds before the sound was detected, due to the presence of sound before the command was detected. The results of FIG. 10B and the re-analysis demonstrate that a 50 millisecond delay in the noise-based threshold updating can prevent skewing of the noise-based threshold due to the rising speech sound that occurs before the command has been detected.

Close inspection of the command amplitude 1007 line in FIG. 10B shows that it does not equal the maximum sound of the command. In this example, the command amplitude 1007 equals the maximum of the sound amplitude 1005 occurring after the command has been detected, which is when the Tmin requirement has been met at a time of 2210 milliseconds. After detection, the command amplitude 1007 was calculated from the remaining portion of the command, and the sound occurring during Tmin was not included in the command amplitude 1007. This is unfortunate since the highest command sounds occurred during Tmin. As an alternative, the sounds during Tmin could be included in the command amplitude calculation by analyzing the sound during Tmin and storing the maximum value in a memory. Then, if the command sound continues to exceed the threshold at the end of Tmin, the amplitude information during Tmin could be included in the command amplitude calculation. And if the sound ends before Tmin is up, the pre-detection sound data would be discarded. Storing the maximum sound amplitude during the Tmin interval, and then conditionally including it in the command amplitude, would allow the entire command sound to be used in the command amplitude calculation, so long as the command meets all other detection criteria and is actually detected before the Tmin period expires.

The period of relative silence in this example is extremely important. The period of relative silence lasted about 1 second, from the end of the early noise 1003 to the beginning of the command 1002. The period of relative silence allowed the noise-based threshold 1006 to subside after the early noise 1003, which enabled detection of the first command sound 1002. If there were no such silent period (for example, if the user had continued chattering all the way to the beginning of the command) then the noise-based threshold would still have been elevated when the first command was spoken, which would have caused the first command to be missed. In general, the first command will be missed if a noise, with an intensity comparable to the command intensity, continues from the starting time up until the first command is spoken.

An advantage of the inventive method is that it enables a full recovery in case the first command is missed. The user, upon seeing that the first command has been missed, will usually pause for a moment and then speak the command a second time, slightly louder. Most users do exactly the same steps—pause and then speak louder—when a newly installed application misses the first command. As the traces in FIG. 10A demonstrate, a one-second pause is sufficient to correct the noise-based threshold 1006, and this would be enough to detect the second command. The analysis would then treat the second command as if it were the first command, and would proceed to derive the detection threshold from the noise-based and command-based thresholds as usual, and all subsequent commands would be detected as usual. Thus the inventive method provides a rapid, transparent recovery even when the user flagrantly obscures the first command with chatter, on the second try. Every user has to stop for a breath eventually, and at that time the inventive method discovers the true noise level, corrects the thresholds, and detects the next command as usual.

Noise is a key parameter in deriving thresholds for speech detection. To study the effect of different noise levels, an experiment was carried out to acquire command data with different levels of background noise. The command was "GO". Broadband pink noise was provided by a set of ventilation fans placed at various distances from a mobile phone. The user was 50 cm. from the phone, and attempted to make all commands the same loudness despite the changing backgrounds. The noise level was measured with a digital acoustical noise meter in dBA. By adjusting the fan positions, the noise level was set to various levels between 40 and 70 dBA. A 40 dBA level corresponds to a very quiet closed room with all fans off. Most offices are in the 50-60 dBA range. 70 dBA is bothersome noisy, like a big vacuum cleaner running right behind your chair. Thus the experiment covered the range of noise conditions likely to be encountered by implementations of the inventive method.

Figure 11:
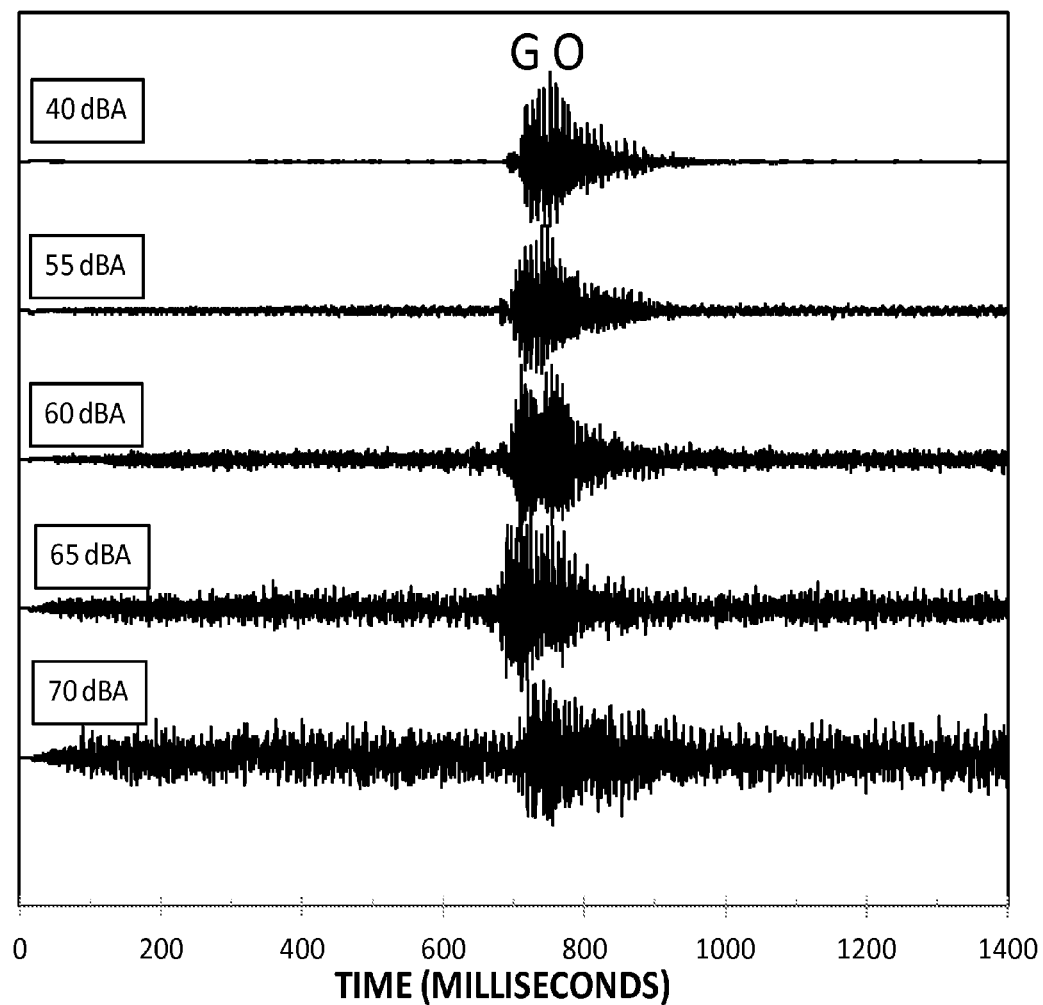
FIG. 11 shows a series of command waveforms with background noise ranging from very quiet to very noisy.

FIG. 11 shows the results of the experiment. Five traces show the waveforms of the command along with background noise at 40, 55, 60, 65, and 70 dBA. The highest noise case was clearly challenging since the command sounds barely exceeded the noise level. The analysis continues in the next figure.

Figure 12:
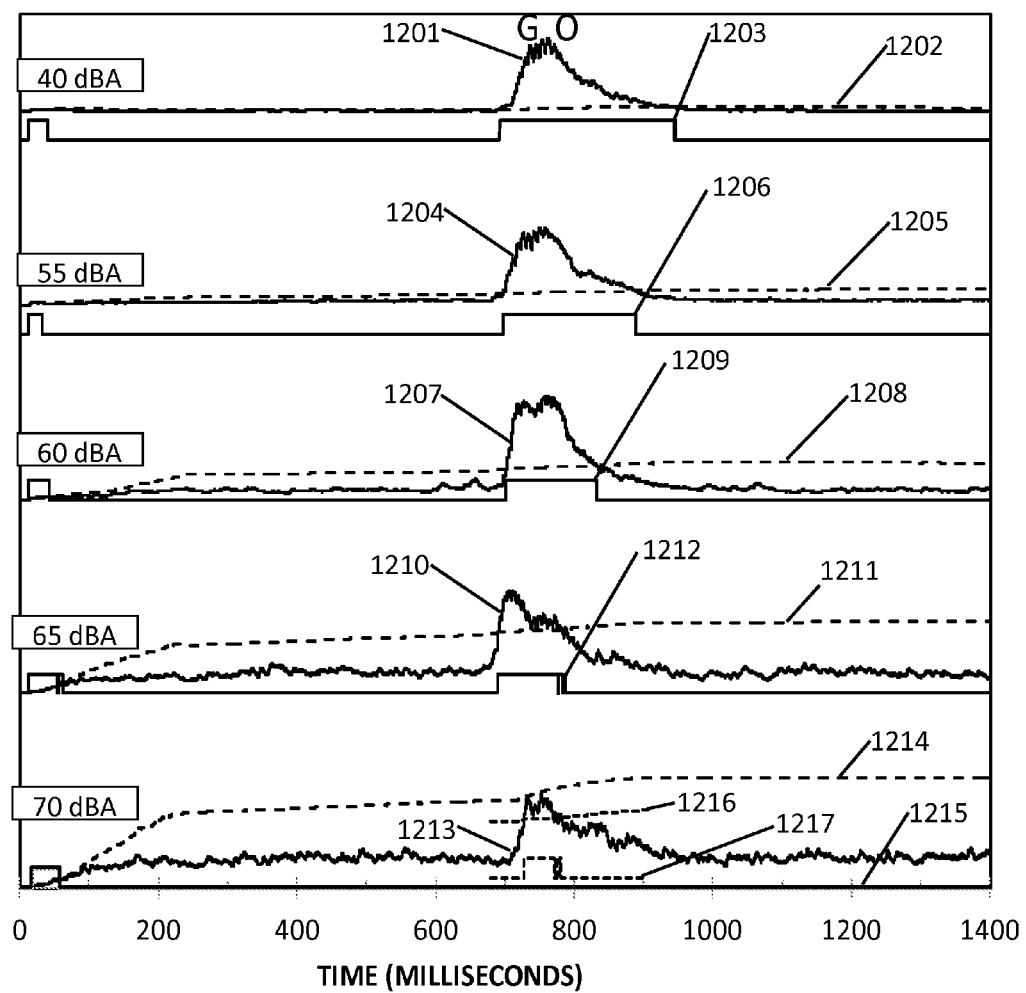
FIG. 12 shows the inventive analysis of the commands of FIG. 11, including deriving thresholds and optimizing conditions for command detection.

FIG. 12 shows the results of analyzing the waveforms of FIG. 11 according to the inventive method. Each group of traces in FIG. 12 was derived from the corresponding waveform of FIG. 11. Each group included the sound amplitude, the average noise amplitude, and the sound-detection flag, for each noise case. The command word is shown at the top, positioned roughly in alignment with the command sound.

The 40 dBA trace shows the sound amplitude 1201, and the noise-based threshold 1202 as a dashed line, and the sound detection flag 1203. All of these signals were obtained as described with FIG. 2. The average noise level (not shown) was derived by rectifying and averaging the 40 dBA waveform using TavNoise=0.1 second for times between zero and 250 milliseconds, then TavNoise=1 second thereafter, and stretched to 10 seconds during the command sound. The noise-based threshold was derived as the average noise amplitude times Fnoise=3.7. The sound detection flag 1203 was set high whenever the sound amplitude 1201 exceeded the noise-based threshold 1202. Also, any sounds occurring before 500 milliseconds were ignored.

Likewise the 55 dBA trace shows the sound amplitude 1204, the noise-based threshold 1205, and the sound detection flag 1206. For the 60 dBA case, the sound amplitude 1207, noise-based threshold 1208, and sound detection flag 1209 are shown with 60 dBA noise. For the 65 dBA case the sound amplitude 1210, noise-based threshold 1211, and sound detection flag 1212 are shown with 65 dBA noise. All of these signals were obtained as described for the 40 dBA case. The noise-based thresholds increased steadily with increasing background levels, as expected, and the duration of the corresponding command detection interval became successively narrower as a consequence of the higher noise-based thresholds.

For the 70 dBA case, the command was missed. The sound amplitude 1213 and the noise-based threshold 1214 are shown. The sound amplitude 1213 comes close, but does not exceed, the noise-based threshold 1214. The sound detection flag 1215 is also drawn, but since no command was detected, the sound detection flag 1215 was simply a line along the X axis. However, the data suggest that a lower value of Fnoise, and thus a lower threshold, would solve the problem. Therefore the analysis was re-run on the stored 70 dBA data, but using a lower value Fnoise=2.8. The resulting lowered noise-based threshold 1216 is shown as a dotted line. With that lowered Fnoise, the sound amplitude 1213 did exceed the revised noise-based threshold 1216 and the command was detected. The modified sound detection flag 1217, also shown dotted, confirmed that the command was detected when Fnoise was reduced. This shows that a command can be detected in a high-noise case by lowering Fnoise appropriately.

The high-noise experiment was then repeated (not shown), using the original Fnoise=3.7 but with the command being spoken a little louder. And this time, the command was properly detected even with 70 dBA noise and even with the high Fnoise value. The thresholds were then automatically derived according to the detected sound, and subsequent commands were detected with zero failures. This re-test strongly suggests that the first command would have been detected if the user had spoken slightly louder, or if the lower Fnoise value had been used. Most users will repeat a missed command a second time, but slightly louder, and the test shows that the louder command would have been enough to detect despite the high noise levels.

The 70 dBA example would have been a good time to use the optional alert messages. In the first run, when the sound amplitude 1213 did not quite reach the noise-based threshold 1214, a near-miss message could have been displayed informing the user that a possible command sound was received but it was below the detection limit. Also, in the re-analysis with the lowered Fnoise value, the command was detected but the sound amplitude 1213 barely exceeded the modified noise-based threshold 1216. In that case, an alert message would be generated indicating that a command was barely detected, so please speak up! Typically a near-miss message is generated if the maximum sound amplitude is less than the detection threshold but within a certain fraction, such as 10%, of the detection threshold. Likewise a weak-command message would be generated if the maximum sound signal exceeded the detection threshold by an amount less than a fraction, perhaps also 10%, of the detection threshold. Thus if the maximum sound amplitude is less than 90% of the detection threshold, the noise is rejected without comment; and if the maximum sound amplitude is 90% to 100% of the detection threshold, a near-miss message would be displayed; and if the maximum sound amplitude is 100% to 110% of the detection threshold, then a weak-command message would be displayed, and if the maximum sound amplitude exceeds 110% of the detection threshold, then the command is accepted without comment. Most users would appreciate the feedback and would adjust the noise or commands appropriately, to avoid having missed commands and false alarms later.

The results of FIG. 12 show that moderate levels of noise have little or no effect on command detection. At the highest noise levels, a first command can be detected at least half the time despite very high levels of noise. The results and the follow-on tests also show that, if the first command is missed, a second attempt is usually successful even with high noise. Finally, the results show that high noise can be accommodated so long as the user speaks slightly louder in a noisy environment than in a quiet environment. Therefore the inventive method enables first-command detection across a wide range of conditions, and second-command detection in most of the remaining cases, even with high noise.

A more quantitative experiment was then carried out, to measure the effectiveness of the inventive method using a large number of repeated commands. A command "GO" was spoken 100 times, and the maximum sound amplitude was derived after each command and was recorded in a file. Then the experiment was repeated but without the command being spoken, just the background noise. Thus 100 repetitions of a 3-second silent period were recorded and analyzed in the same way as the 100 commands. The recorded data were then used to calculate the probability of command detection and the probability of false alarms.

The entire series, of 100 commands and 100 noise intervals, was repeated five times with different background noise levels. In the first run, the background noise was 40 dBA. Then the sequence was repeated for noise levels of 55, 60, 65, and 70 dBA, for a total of 1000 independent tests with/without commands at various noise levels.

The experiment was then analyzed using ROC curves. A ROC (Receiver Operating Characteristic) curve is an analysis of the detection probability and false alarm probability of the system. ROC curves were originally developed for communication systems, but can apply to any sensing process with an adjustable detection threshold. ROC curves involve the Pd (the probability of detection, which in this case means detecting the first command) and the Pfa (the probability of a false alarm, which in this case means interpreting a noise event as a command). A threshold, in this case the noise-based threshold, determines how much signal is needed for command detection.

Each ROC curve was produced by recording a large number of repetitions, Nrep (here, Nrep=100) for the "GO" command, followed by Nrep independent background measurements. Then those repetitions were analyzed with different values of the threshold. The Pd and Pfa were then calculated for each threshold setting, and the results plotted as one point on one ROC curve. For the present test, however, the Fnoise parameter was varied instead of the threshold, because according to the inventive method, the application cannot specify the threshold directly. The application can only specify the Fnoise parameter, and then the noise-based threshold is derived from the actual data. Therefore Fnoise was used as the independent variable.

Typically in a ROC analysis, the threshold (or here, Fnoise) is varied from a very low value to a very high value, and the Pd and Pfa are calculated for each value. Then a point is plotted on the ROC curve, corresponding to the Pd and Pfa obtained for that particular setting of the threshold. Then the threshold is increased slightly, and the entire analysis is repeated, continuing until the entire range of the threshold has been used in analysis. The resulting curve, formed by connecting all the data points on the Pd-Pfa graph, is the ROC curve.

For each command repetition, the test was counted as a detection if the sound amplitude exceeded the noise-based threshold, and as a miss otherwise. Likewise, the 100 background tests were analyzed the same way, but whenever the sound amplitude exceeded the noise-based threshold, it was counted as a false alarm. To consider a specific example: at one setting of Fnoise, there were 96 detections among the 100 command tests, and 2 false alarms among the 100 background tests, corresponding to Pd=96% and Pfa=2%. That point, (96%, 2%), was then plotted on the ROC chart. Then the same analysis was done for each value of Fnoise, thereby plotting each ROC curve.

Typically a ROC analysis starts out with the threshold so low that Pd and Pfa are both 100% because any faint sound is sufficient to exceed the low threshold. That point corresponds to the upper-right corner of a ROC plot, where Pd=100% and Pfa=100%. Then, the threshold is gradually increased. Soon Pfa begins to drop when the increasing threshold is high enough to exceed the noise level, but Pd remains high because the command sound is generally louder than the noise. The points with low-Pfa and high-Pd correspond to the upper-left corner of the chart. This is the most favorable region since it corresponds to high detection probability and little or no false alarms. Then, as the threshold is increased further, Pd eventually begins to drop. When the threshold is raised vary high, higher than all of the noise and command sounds in the data set, then both Pd and Pfa are zero, which corresponds to the lower-left corner.

Often in a ROC experiment, a run may have loud commands and low noise. In that case, it is easy to set the threshold so that all the commands are detected and all the background tests are rejected, which corresponds to Pd=100% and Pfa=0%, a perfect score. The ROC curve for a perfect detection is a simple right angle.

In other ROC experiments, the noise is high or the commands are faint, in which case some of the noise values may be even higher than some of the command sounds. In that case, it is not possible to set the threshold to obtain a perfect 100%-0% separation between the commands and noise. The ROC curve for a non-perfect detection has a "knee" or curved region in the upper-left corner, due to the Pd dropping below 100% while the Pfa is still above 0%. The curve is no longer a perfect right angle. If the noise is raised even higher, the ROC curve tends to sag farther from the upper-left corner. In the limit of high noise, the ROC curve approaches a 45-degree line.

Figure 13A:
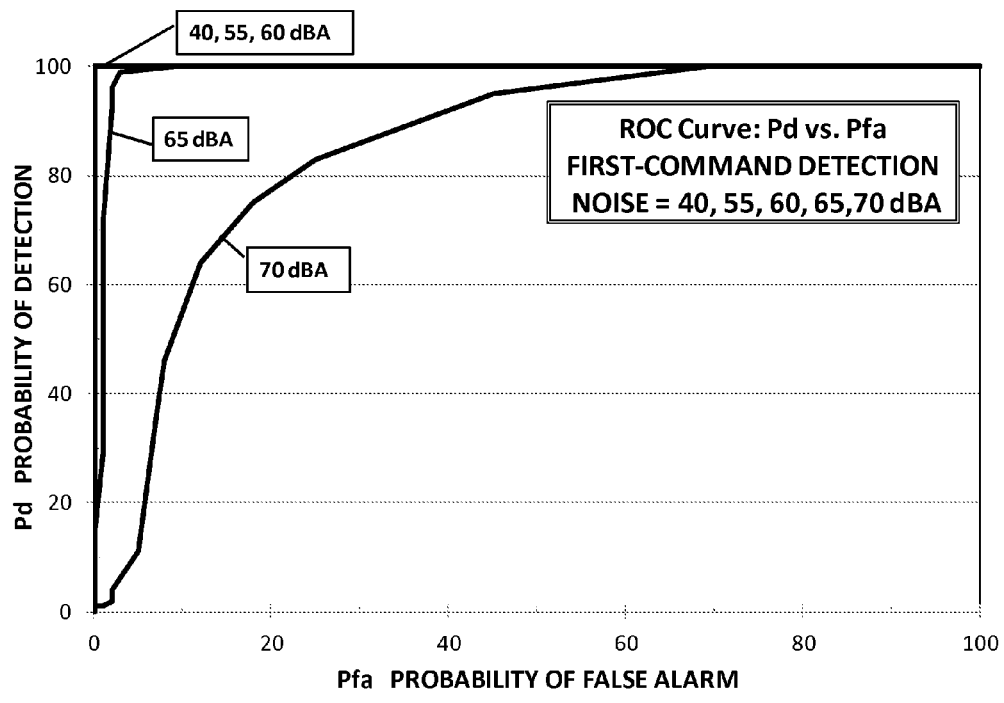
FIG. 13A shows the results of repeated command tests and noise measurements, at each of five different noise levels, presented as a set of curves.

FIG. 13A is a chart showing the ROC curves obtained from the experimental data. The goal was to evaluate the inventive method for detecting a first command on the basis of noise alone, using 100 command sounds and 100 noise intervals, but for five different noise levels. The chart contains five ROC curves, one curve for each different noise level tested, although some of the curves overlap. Each curve was obtained by analyzing 100 repetitions of the command "GO" to measure Pd, and 100 periods of background noise to measure Pfa. After each command, the data for that one command were recorded in a file, and then everything from that command was erased before the next command. Likewise the data and parameters were erased after each background test. Thus each test was analyzed as if it were the first command, with no knowledge from the preceding measurements.

The resulting ROC curves are shown in FIG. 13A. For the noise levels of 40, 55, and 60 dBA, a perfect score was achieved; hence these three curves were a simple right angle and overlapped completely The curve for 65 dBA did not achieve a perfect detection, and instead shows a significant "knee" in the upper-left corner. This happens when the noise is high enough that some of the noise values were higher than the lowest command sound. In that case it is not possible to obtain a perfect Pd and zero Pfa at any threshold setting. Consequently, the curve deviates from the perfect upper-left corner of the graph.

The curve for 70 dBA noise was even farther from perfect detection. This indicates that a noisy background often exceeded a normal command sound. (However, if the commands had been spoken louder, the curve would have been pushed back up toward the upper-left corner, despite the high noise level. The curve shape is determined by the ratio of commands to noise, not by the absolute sound levels.)

Figure 13B:
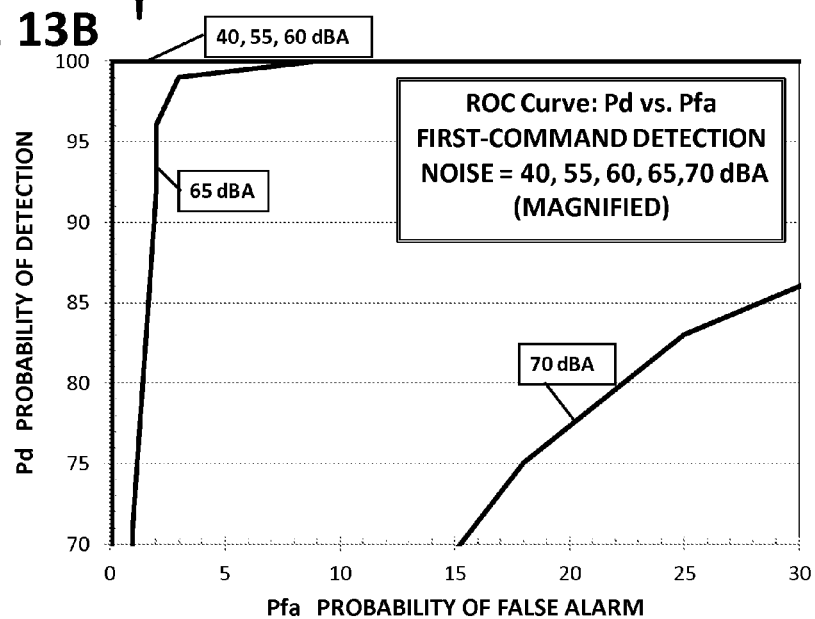
FIG. 13B is an expanded view of a portion of FIG. 13A.

FIG. 13B is a magnified view of FIG. 13A showing the critical upper-left corner in more detail. Again, the 40, 55, and 60 dBA curves appear as one right-angle curve, since they all achieved a perfect score at some threshold setting. For the 65 dBA run, the best performance was Pd=96%, Pfa=2%. For the 70 dBA runs, the best performance was about 80% detection and 20% false alarm rate.

ROC curves display useful information about the performance under different noise conditions, but are not sufficient to determine an optimal threshold value because the relative importance of false alarms and missed commands will depend on the needs of the application. For the current analysis, a quality factor Q was defined as the detection probability minus the false alarm rate, or Q=Pd-Pfa. The quality factor thus accounts for both the detection probability and the false alarm rate equally.

Figure 14A:
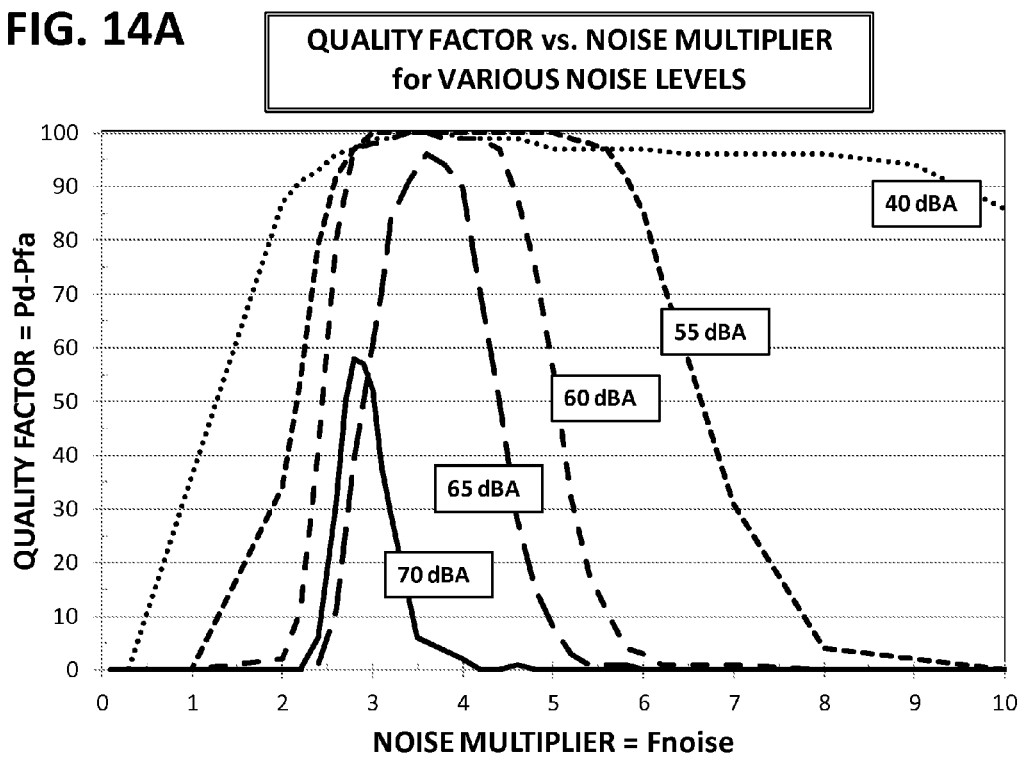
FIG. 14A is a graph showing the command detection quality factor versus noise level. This also guides the initial setting of analysis parameters.

FIG. 14A shows the quality factor analysis for all five noise levels. In this chart, the quality factor Q is plotted versus the Fnoise setting, with separate curves for each background level: 40 dBA (dotted line), 55 dBA (short-dash), 60 dBA (medium-dash), 65 dBA (long-dash), and 70 dBA (solid line). As expected, the lowest background curve had the best detection and the widest range of acceptable Fnoise values. For higher noise runs, the acceptable Fnoise range was successively narrower. The runs with the highest noise were not able to achieve 100% at any Fnoise setting. The curves of FIG. 14A also show, rather surprisingly, that if Fnoise is chosen in a certain narrow range, near-perfect detection can be obtained in all conditions other than the worst-case 70 dBA. The optimal range of Fnoise is between 3.5 and 4.0, with 3.6 to 3.7 appearing to be the very best.

The quality-factor curves also show that the optimum setting for Fnoise depends on the background level. The best Fnoise setting for a 70 dBA background is lower than the other cases, peaking at about Fnoise=2.8. This may be understood from the fact that the command sound comprises both speech and concurrent noise. Since the speech sound was held roughly constant for all runs, the higher concurrent noise of the 70 dBA case would require a lower Fnoise value to achieve the same overall command detection.

A more quantitative way to adjust Fnoise is to calculate the ACNR, the average command-to-noise ratio. The ACNR then guides the adjustment of Fnoise for optimally detecting subsequent commands. Before the first command, the ACNR is undefined, so there is no way to adjust Fnoise before the first command sound is detected. But for the second and all subsequent commands, the Fnoise setting may be controlled by ACNR to maintain optimal detection.

Figure 14B:
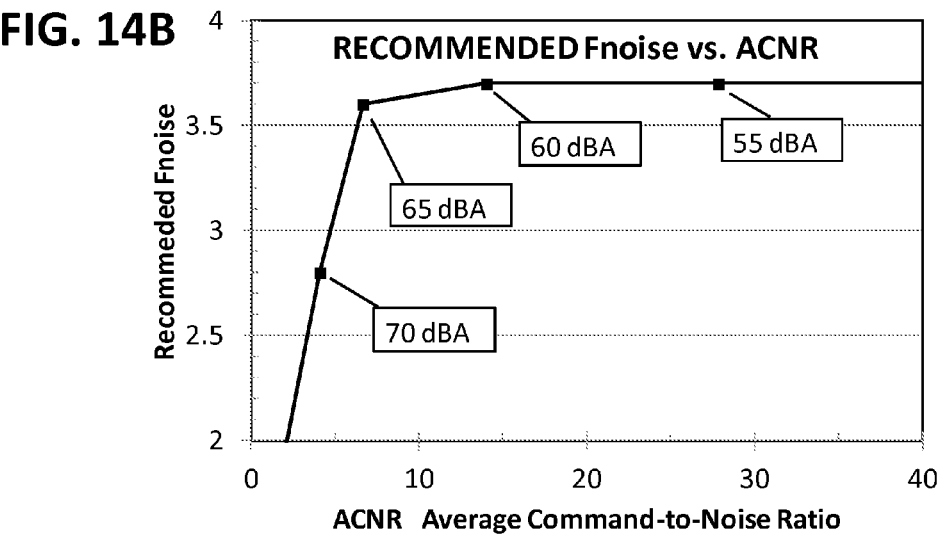
FIG. 14B shows the recommended Fnoise parameter from FIG. 14A.

FIG. 14B shows the preferred value of Fnoise to optimize command detection, versus the ACNR. For this experiment, ACNR was the command amplitude of the detected command divided by the average noise amplitude before the command. At low noise levels, the commands were much louder than the noise, so a relatively high value of Fnoise, 3.6 to 3.7, was optimal. But for the 70 dBA case the ACNR was only 4.5, and the optimal Fnoise was about 2.8 based on the observations. The chart of FIG. 14B displays this relationship. Reducing Fnoise when ACNR is low will improve command detection.

Another advantage of setting Fnoise according to the ACNR is the ability to adapt to changing conditions. If ACNR is low, Fnoise may be adjusted downward temporarily to improve the detection probability. But later, perhaps the noise abates or the user moves closer to the microphone, thus causing ACNR to go back up. In that case Fnoise could be increased back to the 3.6-3.7 level to avoid unnecessary false alarms.

The results of FIG. 14A lead to an improved command detection method. Initially Fnoise is set to a value in the range of 3.5 to 4.0 where good detection is obtained under most conditions. Then after the first command is detected, the ACNR is evaluated from the first command amplitude, and Fnoise is adjusted downward if ACNR is less than about 7.0 as prescribed in FIG. 14B. Then after each subsequent command, ACNR is recalculated using the updated values for the average noise amplitude and average command amplitude, and Fnoise is adjusted accordingly. The curves suggest that the Fnoise adjustment would extend the operating range by about an extra 5 dBA of noise.

The inventive method was then tested in the 70 dBA noise environment again, to see how well it performed in detecting a series of 11 "GO" commands. In this test, termed the one+ ten test, the first command was used to set the detection threshold on noise, and the subsequent ten command repetitions were detected as usual. In the first run, the application correctly detected the first command based on the noise, and then correctly detected all 10 successive commands thereafter, with no false alarms, thus achieving a perfect score despite the high background. In the second run, the application missed the first command, but it detected the second command as if it were the first, and then correctly detected all 9 subsequent commands with no false alarms. Although not a perfect result, this re-test shows that the inventive method enables an automatic recovery in case the first command is missed, even in the highest noise environment.

The data of FIGS. 13A and 14A demonstrate that the inventive method can detect a first command with high probability in a wide range of noise environments, and that detection of the second and subsequent commands can be improved further by either adjusting Fnoise according to ACNR, or adjusting the detection threshold according to the command sound amplitude. These results indicate that near-perfect command detection can be achieved for all noise conditions up to 65 dBA, and that 50% detection can be obtained for the first command in the worst-case noise, but with a high likelihood of full recovery upon the second command regardless of the noise level. The results also show that greatly improved detection can be obtained, even at 70 dBA, by either adjusting detection parameters, or allowing a second command attempt, or allowing the user to speak slightly louder in a high-noise environment, as is natural.

The next experiment involved a tally counter to detect command sounds. As mentioned, a tally counter is incremented whenever the sound amplitude exceeds a sound threshold, and is decremented periodically. The sound threshold is typically set equal to the noise-based threshold initially, and then to the average of the noise-based and command-based thresholds after the first command has been detected. The tally is incremented when the sound amplitude exceeds the sound threshold. And when the tally exceeds the tally threshold, a command is thereby detected. Thus the sound threshold is used for incrementing the tally, and tally threshold is used for detecting commands. During a command, the sound amplitude values exceed the sound threshold continuously, and the tally counter is rapidly incremented up to a large value. After the command is finished, the tally counter subsides back below the tally threshold due to the decrementation.

The tally incrementation value and update rate determine how fast the command can be detected. The tally counter may be incremented at the same rate as the digitizer, so that an embodiment with a 22 kHz ADC rate could also increment the tally counter 22 times per millisecond during commands. Such a rapid incrementation rate provides a very responsive and smooth tally counter, but requires a fast processor. Alternatively, the tally could be incremented at an interval related to the smoothing interval Tsmooth. For example, if a sound amplitude is smoothed with a 10 millisecond averaging time, the tally counter may be updated only once per 10 milliseconds, which minimizes the computing power but tends to be coarse and slow to respond. Usually a compromise interval is used for tally incrementing and decrementing, such as once per millisecond.

The tally threshold is determined primarily by the incrementation value and the incrementation rate. Typical command sounds have a minimum duration of 20 to 50 milliseconds, during which the tally builds quickly up to a value equal to the incrementation value times the incrementation rate. For example if the increment is +1 and the incrementation rate is 22 kHz, in a typical sound interval of 30 milliseconds the tally will build up to a total of 22*30=660 counts (ignoring for now the decrementation). Typically the tally threshold is set at about one-quarter of the count total expected for a typical sound interval, or in this case about 150 to 170. The tally threshold may be set somewhat higher or lower depending on the noise level, but rarely higher than 0.5 or lower than 0.1 times the accumulated counts for a typical sound interval.

Decrementation of the tally counter is an important step because it determines how rapidly the tally subsides. There are many ways the decrementation could be performed. For example, the decrementation could be subtractive or multiplicative. In subtractive decrementation, a value Ndec, which is usually 1, is subtracted from the tally counter periodically (but never below zero). In multiplicative decrementation, the tally counter is periodically multiplied by a value Mdec which is typically less than 1 but close to 1, such as 0.99. Subtractive decrementation produces a linear slope, and multiplicative decrementation produces an exponential shape.

Decrementation may be conditional or nonconditional. Conditional decrementation is performed only when there is no command detected, whereas nonconditional decrementation is performed every time regardless of the presence or absence of a command.

In some embodiments the tally is limited to a maximum value, TallyMax, and is not incremented above that value. Limiting the maximum tally value solves a problem of long recovery time. During a command, the tally may be incremented to such a high value that it would take a long time to decrement back down, resulting in a long recovery time and potentially missing the next command. When the tally is limited to a value TallyMax, the maximum recovery time is the decrementation time from that maximum value, and hence the recovery time is limited. For example, assuming subtractive conditional decrementation at 11 kHz (0.09 milliseconds), a tally limited to TallyMax=660 counts and a tally threshold=165 (25% of TallyMax) would have a response time (zero to tally threshold) of about 15 milliseconds, and a recovery time (TallyMax to tally threshold) of about 45 milliseconds.

Multiplicative decrementation does not need to be limited to a maximum value because it is automatically self-limiting at a value of Ninc/(1−Mdec). For example if the incrementation value is Ninc=1 and the decrementation multiplier is Mdec=0.998, the tally will self-limit at a value of 500. The tally threshold may be set at 30% of the maximum tally value, which is a count of 150. If the tally updating period is dt=0.045 milliseconds (or a rate of 22 kHz), the tally response time, from zero to the threshold, is about 7 milliseconds, and the tally recovery time from the maximum value to the threshold value, is about 20 milliseconds.

In some embodiments, the tally incrementation and decrementation are carried out at different periodicities, such as incrementing at 22 kHz but decrementing only once per millisecond. This can save processor steps, particularly when a longer tally recovery time is desired.

The tally method has many advantages. It automatically rejects momentary glitches and other excursions in the sound signal, due for example to electronic switching or other background effects. The tally automatically reduces the unwanted effect of command loudness, since the same tally total is produced regardless of how loud or soft the command is, so long as the sound amplitude exceeds the detection threshold. It is easy to adjust the rise and fall times independently, thereby controlling the command responsiveness and the post-command recovery time by setting tally parameters. Other advantages will become clear in the following examples.

Figure 15:
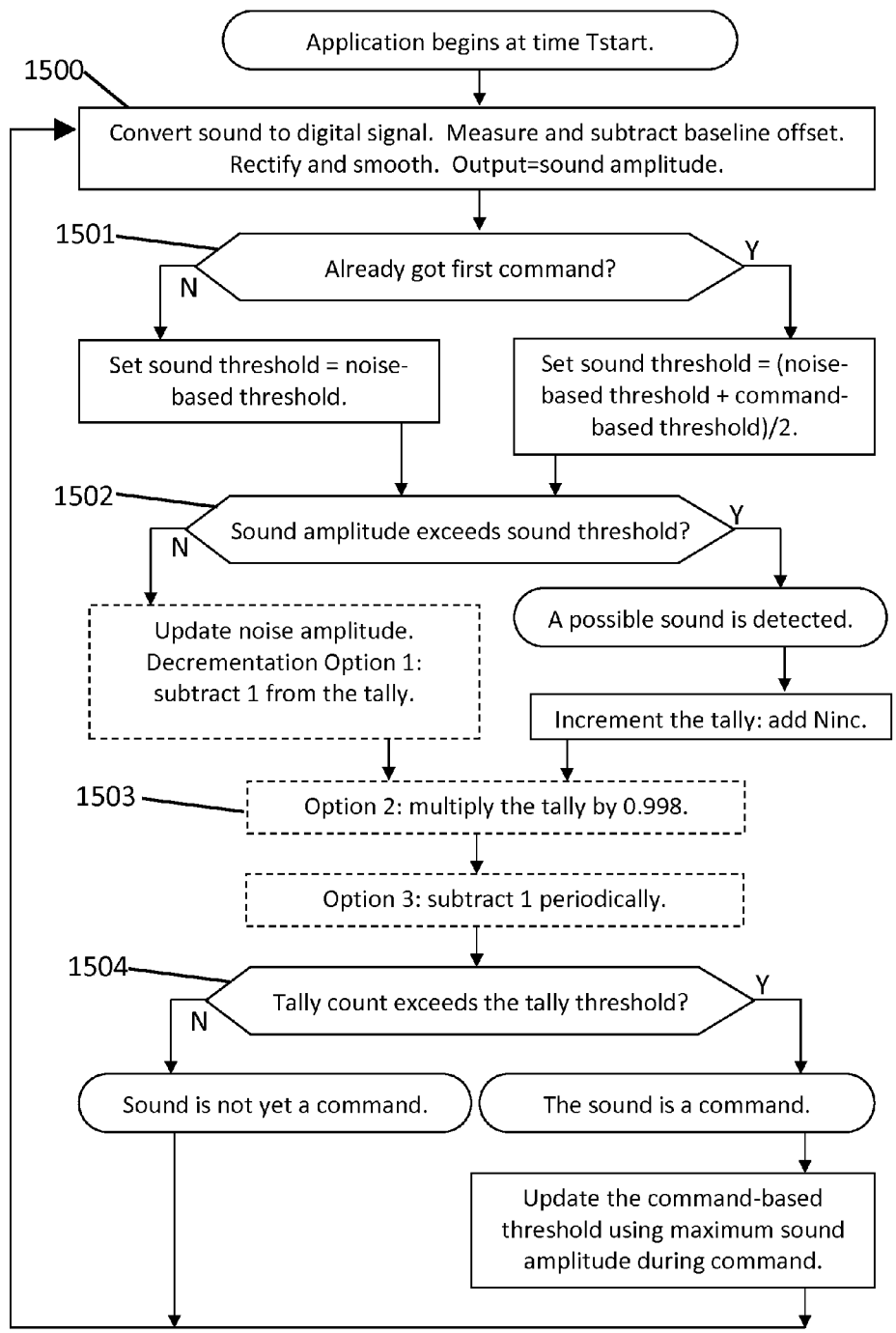
FIG. 15 is a flowchart showing how the inventive tally method may be implemented for improved command detection.

FIG. 15 is a flowchart showing how the inventive method may be implemented including the tally method. The application starts at time Tstart. In box 1500, sound is converted to a digital signal, which is baseline-corrected and rectified and smoothed, the result being the sound amplitude, as detailed in the foregoing examples.

Then interrogator 1501 asks if the first command has been detected. If not, the sound threshold is set equal to the noise-based threshold; and if yes, the sound threshold is set to the average of the noise-based and command-based thresholds.

Then in interrogator 1502, the sound amplitude is compared to the sound threshold. If the sound amplitude exceeds the sound threshold, the tally is incremented by adding an incrementation value Ninc, which may be +1 or another value depending on the response time desired. A possible sound event is detected since the sound amplitude exceeds the sound threshold, but it is not yet clear if the sound comprises noise or a real command.

The N branch of interrogator 1502, in which the sound amplitude does not exceed the sound threshold, causes the noise amplitude to be updated by averaging in the sound amplitude, and a conditional decrementation option 1 is carried out. All of the optional decrementation versions are shown in dash. In decrementation option 1, the tally counter is conditionally decremented subtractively. That is, the tally is decremented by subtracting 1 as long as no command sound is present (hence it is conditional). When option 1 is implemented, both the rising and falling tally counter are linear, with slopes determined by the incrementation and decrementation values and the tally update interval.

All paths then lead to box 1503, which is the decrementation option 2. Here the tally is decremented multiplicatively unconditionally, which means that the tally counter is multiplied by a number just below 1, in this case 0.998. Also, since it is unconditional, the multiplication is performed regardless of whether there is currently noise or command sounds. With option 2, the tally counter will rise to a maximum level during a command, and then will subside exponentially after the command is done.

Option 3 is unconditional symmetric subtractive decrementation, which means the tally is incremented and decremented by 1, but the decrement is done less often than the increment. For example, the incrementation occurs every digitizer cycle (such as 22 times per millisecond), but the decrementation occurs less often (once per millisecond typically). This produces a faster rise and slower fall than the other methods.

Not shown is the option to limit the tally to TallyMax. Each of the three options shown could be limited to TallyMax. For the subtractive decrementation options, this would result in a trapezoidal shaped tally curve with linear rising and falling sides. For multiplicative conditional decrementation, the tally curve would have a linear rise, flat top, then exponential fall. For the multiplicative unconditional decrementation, there is no need to apply a TallyMax limit because the tally is self-limiting. Developers may test all of these versions of tally operation to determine what works best for their application.

Then, interrogator 1504 checks if the tally count has exceeded the tally threshold. If not, the process returns to box 1500 to convert more sound. If the tally count does exceed the tally threshold, then the sound is a command which is thereby detected. The command-based threshold is updated according to the maximum sound amplitude observed during the command. Then all branches flow back to box 1500 to convert more sound.

Thus the flowchart of FIG. 15 shows how the inventive tally method may detect a first command or a subsequent command, by providing a sound threshold, incrementing the tally counter when the sound amplitude exceeds the sound threshold, decrementing the tally counter in one of several ways disclosed, and detecting a command when the tally counter exceeds the tally threshold.

Figure 16:
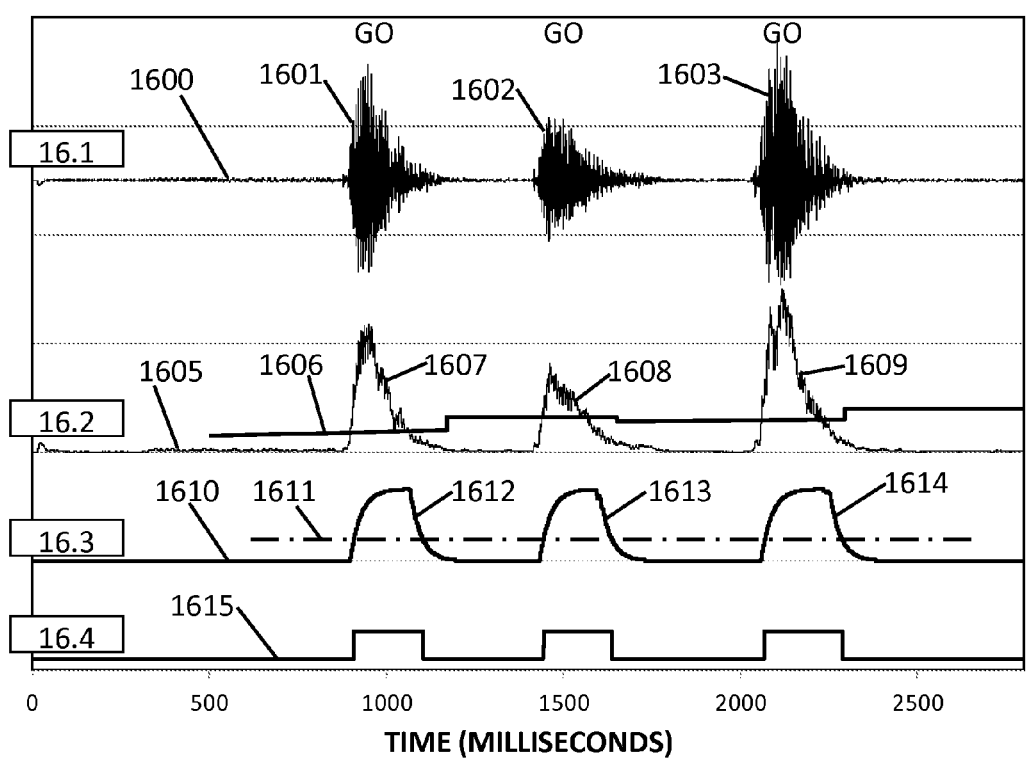
FIG. 16 shows the three commands of FIG. 8, but re-analyzed using the tally method.

FIG. 16 shows a test of the inventive tally method. The three "GO" commands of FIG. 8 were re-analyzed according to the tally method, and the results are shown in FIG. 16. Trace 16.1 shows the waveform signal 1600 including a first command 1601, a second and less loud command 1602, and then a third and much louder command 1603. The waveform 1600 is a copy of the waveform 801 of FIG. 8.

Trace 16.2 shows the sound amplitude 1605, obtained from the waveform signal 1600 by rectifying and smoothing with a 5 millisecond smoothing time. Also shown is the sound threshold 1606, which was set equal to the noise-based threshold (not shown) before the first command 1601, and was set equal to the average of the noise-based threshold and the command-based threshold (not shown) thereafter. The noise-based threshold was obtained as discussed with FIG. 8, by multiplying the average noise amplitude (not shown) by Fnoise. The average noise amplitude was derived by averaging the sound amplitude 1605 using a variable averaging time TavNoise, which was stretched during command sounds to prevent skewing. The command-based threshold was Fcommand times the average command amplitude (not shown) which was obtained by averaging the maximum sound amplitude 1605 observed in each command. Other processing details were as discussed with FIG. 8.

Trace 16.3 shows the tally counter 1610, which was incremented by 1 each time the sound amplitude 1605 exceeded the sound threshold 1606, and then was unconditionally decremented multiplicatively with a decay time of 30 milliseconds. The tally updating period was 0.09 milliseconds. Also shown is a tally threshold 1611 as a dash-dot line, set at a tally count of 100. Each command was detected when the tally counter 1610 exceeded the tally threshold 1611. Trace 16.4 shows a command-detection flag 1615 that indicates time intervals when each command was detected. The command-detection flag 1615 was set high whenever the tally counter 1610 exceeded the tally threshold 1611, and low otherwise.

The tally counter 1610 shows the three commands clearly, as tally enhancements labeled 1612, 1613, and 1614 respectively. Importantly, all three commands exhibit nearly the same tally signal, even though the command sounds 1601, 1602, and 1603 had widely varying amplitudes. This illustrates a major advantage of the tally detection method, that the tally method detects the presence of sound on the basis of the rate of the sound amplitude exceeding the sound threshold, rather than how loud the sound eventually becomes. The tally counter improves comprehension by reducing the effect of the command loudness. The loudness of a command generally has no bearing on its meaning, and thus has no value for command comprehension. In prior art command detection methods, the overall sound intensity is a confounding parameter that generally must be separated from other parameters for comprehension. With the tally method, this is no problem. As can be seen in the figure, the tally trace 1610 is so clean it looks like an idealized sketch. However it is not a sketch, it shows the actual experimental data from the tally analysis. Even with weak signals and variable noise, the tally method usually produces nearly ideal discrimination as shown.

Although the tally counter is a little more work to implement, it provides a more reliable command detection than the alternative detection methods. The tally method enables higher sensitivity because the thresholds can be set lower, due to the improved stability of the output. Also, greater versatility is provided by having two thresholds available (the sound detection threshold and the tally threshold) as well as the various incrementation and decrementation parameters that can be adjusted for any desired response time and recovery time. The results of FIG. 16 demonstrate that multiple commands of different loudness can be reliably detected using the tally method for command discrimination, starting with no knowledge of the signal levels corresponding to command sounds.

Figure 17A:
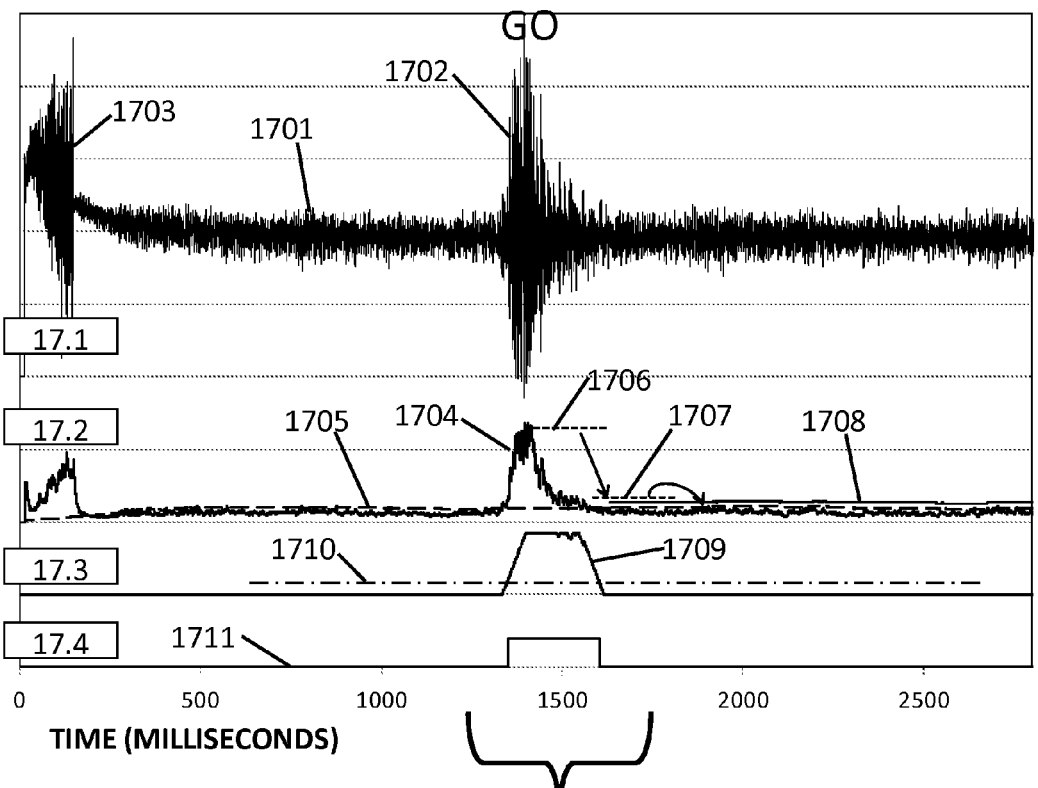
FIG. 17A is a re-analysis of FIG. 9 showing how the tally method provides improved noise rejection.

FIG. 17A shows a re-analysis of the noisy command of FIG. 9 using the tally method. The example demonstrates how the tally method rejects noise and enables greater sensitivity by allowing thresholds to be set lower. In contrast to the example of FIG. 16, the current example uses conditional subtractive decrementation by 1, with a maximum tally limit, which generates a tally curve having a linear ramp rise and fall to a flat-top at the maximum limit.

The command "GO" is shown at the top. Trace 17.1 shows the digitizer output signal 1701 including the command sound 1702 and an early noise feature 1703, same as in FIG. 9.

Trace 17.2 is the sound amplitude 1704, obtained by subtracting the baseline offset (not shown), rectifying, and smoothing the digitizer output signal 1701 as discussed with FIG. 9. Also shown as a long-dash line is the noise-based threshold 1705 which is the average noise amplitude (not shown) times Fnoise=1.5. This is a very low value of Fnoise, leading to enhanced sensitivity. Since the tally method is intrinsically insensitive to fluctuations, thresholds can be set more sensitive without generating false alarms. Also shown is the command amplitude 1706 as a short-dash line, which equals the maximum of the sound amplitude 1704 during the command. The command-based threshold 1707 is also shown as a short-dash line, obtained by multiplying the command amplitude 1706 by Fcommand=0.25 as symbolized by a straight arrow. Again, a very low value of Fcommand is used for greater detection sensitivity. (The tightly-spaced curves are easier to see in the expanded view FIG. 17B.)

Continuing with Trace 17.2, the sound threshold 1708, shown as a solid line extending after the command, was derived by averaging the noise-based threshold 1705 and the command-based threshold 1707, as symbolized by a curved arrow. Before and during the command, the sound threshold 1708 was equal to the noise-based threshold 1705 and thus is not shown separately.

Trace 17.3 shows the tally counter 1709 as a solid line, and tally threshold 1710 as a dash-dot line that corresponds to a tally count of 150. The tally counter 1709 was incremented by 1 whenever the sound amplitude 1704 exceeded the sound threshold, but not above TallyMax=700. The tally was decremented by subtracting 1 whenever the sound amplitude 1704 was below the sound threshold. However the tally counter 1709 was not decremented below zero. Thus the decrementation was subtractive conditional symmetric. The same tally updating time, 0.09 milliseconds, was used for both incrementation and decrementation. Accordingly, the tally 1709 exhibits a trapezoidal shape with a linear rise and fall ramp, same slope for both sides, and a maximum value of 700. The tally threshold of 150 was about 21% of the maximum. The tally response time from zero to the tally threshold was about 14 milliseconds, and the maximum recovery time from TallyMax to the tally threshold was about 50 milliseconds.

Trace 17.4 shows the command-detection flag 1711 which was set high when the tally counter 1709 exceeded the tally threshold 1710, and low otherwise. Signals occurring before Tsettle (500 milliseconds, not shown) were ignored, thereby ensuring that the early noise 1703 was not counted as a command.

Figure 17B:
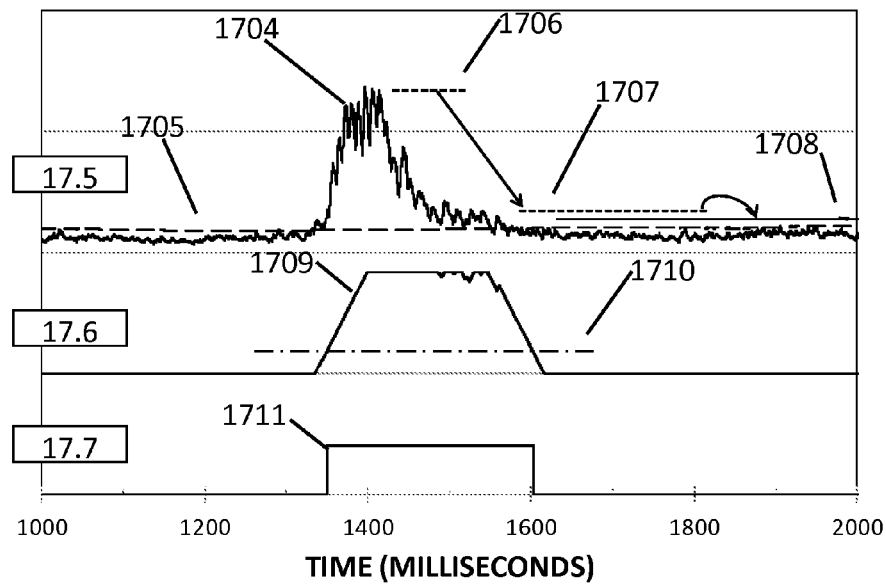
FIG. 17B is an expanded view of a portion of FIG. 17A.

In the enlarged view of FIG. 17B, the digitizer output signal 1704 and noise-based threshold 1705 are reproduced, as are the command amplitude 1706, the command-based threshold 1707, and the sound threshold 1708 (which overlaps the noise-based threshold 1705 before and during the command). In Trace 17.6, the tally counter 1709 and the tally threshold 1710 are shown. In Trace 17.7, the command-detection flag is again shown. As is apparent in Traces 17.6 and 17.7, the tally method produced an extremely clean detection despite noise. Also, since the tally threshold 1710 was set lower than half of TallyMax, the recovery time was longer than the response time. This was deliberate, to produce a fast command detection and also provide a prolonged post-command interval. The longer recovery time encompassed the highly variable command sound between about 1750 and 1800 milliseconds, thereby avoiding any post-command detection pulses such as those visible in FIGS. 9 and 10A.

Review of the raw data indicates that both Fnoise and Fcommand could have been set even lower, and the tally threshold 1710 could have been set much lower, without generating false alarms, despite the substantial background noise in this experiment. The results of FIG. 17A show that the tally method of command detection provides an extremely effective means for discriminating command sounds from noise, while maintaining high sensitivity to weak sound amplitudes.

The next example pertains to voiced and unvoiced sounds. Voice-activated systems are often required to distinguish between voiced and unvoiced sounds. As mentioned, voiced sounds are produced by vocal cord resonance, such as the vowels and certain consonants including M, B, and R, while unvoiced sounds are produced by an air restriction but without vocal cord involvement, such as S, P, and T (each example letter representing the sound of that letter when used in common English speech). The ability to discriminate voiced and unvoiced sound intervals in a command enables applications to recognize predetermined commands quickly with minimal code. The sound type also simplifies speech interpretation in real time, thereby enabling immediate interpretation of natural language in a local device, rather than relying on a remote supercomputer. The sound type also enables more efficient transmission of speech by controlling signal compression.

Although most noise sources have nothing to do with voices, it is convenient to refer to noise passing the integration cut as voiced or voiced-like noise, and the noise passing the differentiation cut is unvoiced noise or has an unvoiced-like character. It is also convenient to define terms for voiced and unvoiced sound detection by prepending a "V" or "U" to the terms that were introduced previously for non-type-dependent analysis. Then all of the methods that were discussed for detecting general sounds, can now be re-applied for detecting the voiced and unvoiced sounds separately.

To extract the voiced sounds, the waveform may be integrated, preferably as a running average, and with an integration span of preferably 0.2 to 0.3 milliseconds. The resulting integrated bipolar signal, termed the Vwaveform, includes the voiced sounds and excludes the unvoiced sounds as a consequence of the integration.

To separate unvoiced sounds, the waveform may be differentiated by alternately adding and subtracting sequential values of the waveform signal according to a formula. Preferably the formula comprises a second-order discrete differential (DD) such as the following, where w(i) and so forth are sequential waveform signal values, and i is an index:

$$DD(i)=w(i)/2-w(i+1)+w(i+2)/2 \quad (12)$$

The differential span is the time between the first and last values in the formula, which in this case is the time between w(i) and w(i+2), which corresponds to two digitizer periods. For optimal selection of unvoiced sounds, the differential span should be in the range of 0.08 to 0.12 milliseconds, with 0.1 milliseconds being ideal. The resulting differentiated signal, termed the Uwaveform, includes most or all of the unvoiced sound while strongly excluding the voiced sounds. If the digitization rate is in the range 16 to 26 kHz, the formula of Eq. 12 may be used as-is. For example, a 20 kHz digitization rate corresponds to a differential span of 0.1 milliseconds, which is the preferred value for selecting unvoiced sounds. If the digitization rate is higher than 26 kHz, then some values of the waveform signal may be skipped so that the differential span is close to 0.1 milliseconds. If the digitization rate is less than about 14 kHz, sensitivity to unvoiced sounds will be poor.

Then the Vsound amplitude is derived by rectifying and smoothing the Vwaveform signal with typically a 5 to 10 millisecond smoothing time. An average Vnoise amplitude is then calculated by averaging the Vsound amplitude, preferably with a variable averaging time TavNoise, thereby representing noise with a voiced-like character. A Vnoise-based threshold is then derived by multiplying the average Vnoise amplitude by a predetermined factor VFnoise, which is typically in the range of 3.5 to 4. A voiced sound is then detected when the Vsound amplitude exceeds a Vdetection threshold. Then, the Vcommand amplitude is derived from the Vsound amplitude during the voiced sound. Then a Vcommand-based threshold is derived by multiplying the Vcommand amplitude by a factor VFcommand. Typically the Vcommand amplitude is the maximum Vsound amplitude during the voiced sound.

Typically VFcommand is in the range of 0.2 to 0.5. Then the Vdetection threshold is derived by averaging the Vnoise-based and Vcommand-based thresholds.

In a similar fashion, the inventive method also includes deriving a Usound amplitude by rectifying and smoothing the Uwaveform signal with typically a 5 to 10 millisecond smoothing time. An average Unoise amplitude is then calculated by averaging the Usound amplitude, preferably with a variable averaging time TavNoise, thereby representing noise with an unvoiced-like character. A Unoise-based threshold is then derived by multiplying the average Unoise amplitude by a predetermined factor UFnoise, which is typically in the range of 3.5 to 4. An unvoiced sound is then detected when the Usound amplitude exceeds a Udetection threshold. Then, the Ucommand amplitude is derived from the Usound amplitude during the unvoiced sound. Then a Ucommand-based threshold is derived by multiplying the Ucommand amplitude by a factor UFcommand. Typically the Ucommand amplitude is the maximum Usound amplitude during the unvoiced sound. Typically UFcommand is in the range of 0.2 to 0.5. Then the Udetection threshold is derived by averaging the Unoise-based and Ucommand-based thresholds.

Figure 18:
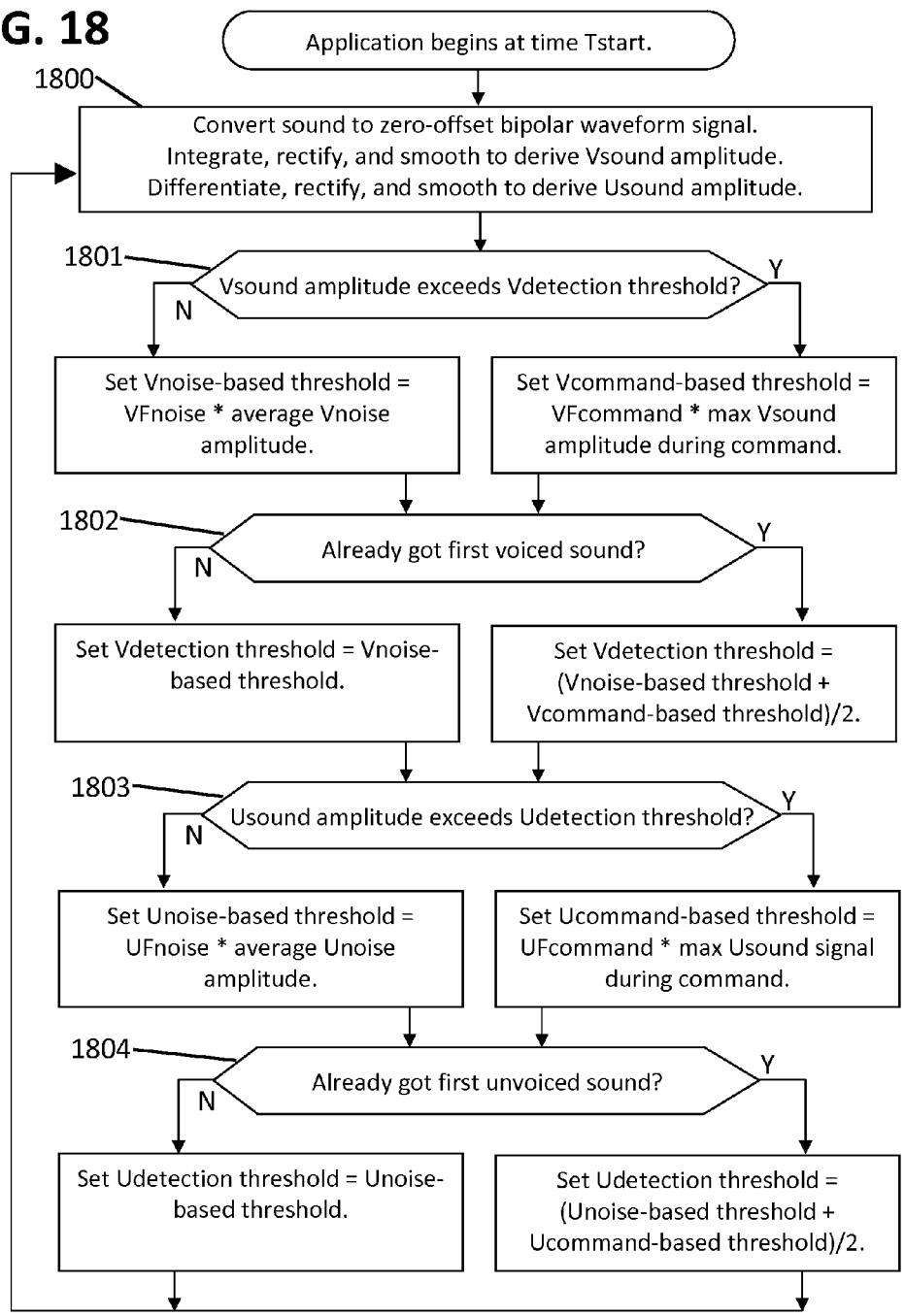
FIG. 18 is a flowchart showing how the voiced and unvoiced sounds in a command can be separately detected using the inventive techniques.

FIG. 18 is a flowchart showing the inventive steps for detecting the first voiced and unvoiced command sounds after the application starts. First, in box 1800, sound is converted to a waveform signal, using a microphone, amplifier, and ADC, and subtracting the offset bias as discussed in the previous examples. Then the waveform is integrated by averaging, thereby deriving a Vwaveform signal that includes the voiced sounds without unvoiced sounds. The Vwaveform signal is then rectified and smoothed with a 5-10 millisecond smoothing time, thus deriving the Vsound amplitude. The waveform is also differentiated, thereby deriving a Uwaveform signal, which is then rectified and smoothed to form a Usound amplitude that includes the unvoiced sounds and excludes the voiced sounds, all as discussed in previous examples. All of these sub-steps are included in box 1800. The output of box 1800 is the Vsound amplitude and the Usound amplitude signals.

Steps for detecting the voiced commands are presented next in the flowchart, followed by steps for detecting unvoiced commands. However, it is immaterial which command type is detected first. In the interrogator 1801, the Vsound amplitude is compared to a Vdetection threshold. If the Vsound amplitude is below that threshold, the sound is voiced-like noise, in which case the average Vnoise amplitude is updated to include the latest Vsound amplitude value. Preferably the average Vnoise amplitude is a running average of the Vnoise amplitude using a variable averaging time. Then the Vnoise-based threshold is set equal to the average Vnoise amplitude times the factor VFnoise.

However, if the Vsound amplitude exceeds the Vdetection threshold in the interrogator 1801, then the sound is a voiced command sound. In that case the Vcommand amplitude is set equal to the maximum of the Vsound amplitude during the command, and the Vcommand-based threshold is derived by multiplying the Vcommand amplitude times the factor VFcommand. All of these steps closely match the analysis discussed in FIGS. 2-4, but now detecting voiced-like and unvoiced-like sounds separately.

Then, interrogator 1802 asks if the first voiced command sound has already been detected. If not, the Vdetection threshold is set equal to the Vnoise-based threshold. If a voiced command sound has already been detected, then the Vdetection threshold is derived by averaging the Vnoise-based threshold and the Vcommand-based threshold together.

Then an identical analysis is performed on the unvoiced sound. Interrogator 1803 asks if the Usound amplitude exceeds the Udetection threshold. If not, the average Unoise amplitude is updated as a running average, and the Unoise-based threshold is set equal to the average Unoise amplitude times a factor UFnoise. But if the Usound amplitude does exceed the Udetection threshold, then the sound is an unvoiced command sound, and the Ucommand amplitude is derived from the Usound amplitude during the unvoiced sound interval, and the Ucommand-based threshold is set equal to the Ucommand amplitude times a factor UFcommand.

Then interrogator 1804 asks if the first unvoiced command sound has been detected. If not, the Udetection threshold is set equal to the Unoise-based threshold alone. But if a previous unvoiced sound has been detected, then the Udetection threshold is derived as a function (here, the average) of the Unoise-based threshold and the Ucommand-based threshold.

Then the process returns to box 1800 to collect more sound. The flowchart shows that the first-uttered voiced and unvoiced command sounds can be detected by deriving separate Vdetection and Udetection thresholds from each type of noise, and then that improved Vdetection and Udetection thresholds can be derived from the noise and command sounds together.

In the flowchart, the average Vnoise amplitude was derived by averaging the Vsound amplitude only during noise but not during detected command sounds. As mentioned, this may lead to a lock-up condition. Alternatively, the average Vnoise amplitude may be derived by averaging the Vsound amplitude all the time, noise and command times alike, but using a stretched averaging time TavNoise whenever voiced command sounds are detected, thereby minimizing skewing of the average Vnoise amplitude while avoiding the lock-up trap.

As a further alternative, two different values, VTavNoise and UTavNoise, may be maintained so that the voiced and unvoiced noise averages may be calculated using two different averaging times for averaging the voiced-like noise and unvoiced-like noise separately. For example, during voiced command sounds the VTavNoise parameter should be stretched, but the UTavNoise parameter should not be stretched, because the unvoiced command sounds do not appear in the Vsound amplitude. In general, when one sound type is detected, there is no need to stretch the noise-averaging span of the opposite sound type.

Figure 19:
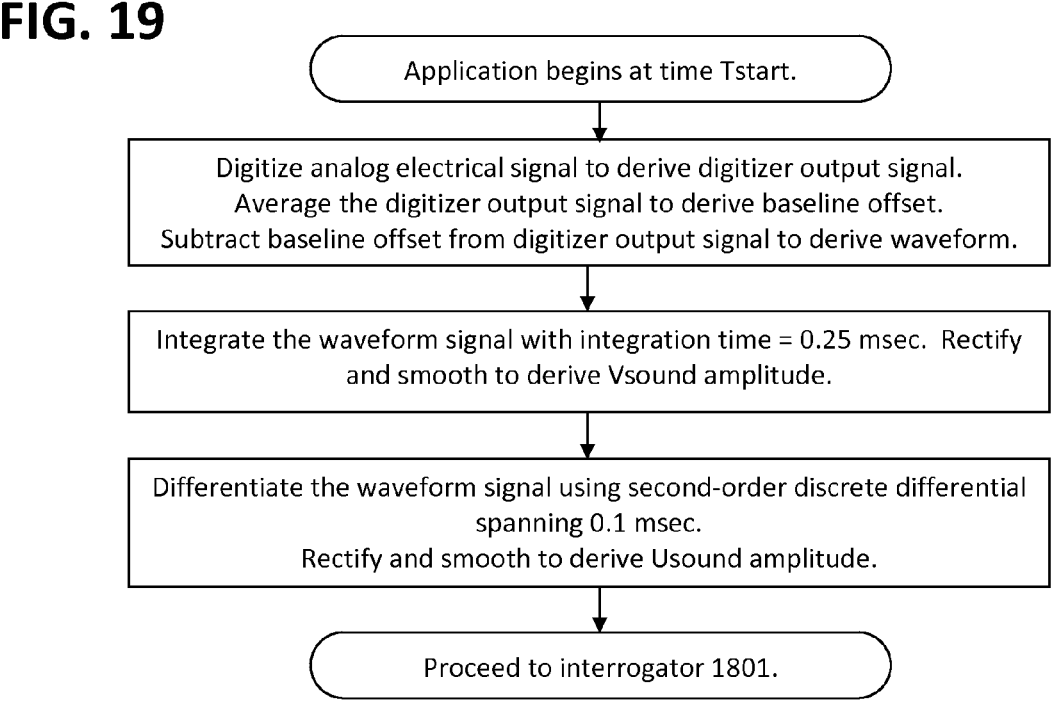
FIG. 19 shows in more detail how the voiced and unvoiced sound may be separated by analysis of the initial waveform.

FIG. 19 is a flowchart showing in more detail how the voiced and unvoiced sound signals may be obtained according to the inventive method. First, the waveform signal is obtained by detecting sound with a microphone, optionally amplifying and filtering, and then digitizing to obtain a digitizer output signal. Then the digitizer output signal is averaged to obtain a baseline offset signal, which is then subtracted from the digitizer output signal to obtain the waveform signal. The waveform signal includes both voiced and unvoiced sound, but with zero baseline offset.

Then, the voiced sound is selectively extracted by integrating the waveform signal, typically using a running average of the waveform signal values with an integration averaging span of 0.2 to 0.3 milliseconds (here, 0.25 milliseconds), which optimizes the selection of voiced sound wavelets while substantially excluding the unvoiced sounds. The resulting Vwaveform signal is then rectified and smoothed, resulting in the Vsound amplitude signal.

Then the unvoiced sound is selectively extracted by differentiating the waveform signal. Typically the differentiation includes adding and subtracting sequential values of the waveform signal values that span a particular time interval.

Preferably, the values are added and subtracted according to a discrete differential, which is preferably a second-order discrete differential with a span of 0.08 to 0.12 milliseconds (here, 0.1 milliseconds), thereby selecting for unvoiced sounds while excluding voiced sounds. The resulting signal is the Uwaveform signal, which is then rectified and smoothed by averaging to obtain the Usound amplitude.

As an alternative, the voiced and unvoiced command sounds may be derived by any of the numerous prior art means for sound type discrimination, including spectral binning, analog electronic filtering, zero-cross analysis, autocorrelation analysis, and the like. However, the inventive integration and differentiation method for separating the voiced and unvoiced signals is preferred since it is the quickest, most convenient, and most computationally efficient means for separating voiced and unvoiced sounds.

Figure 20:
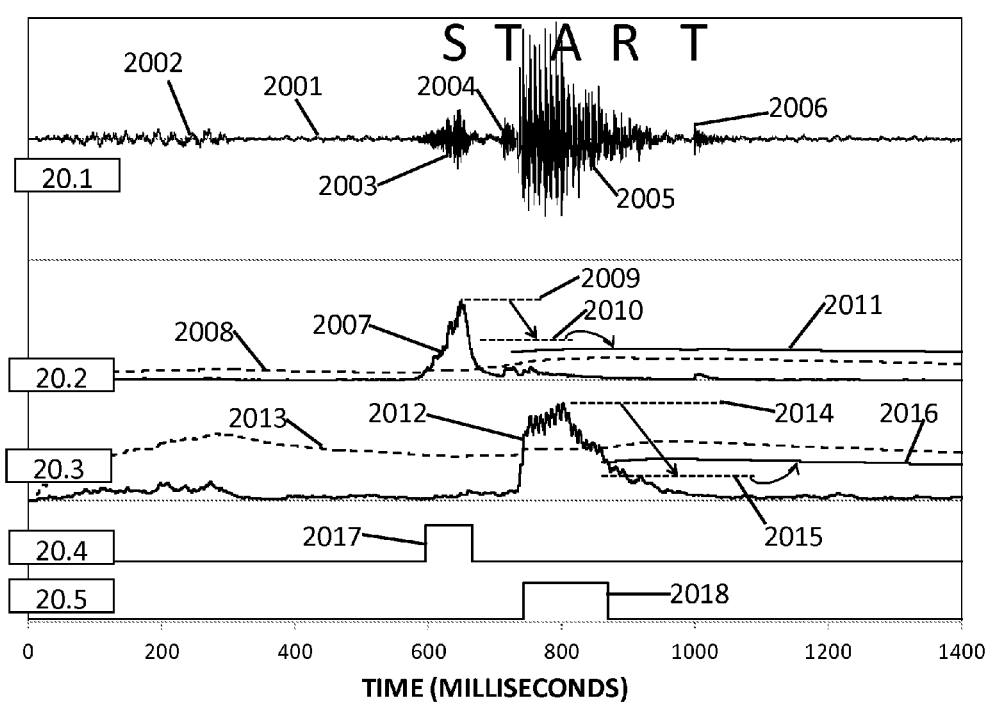
FIG. 20 shows how a first command "START" was analyzed to detect voiced and unvoiced regions separately.
Figure 21:
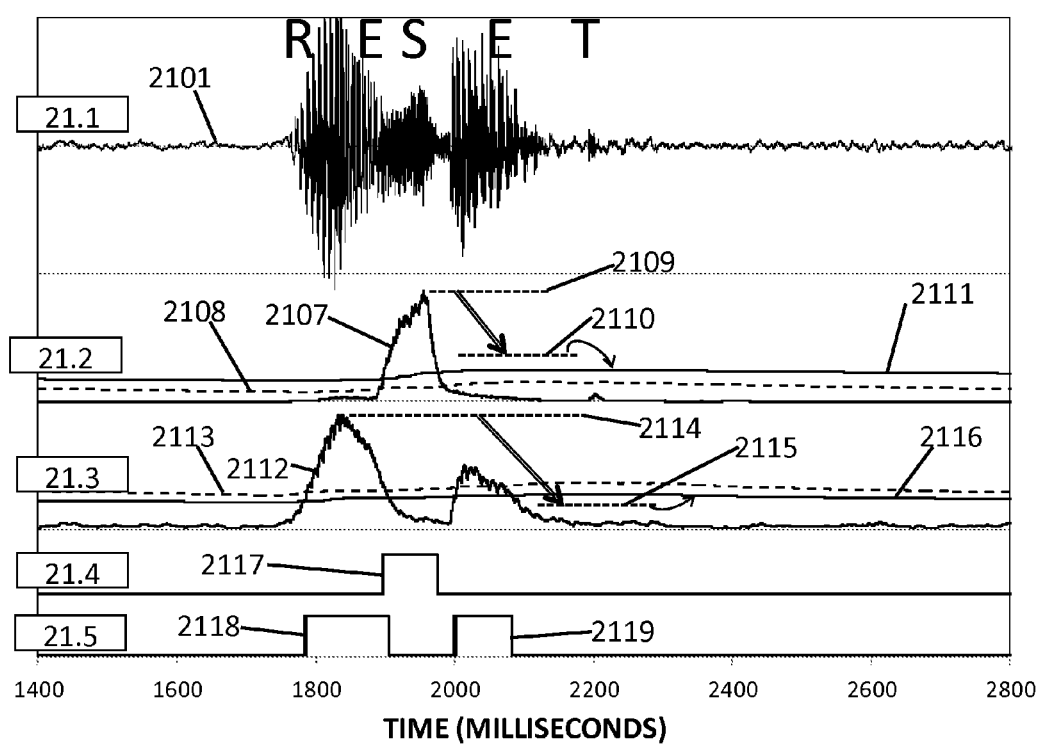
FIG. 21 is a continuation of FIG. 20 for analyzing the second command "RESET" into voiced and unvoiced sound intervals.

FIGS. 20 and 21 show signals from an experiment to test the inventive method for detecting the first voiced and unvoiced command sounds based on noise, and then detecting subsequent voiced and unvoiced sounds with improved thresholds. The first command was "START" and the second command was "RESET". Both of these commands have both voiced and unvoiced sound intervals. The challenge was to set initial detection thresholds for detecting voiced and unvoiced sounds separately, based on the initial noise levels; then to detect the voiced and unvoiced portions of the first command; then to update the thresholds based on the first command sounds; and then to detect the voiced and unvoiced sounds of the second command; and then further refine the thresholds based on the sounds of the second command.

In FIG. 20, the first command "START" is spelled across the top with the letters spread out to roughly correspond to the other traces. In Trace 20.1, the waveform signal 2001 is shown. The waveform signal 2001 includes an early noisy period 2002, followed by the first command sounds which comprise an "S" sound 2003, followed by a slight delay and then a very faint "T" sound 2004, then the "AR" portion 2005, followed by an extremely faint terminal "T" sound 2006. The "S" 2003 is unvoiced, the "AR" 2005 is a voiced interval, and the faint "T" sounds 2004 and 2006 are unvoiced.

The two "T" sounds in this command are often pronounced extremely faintly, or they may be missing entirely, depending on how the user says the command. Most speakers elide their unvoiced plosives, resulting in little or no actual sound. Instead, the sound of an adjacent voiced interval is rapidly started or stopped, which creates a compelling illusion that the missing phoneme was spoken.

Trace 20.2 shows the Usound amplitude 2007 containing unvoiced sound, which was obtained by differentiating the waveform signal 2001 with a second-order discrete differential, rectifying, and smoothing with a 5 millisecond smoothing span. The Usound amplitude 2007 is large during the unvoiced "S", thus indicating that the sound is unvoiced. Also shown as a long-dash line is the Unoise-based threshold 2008 obtained by averaging the Usound amplitude 2007 with a variable span, and multiplying by UFnoise=10. Also, a very slight enhancement is seen in the Usound signal 2007 with each of the suppressed "T" sounds, but they are so slight that it would be difficult to detect them reliably.

The unvoiced "S" sound 2003 was detected by comparing the Usound amplitude 2007 to the Unoise-based threshold 2008. During the command, the Ucommand amplitude 2009 was obtained as the maximum Usound amplitude 2007 and is shown as a short-dash line. Then the Ucommand-based threshold 2010 was calculated by multiplying by UFcommand=0.5, as indicated by a small straight arrow. Then, the Unoise-based threshold 2008 and the Ucommand-based threshold 2010 were averaged as suggested by a curved arrow, thereby obtaining the Udetection threshold 2011 shown as a solid line. The Udetection threshold 2011 was then used to detect subsequent unvoiced command sounds in the next figure.

Trace 20.3 shows how the voiced sounds may be analyzed, similar to the unvoiced analysis. The Vsound amplitude 2012 was derived by integrating the waveform signal 2001 with an integration time of 0.3 milliseconds, and then rectifying and smoothing across 10 milliseconds. The "AR" portion exhibited a strong Vsound amplitude, as expected since these phonemes are voiced and sustained. The Vnoise-based threshold 2013 was then calculated by further averaging the Vsound amplitude 2012 with a variable TavNoise, and multiplying by VFnoise=7. Comparing Traces 20.2 and 20.3, it is apparent that the early noise feature 2002 is voiced-like rather than unvoiced-like in character. (Actually, the early noise feature 2002 was caused by the user dropping the phone. But the inventive method worked nevertheless!)

The voiced "AR" sound 2005 was detected by comparing the Vsound amplitude 2012 to the Vnoise-based threshold 2013. When the command was spoken, the Vcommand amplitude 2014 was derived as the maximum Vsound amplitude 2012 and is shown as a short-dash line. The Vcommand-based threshold 2015 was then obtained by multiplying by VFcommand=0.25 as indicated by a straight arrow. Then the Vdetection threshold 2016 was calculated by averaging the Vnoise-based threshold 2013 and the Vcommand-based threshold 2015 as indicated by a curved arrow. The Vdetection threshold 2016 was then used to detect subsequent voiced command sounds in the next figure.

It may be noted that in Trace 20.2, the Unoise-based threshold 2008 was lower than the Ucommand-based threshold 2011. But in Trace 20.3, the Vnoise-based threshold 2013 was higher than the Vcommand-based threshold 2015. The difference was due to the unvoiced noise level being much lower than the voiced noise level in this case.

Trace 20.4 is a Usound detection flag which indicated an interval 2017 when the Usound amplitude 2007 exceeded the Unoise-based threshold 2008, corresponding to the unvoiced "S" sound. Trace 20.5 shows the Vsound detection flag, including an interval 2018 when the "AR" sound was detected. Interval 2018 was when the Vsound amplitude 2012 exceeded the Vnoise-based threshold 2013. Thus the example of FIG. 20 demonstrates that an application using the inventive method can detect both the voiced and unvoiced sound intervals in the first command, and then that improved thresholds can be derived from noise and command sounds together.

FIG. 21 is a continuation of FIG. 20. The time axis in FIG. 21 starts at 1400 milliseconds, which is the same time that FIG. 20 ends. The analysis of "RESET" proceeds the same way as "START" with two exceptions: (a) the starting values of the Vnoise-based threshold and Unoise-based threshold in FIG. 21 were equal to the ending values of those thresholds from FIG. 20, and (b) the voiced and unvoiced sounds were detected in FIG. 21 by comparing the respective sound amplitudes to the Vdetection and Udetection thresholds, rather than to the noise-based thresholds, since this is now the second command.

Trace 21.1 shows the waveform signal 2101 of the "RESET" command, a continuation of 2001. Trace 21.2 shows the Usound amplitude 2107 (continuation of 2007) obtained by differentiation of the waveform signal 2101 as described for FIG. 20. Also shown is the Unoise-based threshold 2108 (continuation of 2008) and the Udetection threshold 2111 (continuation of 2011). Also shown as a short-dash line is the Ucommand amplitude 2109, which is the maximum of the Usound amplitude 2107 during the "S" sound. Also shown is the Ucommand-based threshold 2110 as another short-dash line. However, since this is the second command, the Ucommand-based threshold 2110 was not simply the Ucommand amplitude 2109 times UFcommand. Instead, the first Ucommand amplitude 2009 was averaged with the second Ucommand amplitude 2109, thus forming the average Ucommand amplitude (not shown), which was then multiplied by UFcommand to obtain the Ucommand-based threshold 2110. The derivation of the Ucommand-based threshold 2110 as an average is symbolized by a two-line arrow.

Then, the Udetection threshold 2111 was updated by averaging the Unoise-based and Ucommand-based thresholds (2108 and 2110 respectively). Any subsequent unvoiced command (not shown) would be detected using that updated value of the Udetection threshold 2111.

Trace 21.3 shows a similar analysis of voiced sound. The Vsound amplitude 2112, the Vnoise-based threshold 2113, and Vdetection threshold 2116 are continuations of the corresponding signals (2012, 2013, and 2016 respectively) from the first command. The Vcommand amplitude 2114 was then derived as the maximum Vsound amplitude 2112 during the second command. The average Vcommand amplitude (not shown) was then calculated by averaging the Vcommand amplitudes 2009 and 2109 of the first and second commands, respectively, and the Vcommand-based threshold 2115 was derived by multiplying the average Vcommand amplitude by VFcommand. The derivation of the Vcommand-based threshold 2115 as an average is symbolically indicated by a two-line arrow. Then, the Vdetection threshold 2116 was updated as a simple average of the Vnoise-based threshold 2113 and the updated Vcommand-based threshold 2115, as indicated by a curved arrow. Any subsequent voiced commands (not shown) would be detected using the updated Vdetection threshold value 2116.

Trace 21.4 shows a Usound-detection flag indicating a time interval 2117 when the Usound amplitude 2107 exceeded the Udetection threshold 2111 during the unvoiced "S" sound.

Trace 21.5 shows a Vsound detection flag that indicates two time intervals 2118 and 2119 when the Vsound amplitude 2112 exceeded the Vdetection threshold 2116 during the voiced "RE" portion and second "E" portion of the command. The signals of Trace 21.4 and 21.5 were derived slightly differently from those of Traces 20.4 and 20.5. The time intervals in FIG. 20 indicated when the Vsound amplitude 2012 exceeded the Vnoise-based threshold 2013, and when the Usound amplitude 2007 exceeded the Unoise-based threshold 2008, but in FIG. 21 the unvoiced time interval 2117 indicates when the Usound amplitude exceeded the Udetection threshold 2116, and the voiced intervals 2118 and 2119 indicate when the Vsound amplitude 2112 exceeded the Vdetection threshold 2116.

The inventive method includes adjusting the detection threshold according to the observed command amplitude for each sound type. That adjustment may be made continuously while the command is in progress, or the threshold may be adjusted after the command is finished. Close inspection of the Udetection threshold 2111 in Trace 21.2 shows that the Udetection threshold 2111 was indeed adjusted continuously during the command, resulting in a series of small changes to the Udetection threshold 2111 between about 1900 and 1950 milliseconds, corresponding to increases in the Usound amplitude 2107. The other option, of withholding the adjustment until after the command is finished, would result in a sudden step change in the Udetection threshold 2111 when the sound is finished at about 1950 milliseconds, or perhaps when the entire command has been spoken and finished at about 2200 milliseconds. All of these variations can be made to work. Adjusting the threshold continuously during the command is programmatically simpler. An example of post-command threshold updating is in FIG. 8.

It may also be noted in Trace 21.3 that the second voiced interval, corresponding to the second "E" in "RESET", is much lower in amplitude than the first voiced interval. This is common. Based on a small empirical sample, half the users say "REEE-set", and the other half say "re-SET", and nobody says it with the same intensity on both syllables. Therefore the method must accommodate a range of detection amplitudes so that faint sounds are detected as well as loud ones. In the example of FIG. 21, the second voiced sound was barely detected due to its lower intensity. This problem was made even worse by the loud initial syllable, which caused the Vdetection threshold 2116 to be increased higher than it would have been without the loud first syllable.

To address the issue of detecting faint sounds within a command, the inventive method includes an option to measure the maximum voiced amplitude during each interval of voiced sound and adjusting the Vdetection threshold after each such interval. This is in contrast to the method described above, in which the Vcommand amplitude was based on the maximum voiced sound of the whole command. According to the modified method, each sound interval is separately analyzed, and the maximum sound amplitude is found within each of the sound intervals, and the threshold values are adjusted accordingly after each sound interval. In that case, the Vdetection threshold 2116 would have been adjusted downward after the second voiced interval, at about 2100 milliseconds. Such a downward adjustment of the Vdetection threshold 2116 would have ensured that any weak voiced sound intervals in later commands would be more likely to be detected.

Another way to solve the problem of faint command sounds is to lower the VFnoise and/or VFcommand values. In the example of FIGS. 20 and 21, the VFnoise parameter was inexplicably set to a very high value of 7, which caused the Vnoise-based threshold 2013 and 2113 to be much higher than necessary. The excessively high noise-based threshold resulted in the marginal detection of both the "AR" in the first command and the second "E" in the second command. If VFnoise were lowered to a more reasonable value, in the range of 3.5 to 4 as suggested by the experiment of FIG. 14A, the problem of detecting weak voiced sounds would be solved. In that case all of the voiced command sounds in both words would have been detected with ample margin, regardless of whether the command amplitude is updated after each sound or after the entire command.

The UFnoise parameter was also set way too high at UFnoise=10, but this did no harm because the unvoiced-like noise was extremely low. In some environments the unvoiced-like noise is not so low, and therefore it would be prudent to set all the analysis parameters to sensible values as suggested herein, before the application begins.

The experiment of FIGS. 20 and 21 demonstrates that, according to the inventive method, voiced and unvoiced sounds can be detected separately in a first instance and, with improved thresholds, in subsequent instances.

In many applications, the advantages of the tally method are needed as well as the discrimination of voiced and unvoiced sounds in commands. Therefore the "START" and "RESET" commands of FIGS. 20 and 21 were re-analyzed using the tally method. An off-line analysis routine was developed to emulate the tally analysis, using actual stored sound data of the commands as input. The re-analysis used two tally counters to detect the voiced and unvoiced sounds separately.

FIG. 22 shows the results of the re-analysis, with the two commands "START" and "RESET" spelled out at the top. The waveform signal 2201 exhibits both commands during a 2.8-second measurement time. The waveform signal 2201 was then integrated to obtain a Vsound waveform (not shown), and was differentiated to obtain a Usound waveform (not shown), as described with FIG. 20. Also a Vdetection threshold (not shown) was derived from voiced-like noise plus any prior voiced commands, and a Udetection threshold (not shown) was derived from unvoiced-like noise plus any prior unvoiced commands, all as described with FIGS. 20 and 21. Then a new parameter, the Usound threshold (not shown), was set equal to the Unoise-based threshold before the first command, and to the Udetection threshold after the first command. Likewise, the Vsound threshold (not shown) was set equal to the Vnoise-based threshold before the first command, and to the Vdetection threshold after the first command. These steps were closely analogous to those of FIGS. 16 and 17A, but adapted to voiced and unvoiced sound separately.

Trace 22.2 shows the resulting Utally counter 2202 for unvoiced sounds. The Utally counter 2202 was incremented by 1 whenever the Usound amplitude exceeded the Usound threshold, and was decremented multiplicatively. Also shown is the Utally threshold 2203 which was set at a tally count of 150. An unvoiced sound was detected when the Utally counter 2202 exceeded the Utally threshold 2203.

Trace 22.3 shows a Vtally counter 2204 for voiced sounds, which was incremented by 1 whenever the Vsound amplitude exceeded the Vdetection threshold, and decremented multiplicatively. Also shown is the Vtally threshold 2205, which was set at a tally count of 120.

To summarize: each tally counter was incremented when the associated sound amplitude exceeded its corresponding sound threshold, and each command sound was detected when the corresponding tally counter exceeded its tally threshold. The tally updating interval was 0.045 milliseconds, which was the same as the digitizer period. The decrementation time of both tallies was set at 15 milliseconds with an unconditional multiplicative decrementation factor F=0.997.

Traces 22.2 and 22.3 clearly show that the Utally counter 2202 detected the unvoiced "S" sounds in both commands, while the Vtally counter 2204 detected the voiced "AR" sound in "START", and the voiced "RE" and second "E" sounds in "RESET". Again, the Traces 22.2 and 22.3 are actual data results, not sketches. The "T" sounds were too low for detection as the analysis was set up; however, the tally method is capable of such extreme sensitivity that it would probably be able detect the faint plosives if the thresholds were lowered further.

Traces 22.4 and 22.5 show sound-detection flags 2206 and 2207 indicating unvoiced and voiced sound intervals respectively. The first command was correctly decoded as an unvoiced sound followed by a voiced sound, and the second command was decoded as voiced-unvoiced-voiced. The sound detection flags in Traces 22.4 and 22.5 are sufficient input for many applications that need to know when command sounds of each type are present. For example, the results are sufficient for command identification in applications with just a few predetermined commands, or to control the data compression for efficient transmission of sound in a limited bandwidth, or for triggering voice-activated sensors, and for many other applications. Thus FIG. 22 demonstrates that the inventive method, including the tally method for command detection, can cleanly detect voiced and unvoiced sound intervals in successive commands.

The inventive method enables software applications to be self-calibrating with no effort from the user, other than to utter commands at will. Users automatically provide the necessary silent period for the initial noise calibration before speaking the first command, and the application automatically derives the thresholds from the first command sound. In some applications, however, it may be desirable to guide the user in supplying the silent intervals and command sounds needed to carry out the threshold calibrations. For example, a series of messages may be displayed, suggesting that the user remain silent and then speak certain commands.

Figure 23A:
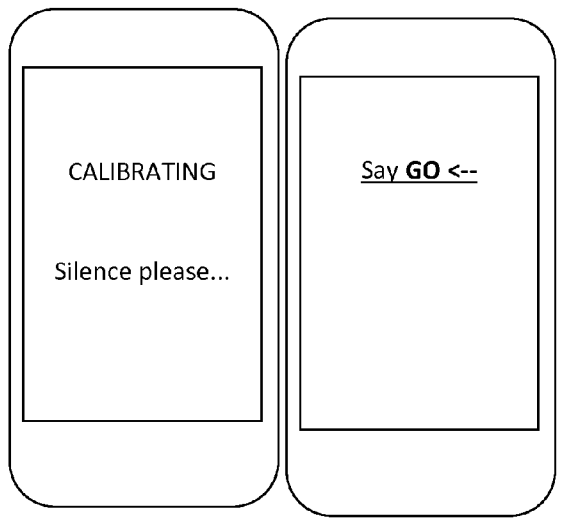
FIG. 23A shows a series of messages, displayed as mobile phone screens, that guide the user to provide sounds needed for calibration of parameters.

FIG. 23A shows a series of such messages, embodied as images on a mobile phone display. In FIG. 23A, a very simple calibration is carried out, starting with a brief (typically 1-3 seconds duration) Silence-message, saying "Silence please" or the like, during which the noise-based threshold is adjusted. Then, a Speak-message asks the user to speak a command, in this case "GO". After detecting the command, the application derives the command-based threshold, and then derives the detection threshold. Then, the Speak-message is removed and the application proceeds to do whatever voice-activated process it is intended for, having calibrated the detection threshold with the user's cooperation.

As options, the Silence-message could be displayed, not for a fixed interval, but just as long as needed to obtain a substantially unchanging value of the noise-based threshold. For example, a substantially unchanging value of the noise-based threshold would remain within a ±10% range, for a certain time of typically 100 to 500 milliseconds. After determining that the noise-based threshold is stable, the Silence-message would be replaced by the Speak-message.

Also, a message could be displayed if one of the guided calibration commands were detected as weak. For example, if the sound amplitude exceeds the detection threshold by only a small amount, then another message could be displayed suggesting that the user speak more loudly.

As a further option, the detection threshold may be reduced if the first command has not been detected for a long time, for example if nothing is detected for a time in the range of 5 to 10 seconds after the application begins, on the optimistic assumption that the user is still trying to carry out the calibration. For example, Fnoise could initially be set to 3.7 as discussed; and then if no command has been detected after 5 seconds, Fnoise could be reduced to 3.2; and then after 10 seconds Fnoise could be reduced to just 2.8. Lowering Fnoise in this way enhances the detection of weak command sounds in the presence of noise. However, it is risky to lower Fnoise below 2.8 due to the possibility of a false alarm.

Figure 23B:
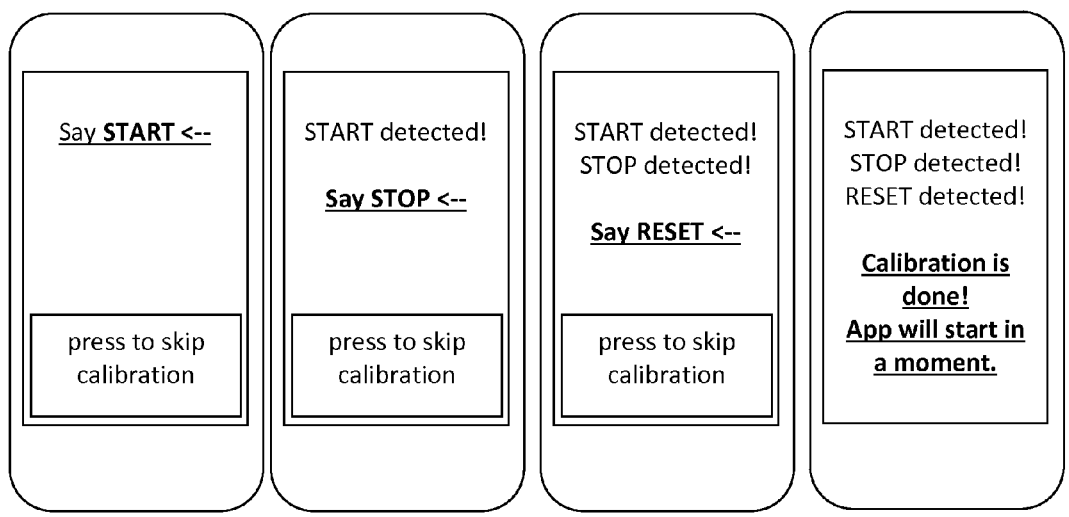
FIG. 23B shows a second series of mobile phone messages.

FIG. 23B shows a second embodiment of the guided calibration messages, this time to calibrate both voiced and unvoiced sounds. First, the command "START" is requested. This command contains both voiced and unvoiced sounds, so both detection thresholds can be set with one command. The second message requests that "STOP" be spoken, which also has both voiced and unvoiced sounds, thereby enabling further refinement of both detection thresholds. Then a third command "RESET" provides yet more opportunity for adjusting both the voiced and unvoiced detection thresholds. The final screen assures the user that the calibration was a success. Also there is a button allowing the user to skip the calibration sequence if desired, in which case the application would revert to the non-guided method for setting the thresholds based on whatever commands the user chooses to utter.

There is no silence message in FIG. 23B. It is assumed that sufficient silent time passes before the user has a chance to speak, for calibrating the noise-based threshold. If, however, the first command arrives too soon, no real harm is done since the remaining two commands provide ample opportunity to adjust the thresholds.

FIG. 24 is a re-listing of all the equations in this document. The equations are reproduced here for clarity and ease of use.

The examples demonstrate that an application embodying the inventive method can detect a first command based solely on pre-command noise, and then adjust the threshold and detect a second command based on noise and command sounds together. The experimental results also indicate the optimal ranges of parameters such as Fnoise, and further demonstrate how the inventive method can separately detect voiced and unvoiced sounds.

The inventive method is an enabling factor for all voice-activated applications that can be installed on a wide range of devices with initially unknown signal properties, such as mobile phones, networked sensors, embedded controls, and future wearable and implanted devices. The inventive method enables each of these systems to begin detecting spoken commands in any software application, for any acoustical and electronic properties of the device. Users will enjoy the responsiveness of applications that correctly detect the first spoken command, and all subsequent commands, by incorporating the inventive method in the application software.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is to be defined by the appended claims.

The invention claimed is:

1. A method for detecting a first spoken command followed by a second spoken command among noise, comprising the steps:
   converting sound to a sound amplitude signal comprising sequential digital values representing the sound intensity, using an analog-to-digital converter (ADC);
   before any spoken commands have been detected, deriving an initial detection threshold from sound amplitude signal values occurring prior to the first spoken command;
   then, detecting the first spoken command by comparing further sound amplitude signal values to the initial detection threshold;
   then, deriving a command-based threshold from sound amplitude signal values that occur during the first spoken command;
   then, deriving a revised detection threshold by functionally combining the initial detection threshold with the command-based threshold;
   and then, detecting the second spoken command by comparing subsequent sound amplitude signal values to the revised detection threshold.

2. The method of claim 1 which further includes a third spoken command following the second spoken command, and the steps:
   deriving an average noise value by averaging sound amplitude signal values that occur before the first spoken command, with sound amplitude signal values that occur between the first and second spoken commands;
   adjusting the detection threshold according to the average noise value;
   evaluating the maximum sound amplitude signal value that occurs during the first spoken command, and evaluating the maximum sound amplitude signal value that occurs during the second spoken command;
   deriving an average command amplitude by averaging the maximum sound amplitude signal values of the first and second spoken commands;
   further adjusting the detection threshold according to the average command amplitude;
   and then detecting the third spoken command by comparing the adjusted detection threshold to sound amplitude signal values occurring after the second spoken command.

3. A method for detecting spoken commands among noise, comprising the steps:
   starting a software application that processes sound at a time Tstart;
   converting sound to a sound amplitude signal comprising sequential digital values representing the intensity of the sound, using an analog-to-digital converter (ADC);
   deriving a noise-based threshold from sound amplitude values occurring before any command is detected;
   then detecting a first command at time Tfirst by comparing the sound amplitude to the noise-based threshold;
   then deriving a command-based threshold from sound amplitude values occurring during the first command;
   then deriving a detection threshold by combining the noise-based threshold and the command-based threshold;
   and then detecting a second command at time Tsecond by comparing the sound amplitude to the detection threshold.

4. The method of claim 3 which further includes the steps:
   deriving a command amplitude value from the sound amplitude values that occur during each spoken command;
   deriving an average command amplitude by averaging the command amplitudes of multiple spoken commands;
   revising the command-based threshold according to the average command amplitude;
   revising the noise-based threshold according to sound amplitude values occurring between commands;
   revising the detection threshold according to the revised command-based threshold and the revised noise-based threshold;
   and then detecting a spoken command by comparing the sound amplitude to the revised detection threshold.

5. The method of claim 3 wherein the step of deriving a noise-based threshold includes the steps:
   deriving an average noise amplitude by averaging sound amplitude values occurring before the first command is detected;
   and setting the noise-based threshold equal to the average noise amplitude multiplied by a predetermined unitless factor Fnoise;
   wherein the factor Fnoise is in the range of 3.5 to 4.0.

6. The method of claim 3 wherein the step of deriving a command-based threshold includes the steps:
   deriving a command amplitude from the maximum sound amplitude value occurring during the first command;
   and setting the command-based threshold equal to the command amplitude times a predetermined unitless factor Fcommand;
   wherein the factor Fcommand is in the range of 0.2 to 0.5.

7. The method of claim 3 wherein the detection threshold is represented as one of the options in the list of:
   the maximum of the noise-based and command-based thresholds;
   the minimum of the noise-based and command-based thresholds;
   the average of the noise-based and command-based thresholds;
   and a weighted average of the noise-based and command-based thresholds.

8. The method of claim 3 which further includes the steps of:
  inhibiting all command detection for a predetermined time in the range of 200 to 1000 milliseconds, starting at the time Tstart;
  and inhibiting all command detection until the noise-based threshold has remained substantially unchanged for a time in the range of 100 to 500 milliseconds.

9. The method of claim 3 which further includes a tally counter that can be incremented and decremented, and the steps:
  setting a sound threshold equal to the noise-based threshold before the first command is detected;
  deriving the sound threshold by combining the noise-based and command-based thresholds after the first command is detected;
  incrementing the tally counter when the sound amplitude exceeds the sound threshold;
  decrementing the tally counter periodically;
  and then detecting a command by comparing the tally counter to a predetermined tally threshold.

10. The method of claim 9 wherein the step of decrementing the tally counter includes multiplying the tally counter by a predetermined multiplier, and wherein the multiplier is in the range of 0.9 to 1.0.

11. The method of claim 3 which further includes the steps:
  displaying a silence-message that requests silence for a period of time after Tstart;
  deriving an average noise amplitude by averaging sound amplitude values that occur while the silence-message is displayed;
  then, deriving the noise-based threshold from the average noise amplitude;
  then, displaying a speak-message that requests that a particular command be spoken;
  then, deriving a command amplitude from sound amplitude values that occur while the speak-message is displayed;
  then, deriving the command-based threshold from the command amplitude.

12. The method of claim 3 wherein Telapsed is the time elapsed since Tstart, and further including the steps:
  deriving the average noise amplitude by averaging sound amplitude values using an averaging span TavNoise;
  and setting TavNoise according to a function of Telapsed so that TavNoise varies according to the time elapsed after Tstart.

13. The method of claim 12 wherein:
  TavMax is a predetermined time in the range of 1 to 3 seconds;
  and TavNoise is set equal to Telapsed if Telapsed is less than TavMax;
  and TavNoise is set equal to TavMax if Telapsed is greater than TavMax.

14. The method of claim 12 which further includes the steps:
  setting TavNoise equal to a time in the range of 10 seconds to 30 seconds while a command is detected;
  then, revising the average noise amplitude, by averaging the sound amplitude values that occur while the command is detected, using the averaging span TavNoise;
  then, revising the noise-based threshold according to the updated average noise amplitude while the command is detected;
  and then, revising the detection threshold according to the updated noise-based threshold while the command is detected.

15. The method of claim 3 wherein the step of deriving a noise-based threshold further includes the steps:
  deriving an average noise amplitude by averaging sound amplitude values occurring before the first spoken command is detected;
  storing the average noise amplitude for a predetermined delay time;
  and then, adjusting the noise-based threshold according to the stored average noise amplitude;
  wherein the delay time is in the range of 50 to 500 milliseconds.

16. The method of claim 3 which further includes the steps:
  providing a voiced tally counter and an unvoiced tally counter, each tally counter being incrementable and decrementable,
  providing a voiced sound threshold, a voiced tally threshold, an unvoiced sound threshold, and unvoiced tally threshold;
  converting sound to a digitized sound waveform;
  deriving, from the waveform, a voiced sound amplitude signal that includes voiced sounds and excludes unvoiced sounds;
  incrementing the voiced tally counter when the voiced sound amplitude exceeds the voiced sound threshold;
  deriving, from the waveform, an unvoiced sound amplitude signal that includes unvoiced sounds and excludes voiced sounds;
  incrementing the unvoiced tally counter when the unvoiced sound amplitude exceeds the unvoiced sound threshold;
  decrementing both tally counters periodically;
  and detecting a voiced sound when the voiced tally counter exceeds the voiced tally threshold, and detecting an unvoiced sound when the unvoiced tally counter exceeds the unvoiced tally threshold.

17. A method for detecting a first voiced command sound and a first unvoiced command sound among voiced-like noise and unvoiced-like noise, comprising the steps:
  converting sound to a digitized sound waveform using an analog-to-digital converter (ADC);
  deriving, from the waveform, a voiced sound amplitude signal that includes voiced command sounds and voiced-like noise, and excludes unvoiced command sounds and unvoiced-like noise;
  before any spoken commands have been detected, deriving an initial voiced detection threshold from voiced sound amplitude values occurring prior to the first spoken command;
  detecting the first voiced command sound by comparing further values of the voiced sound amplitude signal to the initial voiced detection threshold;
  deriving, from the waveform, an unvoiced sound amplitude signal that includes unvoiced command sounds and unvoiced-like noise, and excludes voiced command sounds and voiced-like noise;
  before any spoken commands have been detected, deriving an initial unvoiced detection threshold from unvoiced sound amplitude values occurring prior to the first spoken command;
  and detecting the first unvoiced command sound by comparing further values of the unvoiced sound amplitude signal to the initial unvoiced detection threshold.

18. The method of claim 17 which further includes a second voiced command sound and a second unvoiced command sound, and the steps;
  deriving a voiced-command-based threshold from voiced sound amplitude values occurring while the first voiced command sound is detected;

deriving a revised voiced detection threshold by functionally combining the initial voiced detection threshold with the voiced-command-based threshold;

detecting the second voiced command sound by comparing subsequent values of the voiced sound amplitude signal to the revised voiced detection threshold;

deriving an unvoiced-command-based threshold from unvoiced sound amplitude signal values occurring while the first unvoiced command sound is detected;

deriving a revised unvoiced detection threshold by functionally combining the initial unvoiced detection threshold with the unvoiced-command-based threshold;

and detecting the second unvoiced command sound by comparing subsequent values of the unvoiced sound amplitude signal to the revised unvoiced detection threshold.

19. The method of claim 17 wherein the step of deriving a Vsound amplitude signal includes averaging waveform values that span a time in the range of 0.2 to 0.3 milliseconds.

20. The method of claim 17 wherein the step of deriving a Usound amplitude signal includes differentiating the waveform signal by adding and subtracting waveform values according to a second-order discrete differential spanning a time in the range of 0.08 to 0.12 millisecond.

* * * * *